United States Patent
Parikh

(10) Patent No.: US 11,727,357 B2
(45) Date of Patent: Aug. 15, 2023

(54) DATA STRUCTURES, GRAPHICAL USER INTERFACES, AND COMPUTER-IMPLEMENTED PROCESSES FOR AUTOMATION OF PROJECT MANAGEMENT

(71) Applicant: True Client Pro, Garnerville, NY (US)

(72) Inventor: Mayuri Parikh, Nyack, NY (US)

(73) Assignee: True Client Pro, Garnerville, NY (US)

( * ) Notice: Subject to any disclaimer, the term of this patent is extended or adjusted under 35 U.S.C. 154(b) by 0 days.

(21) Appl. No.: 16/944,532

(22) Filed: Jul. 31, 2020

(65) Prior Publication Data

US 2021/0035069 A1 Feb. 4, 2021

Related U.S. Application Data

(60) Provisional application No. 62/881,293, filed on Jul. 31, 2019.

(51) Int. Cl.
| | | |
|---|---|---|
| *G06Q 10/10* | (2023.01) | |
| *G06Q 10/0631* | (2023.01) | |
| *G06Q 30/04* | (2012.01) | |
| *G06Q 10/101* | (2023.01) | |

(52) U.S. Cl.
CPC ..... *G06Q 10/103* (2013.01); *G06Q 10/06313* (2013.01); *G06Q 10/101* (2013.01); *G06Q 30/04* (2013.01)

(58) Field of Classification Search
None
See application file for complete search history.

(56) References Cited

U.S. PATENT DOCUMENTS 10,042,636 B1 * 8/2018 Srivastava ............. G06Q 10/06
10,083,521 B1 * 9/2018 Dhua ................. G06Q 30/0603

(Continued)

OTHER PUBLICATIONS

S. Y. Sung, L. Ming and T. W. Ling, "A graphical user interface for pictorial database retrieval," 1997 IEEE International Conference on Systems, Man, and Cybernetics. Computational Cybernetics and Simulation, Orlando, FL, USA, 1997, pp. 2397-2402 vol. 3, doi: 10.1109/ICSMC.1997.635286.*

*Primary Examiner* — Peter Ludwig
*Assistant Examiner* — Donald J Edmonds
(74) *Attorney, Agent, or Firm* — Procopio, Cory, Hargreaves & Savitch LLP

(57) ABSTRACT

Data structures, graphical user interfaces, and computer-implemented processes for automation of project management. In an embodiment, data structures are used to associate items with colors and elements. A virtual design board in a graphical user interface can then be automatically or semi-automatically populated with items that are associated with selected color(s) and/or element(s). A user may associate one or more of the populated items with a project, such as a wedding event. The underlying application may be cloud-based and/or be capable of managing clients and projects, processing payments, managing inventory, providing distinct libraries, creating assemblies, automatically generating preparation lists, generating reports, managing contracts, managing interactions, applying machine learning to make predictions or classifications and/or automate tasks, and/or the like.

24 Claims, 57 Drawing Sheets

(56) References Cited

U.S. PATENT DOCUMENTS

| | | | |
|---|---|---|---|
| 2011/0010214 A1* | 1/2011 | Carruth | G06Q 10/06316 705/7.26 |
| 2011/0055289 A1* | 3/2011 | Ennis | G06Q 10/06 707/805 |
| 2011/0264611 A1* | 10/2011 | Graupner | G06Q 10/10 706/12 |
| 2012/0284634 A1* | 11/2012 | Sitrick | G06Q 10/101 715/751 |
| 2014/0052661 A1* | 2/2014 | Shakes | G06Q 10/0836 705/339 |
| 2014/0149880 A1* | 5/2014 | Farouki | G06F 3/1454 715/748 |
| 2014/0278694 A1* | 9/2014 | Bellini, III | G06Q 10/06313 705/7.23 |
| 2014/0337112 A1* | 11/2014 | Dessert | G06Q 30/0267 705/14.23 |
| 2015/0104107 A1* | 4/2015 | Wolk | G06T 11/20 382/219 |
| 2015/0332037 A1* | 11/2015 | Tse | G06F 21/35 726/19 |
| 2016/0042044 A1* | 2/2016 | Coyne | G06F 16/986 707/756 |
| 2016/0048806 A1* | 2/2016 | Epson | G06Q 10/103 705/301 |
| 2017/0169065 A1* | 6/2017 | Darcy | G06F 16/26 |
| 2018/0096273 A1* | 4/2018 | Arnott | G06Q 10/06316 |
| 2018/0189735 A1* | 7/2018 | Lo | G06Q 10/08 |
| 2018/0203854 A1* | 7/2018 | Leydon | G06F 16/5846 |
| 2019/0042076 A1* | 2/2019 | Keel | G06F 16/29 |
| 2019/0147402 A1* | 5/2019 | Sitrick | H04M 3/567 705/301 |
| 2019/0205420 A1* | 7/2019 | Tana | G06F 16/183 |

\* cited by examiner

DATA STRUCTURES, GRAPHICAL USER INTERFACES, AND COMPUTER-IMPLEMENTED PROCESSES FOR AUTOMATION OF PROJECT MANAGEMENT

CROSS-REFERENCE TO RELATED APPLICATIONS

This application claims priority to U.S. Provisional Patent App. No. 62/881,293, filed on Jul. 31, 2019, which is hereby incorporated herein by reference as if set forth in full.

BACKGROUND

Field of the Invention

The embodiments described herein are generally directed to automated project management, and, more particularly, to data structures, graphical user interfaces, and computer-implemented processes for automating and otherwise facilitating various aspects of project management.

Description of the Related Art

The management of projects from start to finish, especially in the context of large-scale event planning or other service-based industries, can require an immense amount of time, energy, and diligence. For example, wedding planning involves active monitoring of a multitude of interdependent tasks (e.g., designing, picking up, assembling, and putting away items, communicating with the client and vendors, etc.) by a multitude of individuals (e.g., team members, clients, vendors, etc.). Not surprisingly, tasks frequently get overlooked or forgotten.

Conventional systems, such as scheduling and workflow software, provide some solutions for project management. However, these conventional systems are generally not sufficient for many service-based industries, such as event planning, which faces unique challenges to automation. For example, event planning involves a large number of individuals, the need to design, acquire, assemble, and manage physical items and transport those items to and from physical locations at specific times, and the like.

SUMMARY

Accordingly, systems, methods, and non-transitory computer-readable media are disclosed for data structures, graphical user interfaces, and computer-implemented processes for automating and otherwise facilitating various aspects of project management.

In an embodiment, a method is disclosed that comprises using at least one hardware processor to: generate a plurality of color data structures, wherein each of the plurality of color data structures represents a different color than any of the other plurality of color data structures; generate a plurality of element data structures, wherein each of the plurality of element data structures represents a different element than any of the other plurality of element data structures; generate a plurality of item data structures, wherein each of the plurality of item data structures represents a physical item and is associated with at least one of the plurality of color data structures, at least one of the plurality of element data structures, and an image representing the physical item; generate a graphical user interface comprising a virtual design board associated with one of a plurality of projects; via the graphical user interface, receive a selection of a color represented by one of the plurality of color data structures, and receive a selection of an element represented by one of the plurality of element data structures; identify a subset of the plurality of item data structures that are associated with both the one color data structure representing the selected color and the one element data structure representing the selected element; and populate the virtual design board with thumbnails of the images associated with the identified subset of item data structures. The at least one hardware processor may be selected from a plurality of hardware processors in a cloud-based platform based on a current demand for the graphical user interface.

The virtual design board may comprise, for each of the identified subset of item data structures, an input that, when selected, associates the item data structure with the one project. The method may further comprise using the at least one hardware processor to: receive a configuration for at least one payment gateway; automatically generate an invoice based on a cost associated with each of the item data structures associated with the one project; and interface with the at least one payment gateway, based on the configuration, to complete one or more payments of the invoice through the graphical user interface. The method may further comprise using the at least one hardware processor to, while the item data structure is associated with the one project: determine a time period associated with the one project based on a time of an event associated with the one project and a preparation time of the event, and reserve a quantity of the item, represented by the item data structure, in an inventory management system, for the determined time period.

The graphical user interface may comprise a first set of screens for a user of a business account and a second set of screens for a user of a client account, wherein the second set of screens is different from the first set of screens. The first set of screens may comprise a clients screen and a projects screen, wherein the clients screen comprises a list of data objects, representing clients, for all clients that are managed by the user of the business account, wherein the projects screen comprises a list of data objects, representing projects, for all projects that are managed by the user of the business account, and wherein each list of data objects comprises, for each data object, an input for editing the data object and an input for deleting the data object. Both the first set of screens and the second set of screens may comprise a project-details screen, wherein the project-details screen comprises one or more inputs for specifying project information that defines the one project that is managed by the business account for the client account. The project information may comprise table details, and both the first set of screens and the second set of screens may comprise a table-list screen, wherein the table-list screen comprises one or more inputs for defining a plurality of tables for an event represented by the one project. The project-details screen in the first set of screens may comprise one or more inputs for toggling one or more data in the project information between locked and unlocked, wherein, when the one or more data are unlocked, the client user can alter the one or more data in the project-details screen in the second set of screens, and wherein, when the one or more data are locked, the client user cannot alter the one or more data in the project-details screen in the second set of screens. The project-details screen may comprise one or more inputs for uploading media to be associated with the one project, and the method may further comprise using the at least one hardware processor to, whenever a medium is uploaded, associate a first copy of the medium with the one project in a project database and automatically store a second copy of the medium in a library associated with a user that uploaded the medium.

The graphical user interface may comprise a screen comprising the virtual design board, a color input for selecting any set of one or more colors represented by a subset of the plurality of color data structures, and an element input for selecting any set of one or more elements represented by a subset of the plurality of element data structures, and the identified subset of the plurality of item data structures may comprise all of the plurality of item data structures that are associated with at least one color data structure in the subset of color data structures and at least one element data structure in the subset of element data structures.

At least one of the plurality of item data structures may represent a physical composite item that is an assembly of a plurality of physical constituent items, wherein the at least one item data structure is associated with two or more other item data structures representing the plurality of physical constituent items. Each of the two or more item data structures may be associated with a preparation instruction, and the method may further comprise using the at least one hardware processor to: automatically generate a preparation list that comprises the preparation instruction associated with each of the two or more item data structures; and associate the preparation list with the at least one item data structure representing the physical composite item. The method may further comprise using the at least one hardware processor to generate a logistics report comprising the preparation list associated with the at least one item data structure representing the physical composite item.

The graphical user interface may comprise a contract screen, wherein the contract screen comprises an input for selecting one of a plurality of contract templates, and wherein each contract template comprises a starting portion, an ending portion, and one or more contract terms, and the method may further comprise using the at least one hardware processor to: automatically populate the contract template with data associated with the one project to produce a complete contract; and store an executed version of the complete contract in association with the one project.

The graphical user interface may comprise a notepads screen, wherein the notepads screen comprises an input for adding a virtual notepad to the one project based on a notepad template, and the method may further comprise using the at least one hardware processor to: receive a selection of a virtual notepad that has been added to the one project; in response to receiving the selection of the virtual notepad, update the notepads screen to comprise one or more inputs for editing a content of the virtual notepad; and, after receiving edited content of the virtual notepad, save the virtual notepad, with the edited content, in association with the one project.

The method may further comprise using the at least one hardware processor to record communications between users of a business account, which manages the one project for a client account, and a user of the client account, wherein the graphical user interface comprises an interactions screen that comprises a representation of each communication associated with the one project.

The method may further comprise using the at least one hardware processor to: provide access to the graphical user interface to a plurality of users based on roles associated with the plurality of users, wherein each of the plurality of users is associated with one of the plurality of color data structures; generate a plurality of task data structures, wherein each of the plurality of task data structures is associated with the one project and one of the plurality of users, and wherein each of the plurality of task data structures represents an assigned task for the one project; and color code each representation of a task in the graphical user interface according to the color represented by the one color data structure associated with the one user associated with the task data structure representing the task.

The method may further comprise using the at least one hardware processor to: provide access to the graphical user interface to a plurality of users based on roles associated with the plurality of users, wherein each of the plurality of users is associated with one of the plurality of color data structures; generate a plurality of interaction data structures, wherein each of the plurality of interaction data structures is associated with the one project and one of the plurality of users, and wherein each of the plurality of interaction data structures represents an assigned interaction for the one project; and color code each representation of an interaction in the graphical user interface according to the color represented by the one color data structure associated with the one user associated with the interaction data structure representing the interaction.

The method may further comprise using the at least one hardware processor to: receive client data for the one project; extract a feature vector from the client data; apply a machine-learning algorithm, which has been trained on labeled feature vectors to predict project information, to the extracted feature vector to automatically populate a project data structure, representing the one project, with predicted project information.

Any of the disclosed methods may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for data structures, graphical user interfaces, and computer-implemented processes for automating and otherwise facilitating various aspects of project management. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

1.1. Infrastructure

Figure 1:
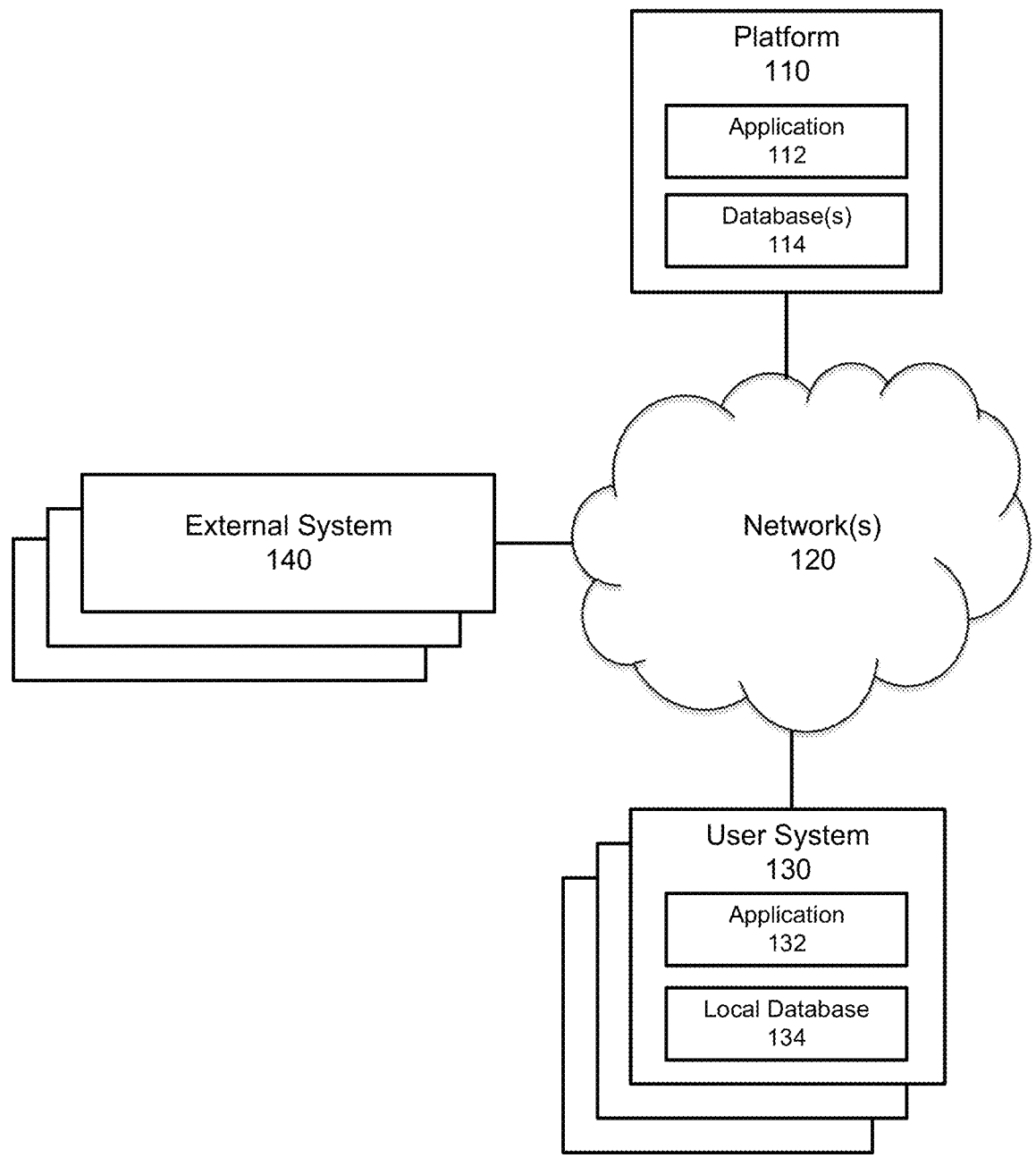
FIG. 1 illustrates an example infrastructure, in which one or more of the processes described herein, may be implemented, according to an embodiment.

FIG. 1 illustrates an example infrastructure in which a disclosed software application may operate, according to an embodiment. The software application may implement all or a subset of the functions disclosed herein, including management (e.g., generation, storage, retrieval, deletion, garbage collection, etc.) of the data structures, generation (e.g., of dynamic components) and/or storage (e.g., of static components) of the graphical user interfaces, and execution of the processes. The disclosed application may be entirely server-based (e.g., in the cloud), entirely client-based, and/or distributed so as to comprise both a server application and a client application.

The infrastructure may comprise a platform 110 (e.g., one or more servers) which hosts and/or executes one or more of the various functions (e.g., implemented as software modules executing a process or method) described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 (e.g., as at least a portion of the disclosed application) and/or one or more databases 114. In addition, platform 110 may be communicatively connected to one or more user systems 130 via one or more networks 120. Platform 110 may also be communicatively connected to one or more external systems 140 (e.g., other platforms, websites, etc., such as a vendor platform, social media platform, scheduling platform such as Calendly™, Acuity™, Schedulicity™, etc.) via one or more networks 120. The disclosed application may interface with each external system 140 via an application programming interface (API).

Network(s) 120 may comprise the Internet, and platform 110 may communicate with user system(s) 130 and external platform(s) 140 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones or mobile devices, servers, game consoles, televisions, set-top boxes, electronic kiosks, point-of-sale terminals, and/or the like. However, user system(s) 130 are generally contemplated to comprise the personal computing devices (e.g., desktop computer, laptop computer, tablet computer, smart phone, etc.) of the various users of the disclosed application.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and/or the like, including elements comprising or derived from data stored in one or more databases (e.g., database(s) 114) that are locally and/or remotely accessible to platform 110. It should be understood that platform 110 may also respond to any other requests from user system(s) 130, which may be related or unrelated to the graphical user interface.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to or retrieve data stored in database(s) 114. For relational database structures, any suitable database management system may be utilized, including without limitation MySQL™, Oracle™ IBM™, Microsoft SQL™, Access™, PostgreSQL™, and the like, including cloud-based and/or proprietary database management systems. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132 executing on one or more user system(s) 130 may interact with a server application 112 executing on platform 110 to implement one or more of the functions described herein.

Client application 132 may be "thin," in which case processing is primarily carried out server-side by server application 112 on platform 110, or omitted altogether, in which case processing is entirely carried out server-side by server application 112 on platform 110. A basic example of a thin client application is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the disclosed application, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules that implement one or more of the functions described herein. In embodiments in which the application comprises client application 132, client application 132 may be a mobile app that is acquirable via an online store (e.g., the App Store by Apple™, Google Play™, etc.) for execution on a mobile device as user system 130.

1.2. Example Processing Device

Figure 2:
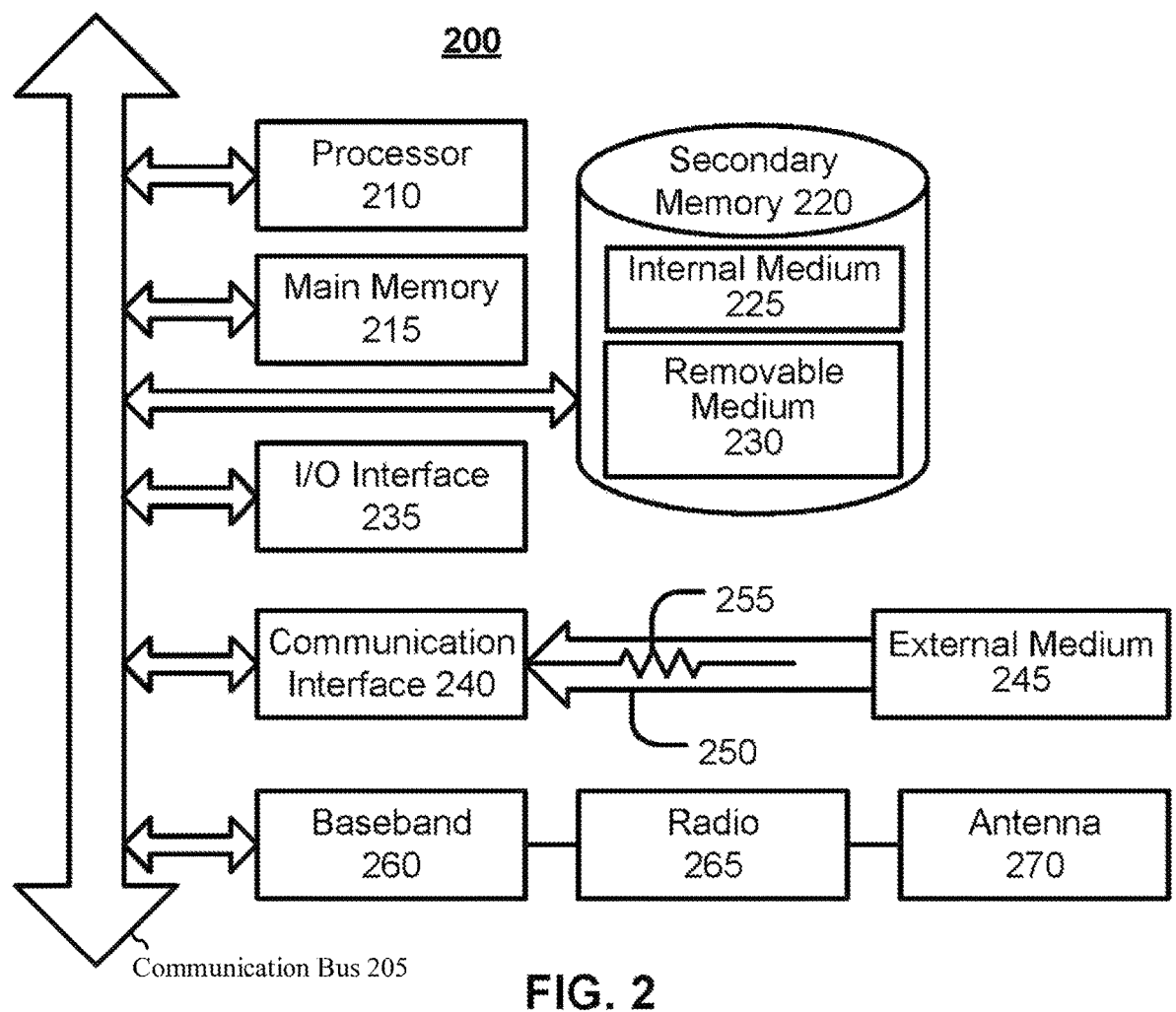
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used to implement one or more of the functions described herein (e.g., to store and/or execute the disclosed application or one or more software modules of the disclosed application), and may represent components of platform 110, user system(s) 130, external system(s) 140, and/or other processing devices described herein. System 200 can be a server or any conventional personal computer or mobile device, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., one or more software modules of the disclosed application) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or one or more software modules of the disclosed application) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or one or more software modules of the disclosed application) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

1.3. Example Cloud Computing Environment

In an embodiment, platform 110 may be implemented using cloud computing. Specifically, server application 112 may be stored using shared storage and/or executed using shared memory and processors. Thus, server application 112 may scale up or down, as needed, by using an appropriate proportion of the shared resources, while other applications and/or platforms utilize their own proportions of the shared resources. Advantageously, cloud computing is generally highly scalable, reliable, fast, and inexpensive.

For example, the cloud computing environment may be implemented using Amazon™ Web Services (AWS). AWS separates processing, data storage, and database services, so that all can be independently scaled. A primary cloud instance can be specified with high availability, and a synchronous secondary cloud instance can be specified for use as a fail-over when there are problems with the primary cloud instance. AWS also provides standard security protocols to prevent unauthorized access to each service.

Amazon™ Elastic Compute Cloud (EC2) may be used to execute the disclosed application. EC2 Auto Scaling may be used to ensure that the correct number of EC2 instances is available to handle the load for the application. For example, collections of EC2 instances, called Auto Scaling groups, may be created. The minimum number of instances in each Auto Scaling group may be specified, and the Auto Scaling may help ensure that the Auto Scaling group never goes below this specified size or number of instances. In addition, scaling policies may be specified to enable the Auto Scaling to automatically launch and terminate EC2 instances as the demand on the application increases or decreases.

Data storage for the application may be provided by Amazon™ Simple Storage Service (S3). S3 enables the creation of personalized buckets for data storage of any size. Any number of data objects may be stored in an S3 bucket, and retrieved as needed using appropriate communication and security protocols. The stored data objects may be retrieved using standard interfaces, such as Restful State Transfer (REST), Simple Object Access Protocol (SOAP), and/or the like.

Amazon™ Relational Database Service (RDS) may be used to structure the data stored by platform 110 in the data storage (e.g., S3). RDS is a web service that makes it easy to set up, operate, and scale a relational database in the cloud data storage. It provides a cost-efficient, resizable capacity for an industry-standard relational database and manages common database administration tasks, such as backups (automated or manual), software patching, automated failure detection, recovery, and/or the like. Thus, any of the data described herein, as well as other data managed by platform 110, may be stored in a relational database using RDS.

1.4. Messaging Gateways

In an embodiment, platform 110 may comprise or interface with one or more messaging gateways. The messaging gateway(s) may be used to send any of the notifications, reminders, or other messages described herein. For example, the messaging gateway(s) may comprise a Short Message Service (SMS) and/or Multimedia Messaging Service (MMS) gateway for transmitting text or multimedia messages, respectively, a Simple Mail Transfer Protocol (SMTP) server for sending email messages, and/or the like. Recipients of such notifications may be, but are not required to be, users of platform 110. For example, an SMS or MMS gateway may be used to transmit a message to any individual for whom a mobile number has been specified, regardless of whether or not that individual has a user account with platform 110. Similarly, an SMTP server may be used to transmit a message to any individual for whom an email address has been specified, regardless of whether or not that individual has a user account with platform 110.

Alternatively or additionally, the notifications, reminders, or other messages described herein may be conveyed to users with accounts on platform 110 via a dashboard of a graphical user interface generated by the application. The application may highlight new and/or unread messages and/or sort messages chronologically in the dashboard, so that the user can easily determine what messages remain to be reviewed and/or were recently received. It should be understood that these dashboard messages may be provided in conjunction with SMS, MMS, email, or other types of messages.

2. Graphical User Interface

Figure 3:
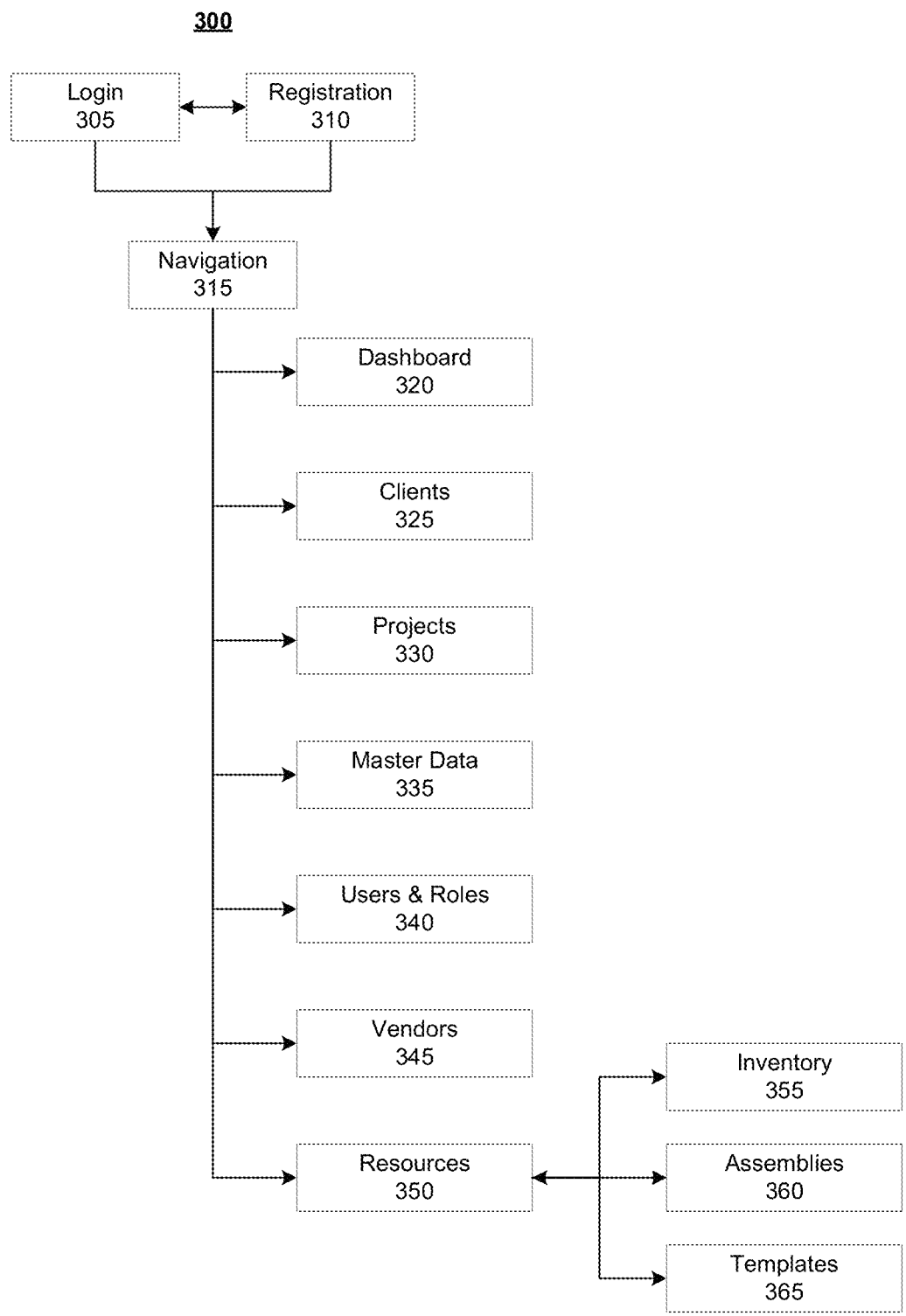
FIG. 3 illustrates a high-level diagram of a graphical user interface, according to an embodiment.

FIG. 3 illustrates a high-level diagram of a graphical user interface 300 of the disclosed application, according to an embodiment. Graphical user interface 300 provides access to the various front-end processes disclosed herein. While the screens of graphical user interface 300 will be described with respect to a particular arrangement, it should be understood that other arrangements of the disclosed screens are possible. It should also be understood that graphical user interface 300 may be implemented with fewer or more screens than those described herein. Furthermore, graphical user interface 300 may be arranged differently depending on the capabilities of the user system 130 that is accessing graphical user interface 300. For example, graphical user interface may appear different on a large display (e.g., a display attached to a desktop computer or integrated into a laptop computer) than on a small display (e.g., a display integrated into a mobile device, such as a smartphone or tablet computer).

In embodiments, each screen may comprise a static or dynamic webpage or a static or dynamic frame, panel, or other region within a webpage. Thus, the fact that various screens may be individually described herein, does not mean that each screen is separate and distinct from the other screens. Rather, a webpage may comprise two or more screens or may consist of only a single screen, depending on the particular design goals for the application. Also, even though a screen may be described as a single screen, it should be understood that a screen, as described herein, may comprise any number of distinct screens (e.g., one, two, three, etc.), including, for example, a wizard comprising a plurality of sequential screens. Furthermore, each screen may correspond to a functional software module that generates the screen and/or implements one or more functions that are accessible via the screen.

In an embodiment, a user may toggle between a login screen 305 and a registration screen 310. Once a user authenticates with platform 110 (e.g., via login screen 305 or following successful completion of registration via registration screen 310), the application provides the user with access to internal screens of the graphical user interface. In the illustrated embodiment, these internal screens may comprise a navigation screen 315, a dashboard screen 320, a clients screen 325, a projects screen 330, a master-data screen 335, a users-and-roles screen 340, a vendors screen 345, and a resources screen 350. One or more of these screens may also provide access to further screens. For example, in the illustrated embodiment, resources screen 350 provides access to an inventory screen 355, an assemblies screen 360, and a templates screen 365.

Not all of the screens and/or all of the data on the screens may be accessible by all of the users. Rather, different users may have access to different subsets of the screens, data, and/or other functions based on their roles (e.g., which may define a set of permissions). In this case, navigation screen 315 that a user sees may be different for different roles. Specifically, navigation screen 315 for a given user may consist of links to only the subset of screens, data, and/or other functions to which the user's role provides access.

For example, a business owner may establish a business account with the application, create an administrator role and one or more non-administrator roles, and establish one or more users of the business account (i.e., users who have access to the screens and data of the business account) according to these roles. A user with the administrator role may have access to all screens, whereas user with non-administrator roles may only have access to a subset of the screens (e.g., all screens except users-and-roles screen 340) and/or may only be able to see a subset of the data on the screens to which the user has access (e.g., only data associated with projects and/or clients to which the user is assigned or is otherwise responsible). A user of a business account may also be referred to herein as a "business user" or "team member," and a business account may also be referred to herein as simply a "business."

In addition, a client of a business may establish a client account (e.g., established by the client or by a user of the business account), which may provide access to only a subset of screens and/or only a subset of data (e.g., only data associated with the client, including projects associated with the client). In an embodiment, the client account may only be accessible by a single user. Alternatively, the client account may have roles and a plurality of users in a similar manner as a business account. In either case, a user of a client account may also be referred to herein as a "client user," and a client account may also be referred to herein as simply a "client."

While the functions of the application will be described, primarily, with respect to a single business account and one or more client accounts, the application may support a plurality of business accounts, each managing one or a plurality of client accounts. In other words, a plurality of different businesses may each individually and independently register a business account with the application, set up one or more business users with access to that business account, and manage one or more client users for that business account. Each client user may have access to a client portal for one business account or a plurality of business accounts. It should be understood that the application may maintain separate and discrete business-specific data (e.g., including the master data described herein) for each of the plurality of business accounts, and may optionally maintain a global set of data for all of the business accounts. Similarly, the application may maintain separate and discrete client-specific data for each of the plurality of client accounts, and may optionally maintain a global set of data for all of the client accounts. In addition, the application may maintain separate and discrete user-specific data for all of the various users of the application, including the business users and client users.

While examples of one or more screens will be depicted herein with specific compositions and arrangements, it should be understood that the illustrated examples are non-limiting. One or more of the depicted screens can be implemented with different compositions and arrangements, including different components (e.g., inputs, panels, frames, images, icons, labels, text, etc.) and different configurations of those components relative to each other.

2.1. Lists and Details Screens

Various screens will be described herein as comprising one or more lists of data objects. Each described list may comprise a grid format with each row representing a single data object as an "entry" in the list, and each column representing a parameter of the data objects. Each data object may be represented in memory as a data structure containing or providing references to the values of the associated parameters that define the data object. For example, each data structure may be stored in database 114 and managed by server application 112 of platform 110. Users may operate on the data objects via server application 112 by adding and/or editing the values of associated parameters using inputs of graphical user interface 300.

Each entry in each list may comprise values of a subset of the associated parameters defining the represented data objects. In the event that a user has permissions to modify the data objects, each entry may also comprise an edit input for editing the data object (e.g., changing the values of associated parameters) and/or a delete input for deleting the data object. Selection of the edit input for a data object may result in graphical user interface 300 providing a details screen (e.g., as a separate screen or as a pop-up frame overlaid on the current screen) in which all or a subset of the values of the parameters defining the selected data object may be edited via one or more inputs. In addition, any parameter values, provided in an entry in a list, that represent a communication destination (e.g., an email address, a mobile number, etc.) may be selectable (e.g., as a hyperlink) to initiate a communication to that communication destination (e.g., via a messaging gateway with which the application is interfaced).

One or more, and potentially all, of the disclosed lists may be sortable. For example, a sortable list may comprise column headers which identify the parameter represented by the column. These column headers may be selectable or associated with inputs that a user can select, to sort all of the entries in the list according to the parameter represented by the selected column (e.g., alphabetically for text, numerically for numbers, chronologically for dates, etc.). Each column may be sortable in ascending order and descending order.

In addition, one or more, and potentially all, of the disclosed lists may be associated with a search input (e.g., a textbox). A user may input one or more keywords into the search input, and graphical user interface 300 may responsively filter the associated list to only show those entries for data objects that are associated with parameters that contain or are otherwise relevant to the input keyword(s). In an embodiment, the search input may accept common search operators (e.g., "AND", "OR", "NOT", quotation marks for grouping keywords into specific phrases, etc.) and/or regular expressions. Any list may also be associated with a filter that provides inputs for selecting or specifying one or more criteria. A user may utilize these inputs to set one or more criteria, and graphical user interface 300 may responsively filter the associated list to only show those entries for data objects that satisfy the set criteria.

In addition, one or more, and potentially all, of the disclosed lists may be associated with an add input for adding a new data object to the set of data objects represented by the list. This add input may only be provided or enabled for users that have permissions for adding data objects. Selection of the add input may result in graphical user interface 300 providing a details screen (e.g., as a separate screen or as a pop-up frame overlaid on the current screen) in which the parameter values of the associated data object may be specified via one or more inputs.

As discussed above, graphical user interface 300 may comprise a details screen for one or more data objects, including any of the data objects described herein. The same or similar details screen may be provided for adding a data object (e.g., in response to user selection of an add input) as for editing a data object (e.g., in response to user selection of an edit input). It should be understood that the only difference between the details screen for adding and editing a data object, is that the details screen for editing a data object will be pre-populated with the current parameter values associated with that data object, whereas the details screen for adding a data object will generally not be pre-populated with any parameter values or will be pre-populated with default parameter values. In both cases, the details screen may comprise one or more inputs for specifying parameter values to be associated with the data object. It should be understood that, whereas the entry for a data object in a list may comprise only a subset of parameter values associated with the data object, the details screen for a data object may comprise inputs for all parameter values associated with the data object. The details screen may also comprise a save input for saving the specified parameter values in association with the data object, or alternatively, the specified parameter values may be dynamically saved in the background as they are entered. In either case, the parameter values may be saved to a data structure, representing the data object, in database 114.

2.2. Login

Login screen 305 may comprise typical inputs for authenticating a user of platform 110, such as inputs for receiving a username and password to be authenticated against previously registered user accounts. Any known authentication techniques may be used, including single-factor or multi-factor (e.g., two-factor) authentication, depending on the security goals of the application. In an embodiment, one type of user (e.g., an administrative user, business user, etc.) may be required to abide by a stronger security protocol (e.g., two-factor authentication) than another type of user (e.g., a client user) who may abide by a weaker security protocol (e.g., single-factor authentication). Login screen 305 may also comprise inputs for recovering a forgotten username and/or recovering or resetting a forgotten password using any known recovery techniques (e.g., sending the information or a reset link to the user's email address, requiring the user to answer one or more security questions, etc.).

2.3. Registration

Registration screen 310 may comprise inputs for creating a user account on platform 110. For example, registration screen 310 may comprise inputs for specifying a username (e.g., email address), setting a password, and specifying a user profile. The user profile may comprise any relevant or useful user-specific information, such as contact information (e.g., contact name, business and/or mailing address, mobile telephone number, alternate telephone number, email address, etc.), the user's role (e.g., which may be set by an administrative user), an avatar (e.g., icon or photograph) representing the user, an email signature to be used for internal messaging, user preferences or defaults, payment information (e.g., for a subscription to platform 110), and/or the like.

If the user is the owner of a company or other business, that user may also register the business with platform 110 by establishing a business account with a business profile. A single business account may be associated with one or a plurality of user accounts that may configured via users-and-roles screen 340, as discussed elsewhere herein. The business profile may be editable by a user with an "owner" or administrative role for the business. In an embodiment, the business profile comprises business-specific information, such as the business's logo, header, name, email address, website address, business and/or mailing address, telephone number(s), invoice header (e.g., to be inserted at the top of invoices issued through the application), contract header (e.g., to be inserted at the top of contracts executed via the application), proposal header (e.g., to be inserted at the top of proposals issued through the application), reports header (e.g., to be inserted at the top of reports generated by the application), header and/or footer for projected payments (e.g., to be inserted at the top and bottom of projected payments generated by the application), a link to accounting software (e.g., on an external system 140), a link to scheduling software (e.g., on an external system 140, such as Calendly™, Acuity™, Schedulicity™, which can used for clients and/or team members to schedule appointments with each other), one or more payment options (e.g., payment method name and/or identifier, a menu for selecting available payment options and specifying links to payment gateways for each available payment option that is selected, online payment instructions, etc.), and/or the like. It should be understood that the specified available payment options may be subsequently provided in a payment screen in a client user's graphical user interface 300, to enable the client user to make payments through platform 110 (e.g., via the specified payment gateway of a payment option selected by the client user). Payments may be processed by platform 110 through an API of a specified payment gateway (e.g., to an external system 140 which executes the transaction).

2.4. Navigation

Navigation screen 315 may comprise a frame that is always visible or accessible with respect to all of the other internal screens of graphical user interface 300. For example, navigation screen 315 may be a vertical menu that is fixed on a side (e.g., left side) of graphical user interface 300, a horizontal menu that is fixed on a side (e.g., top side) of graphical user interface, or an expandable/collapsible vertical menu (e.g., drop-down menu) or horizontal menu that expands in response to selection of an input (e.g., an icon in a top corner of graphical user interface 300) and collapses in response to de-selection of the input. Navigation screen 315 may comprise links (e.g., hyperlinks) to a set of internal root screens, including dashboard screen 320, clients screen 325, projects screen 330, master-data screen 335, users-and-roles screen 340, vendors screen 345, and resources screen 350, which all represent starting screens for their respective functional domains.

2.5. Dashboard

Dashboard screen 320 may comprise a graphical dashboard that provides top-level information in an easy-to-read format. Dashboard screen 320 may be the first internal screen to which a user is directed following authentication. For example, as soon as the user is authenticated, graphical user interface 300 may present dashboard screen 320 to the authenticated user, along with navigation screen 315 (e.g., as a frame overlaid on or adjacent to dashboard screen 320).

Figure 4C:
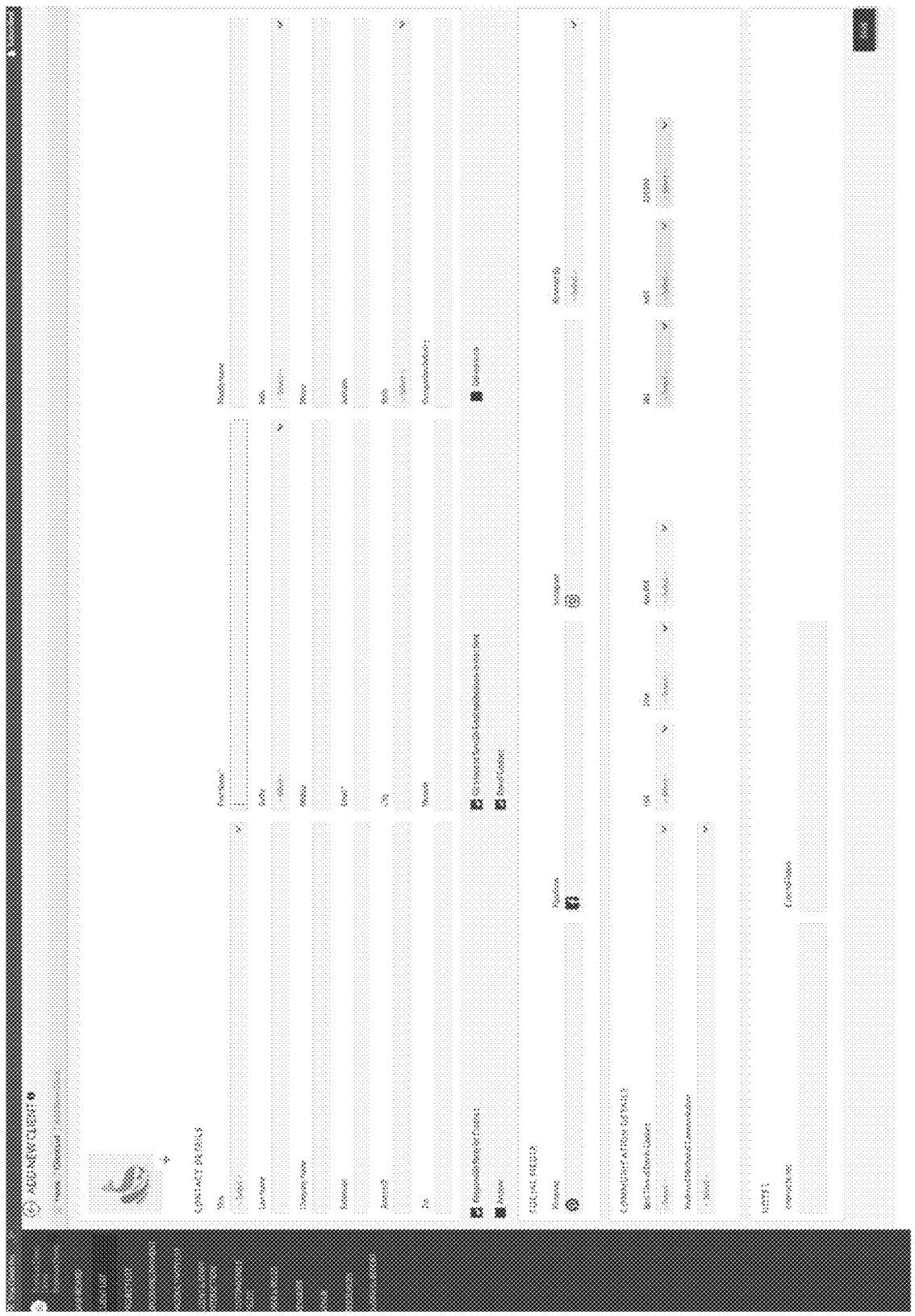
FIGS. 4A-4AZ illustrate concrete examples of various screens of a graphical user interface, according to an embodiment.
Figure 4F:
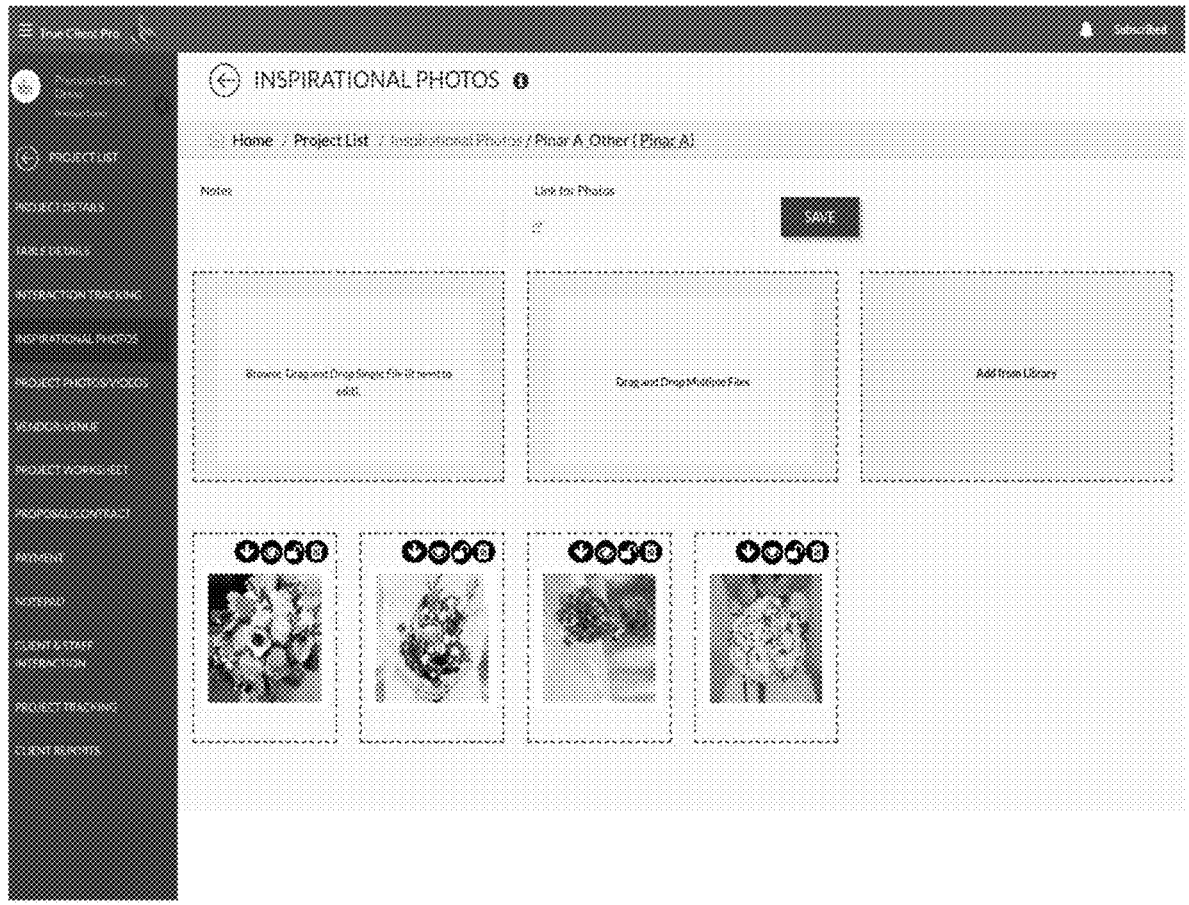
Figure 4G:
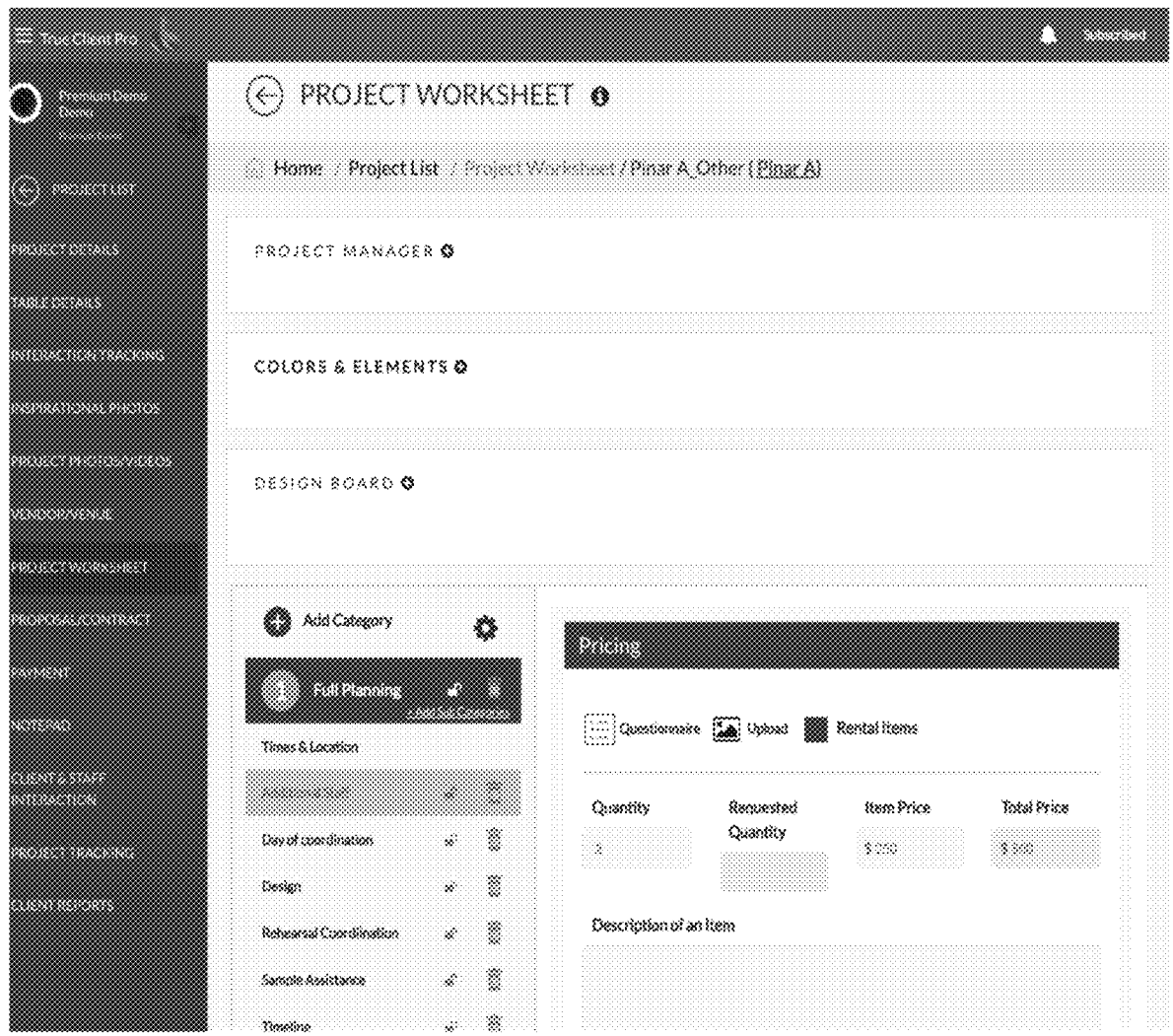
Figure 4H:
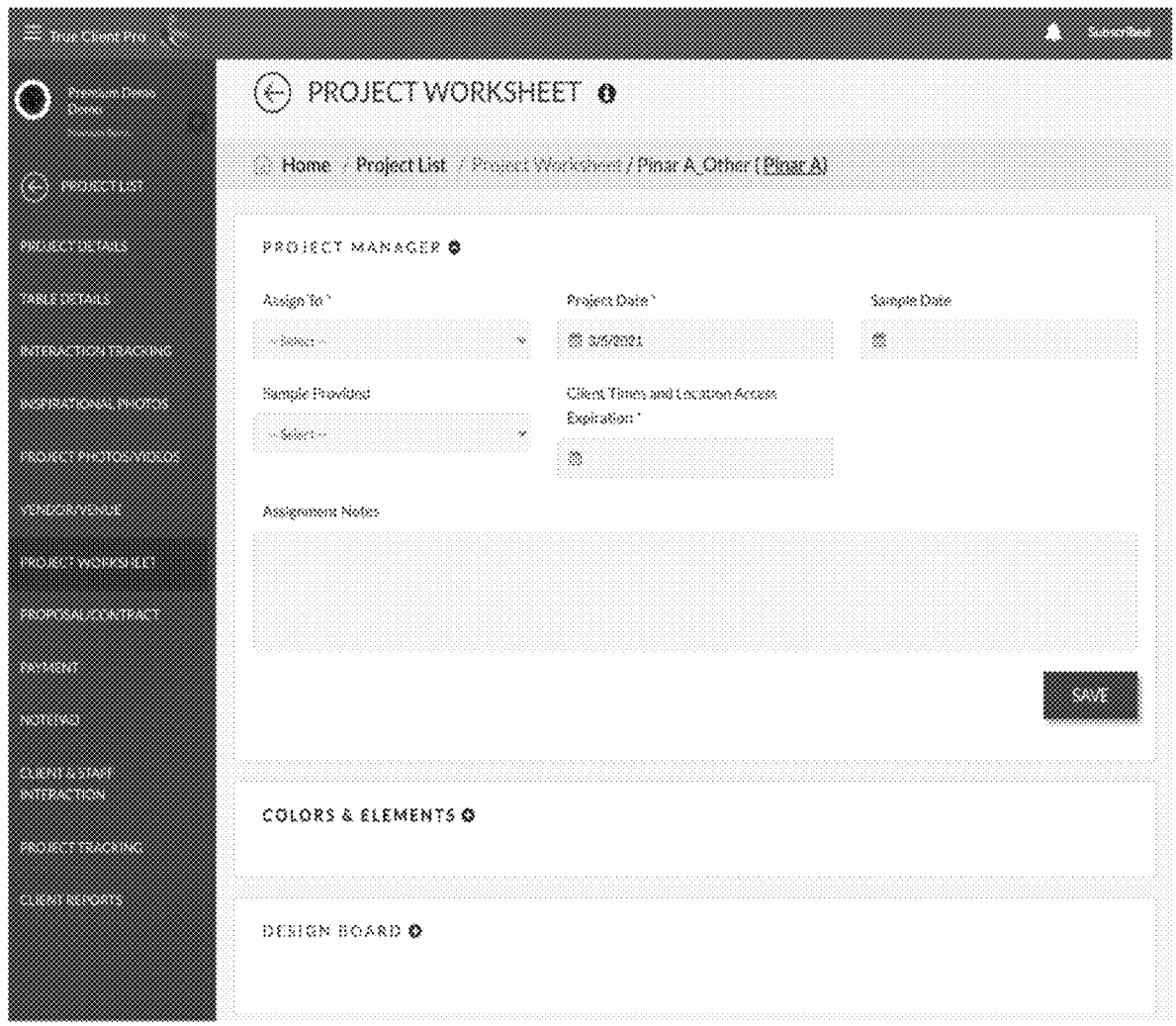
Figure 4I:
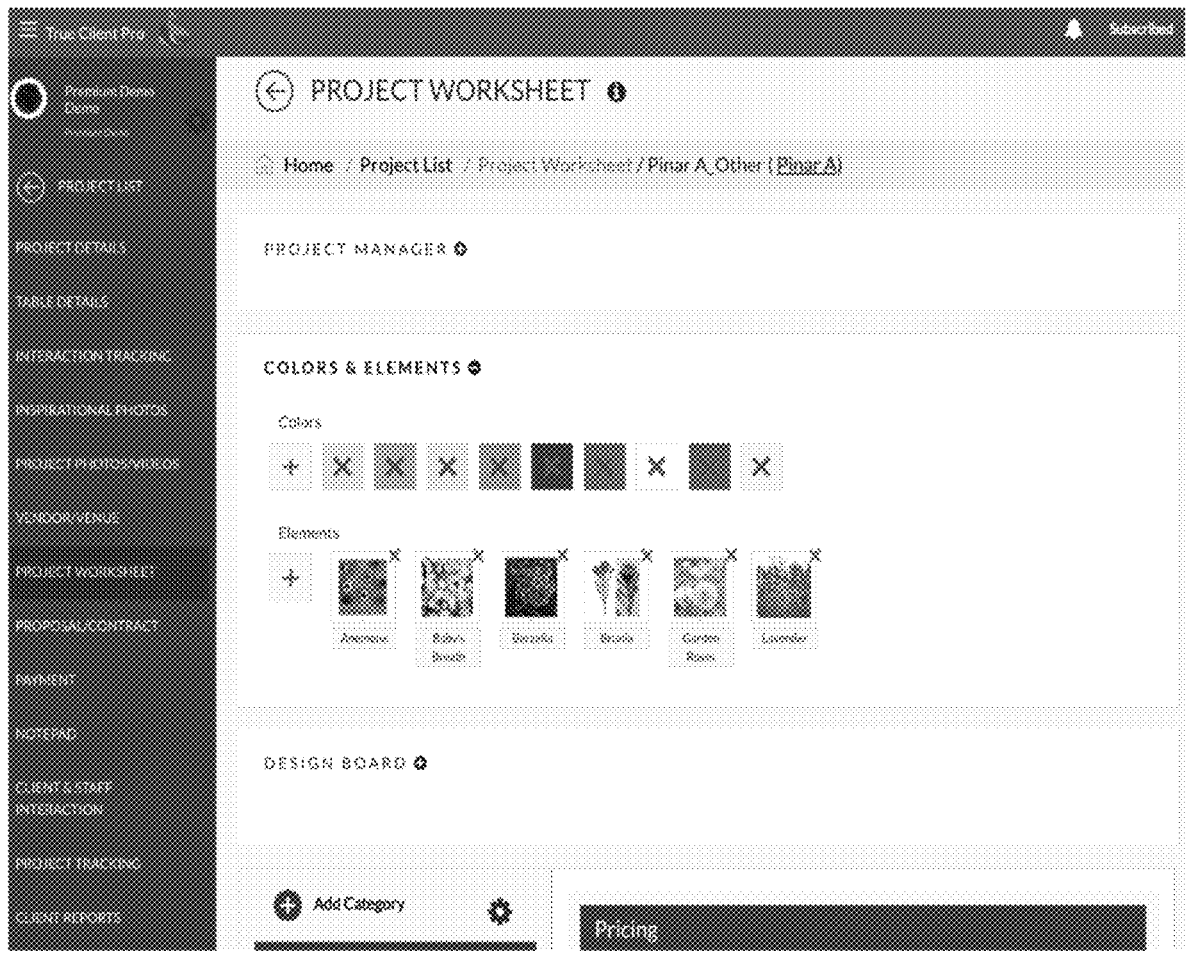
Figure 4J:
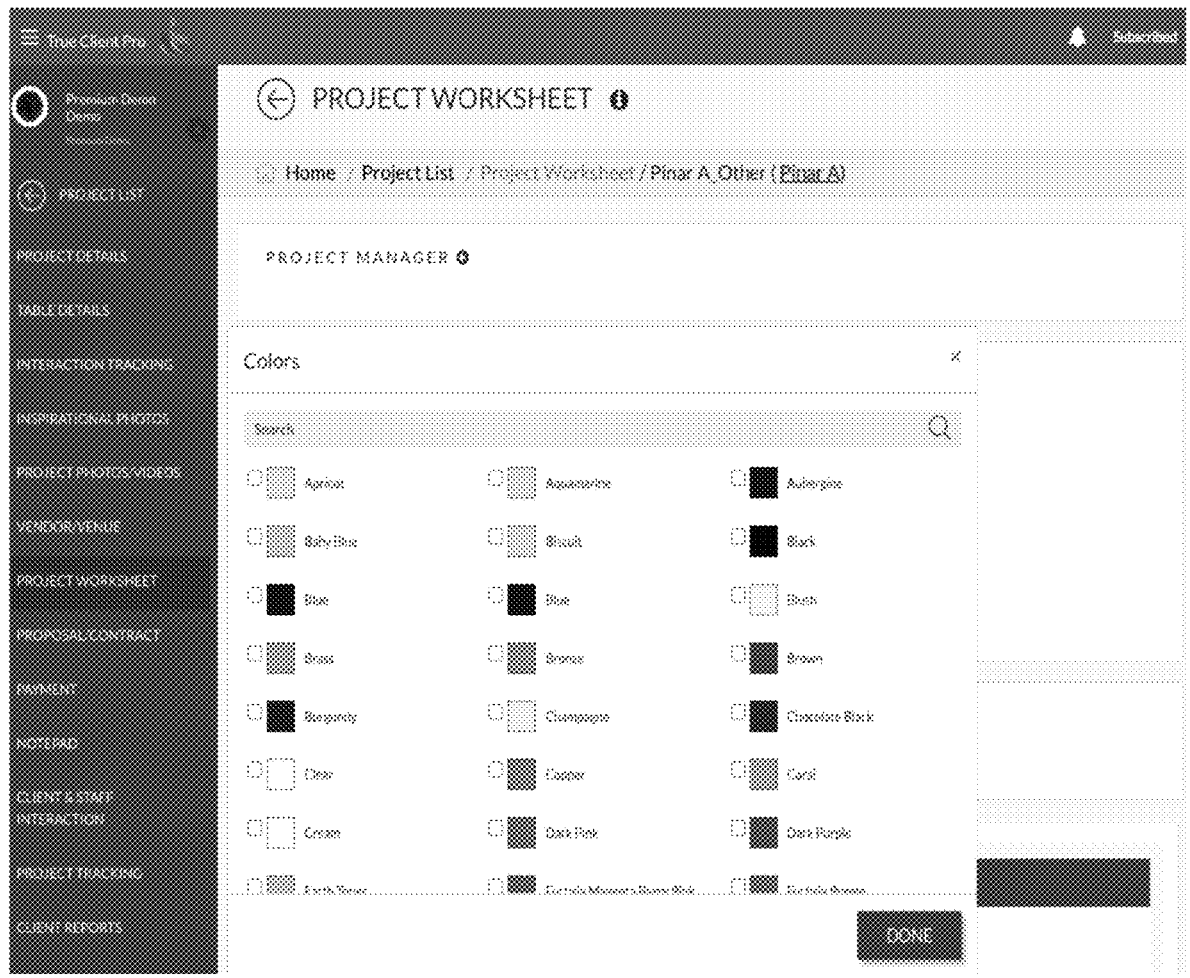
Figure 4K:
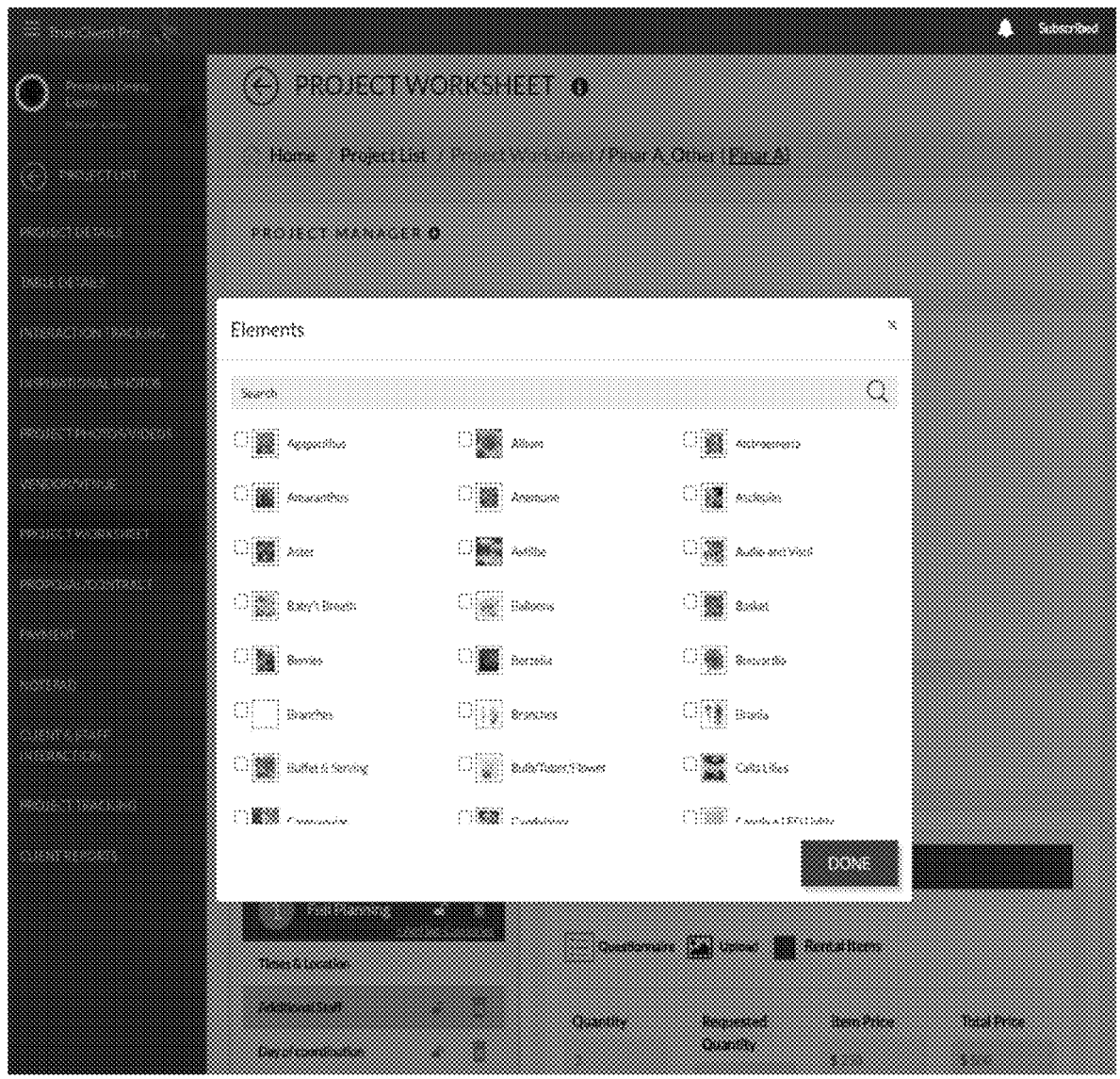
Figure 4L:
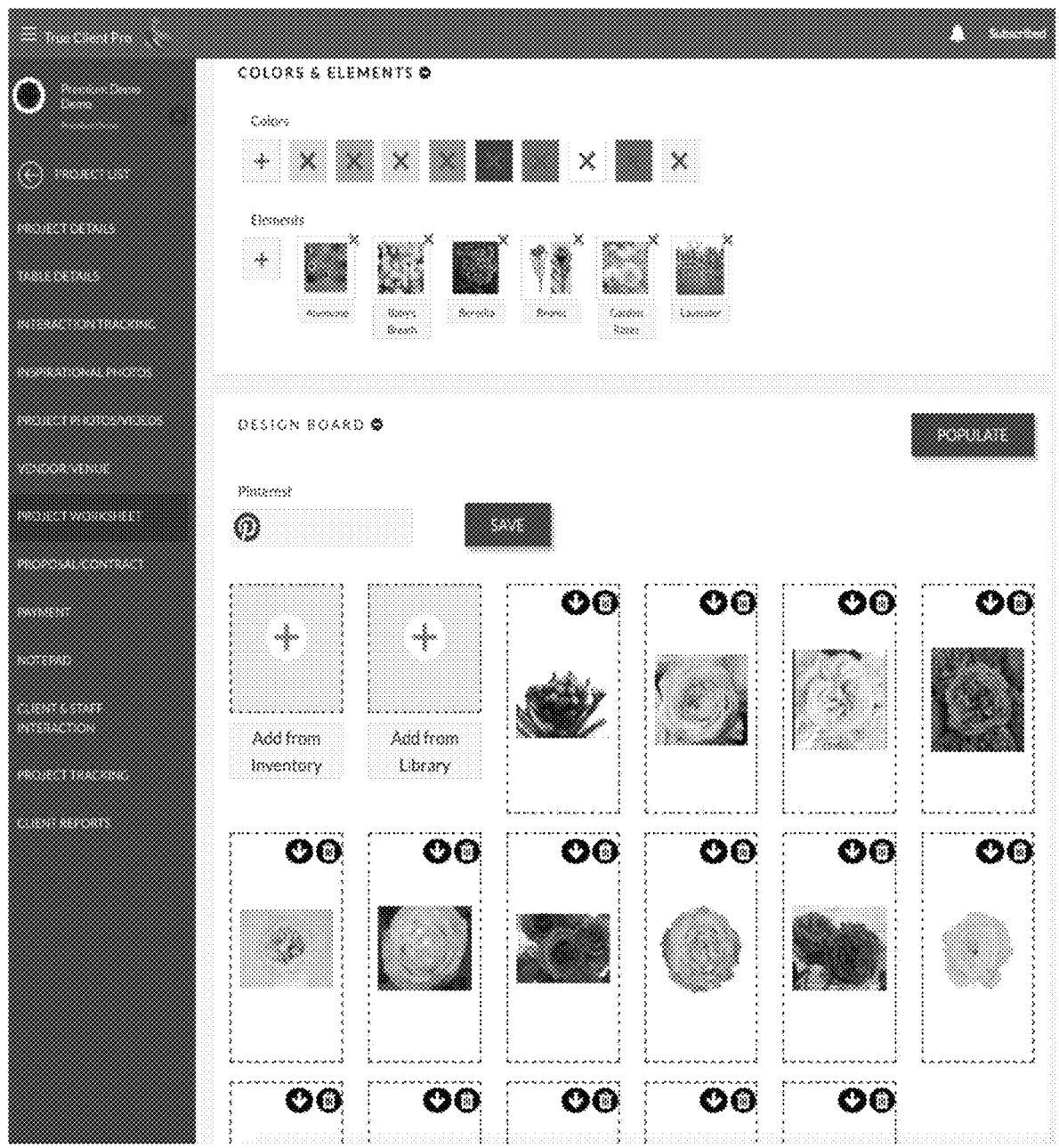
Figure 4M:
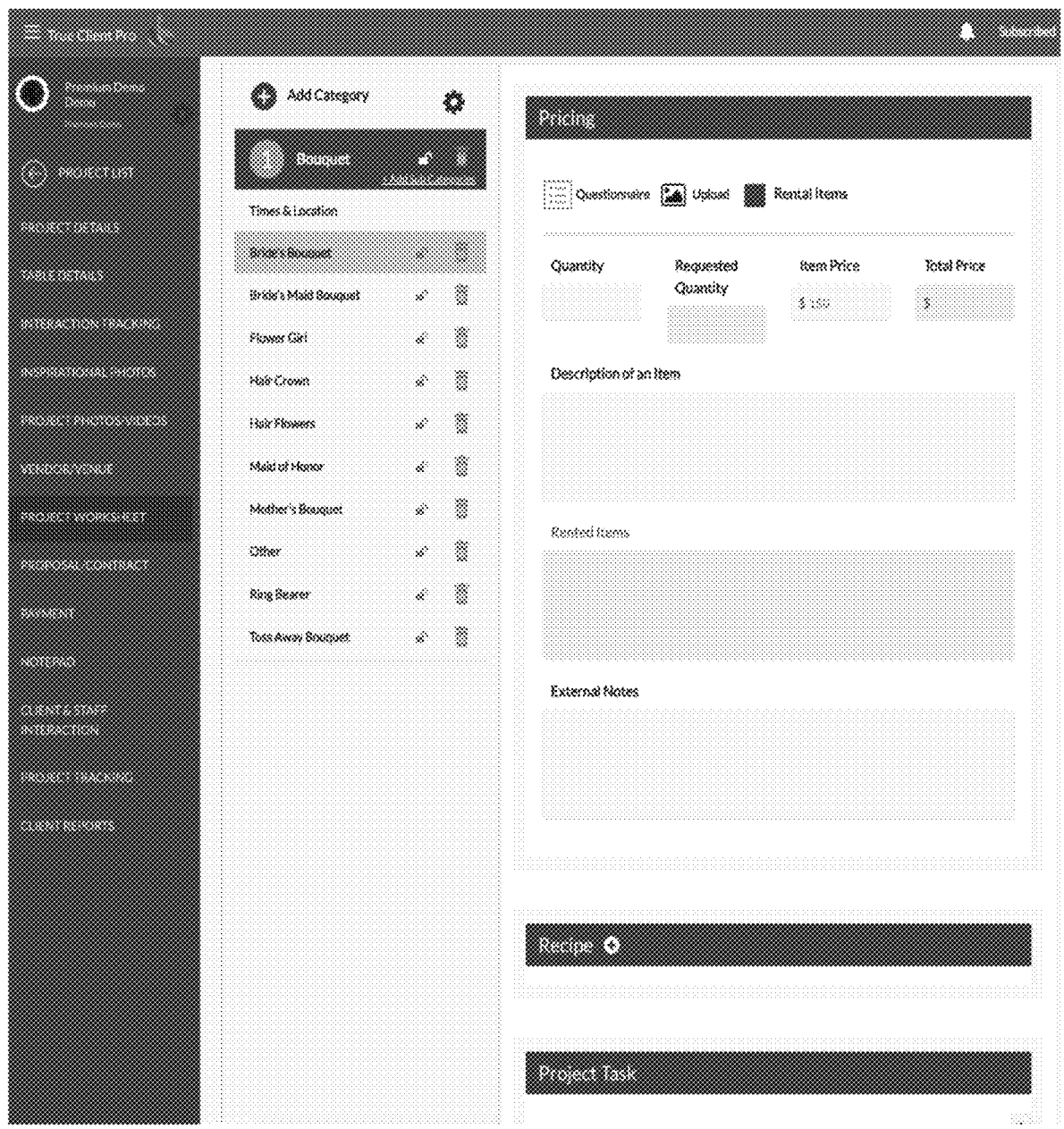
Figure 4N:
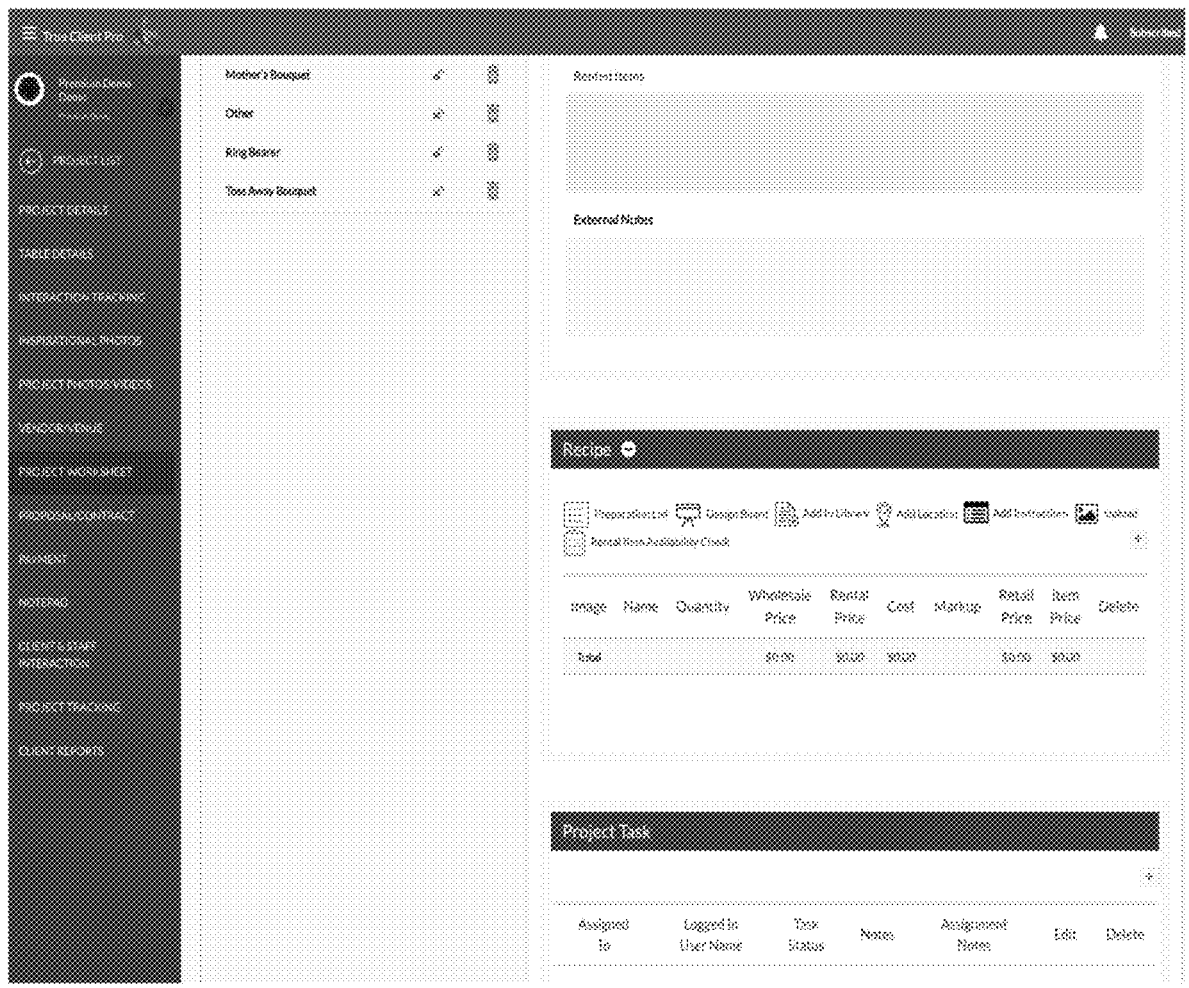
Figure 4O:
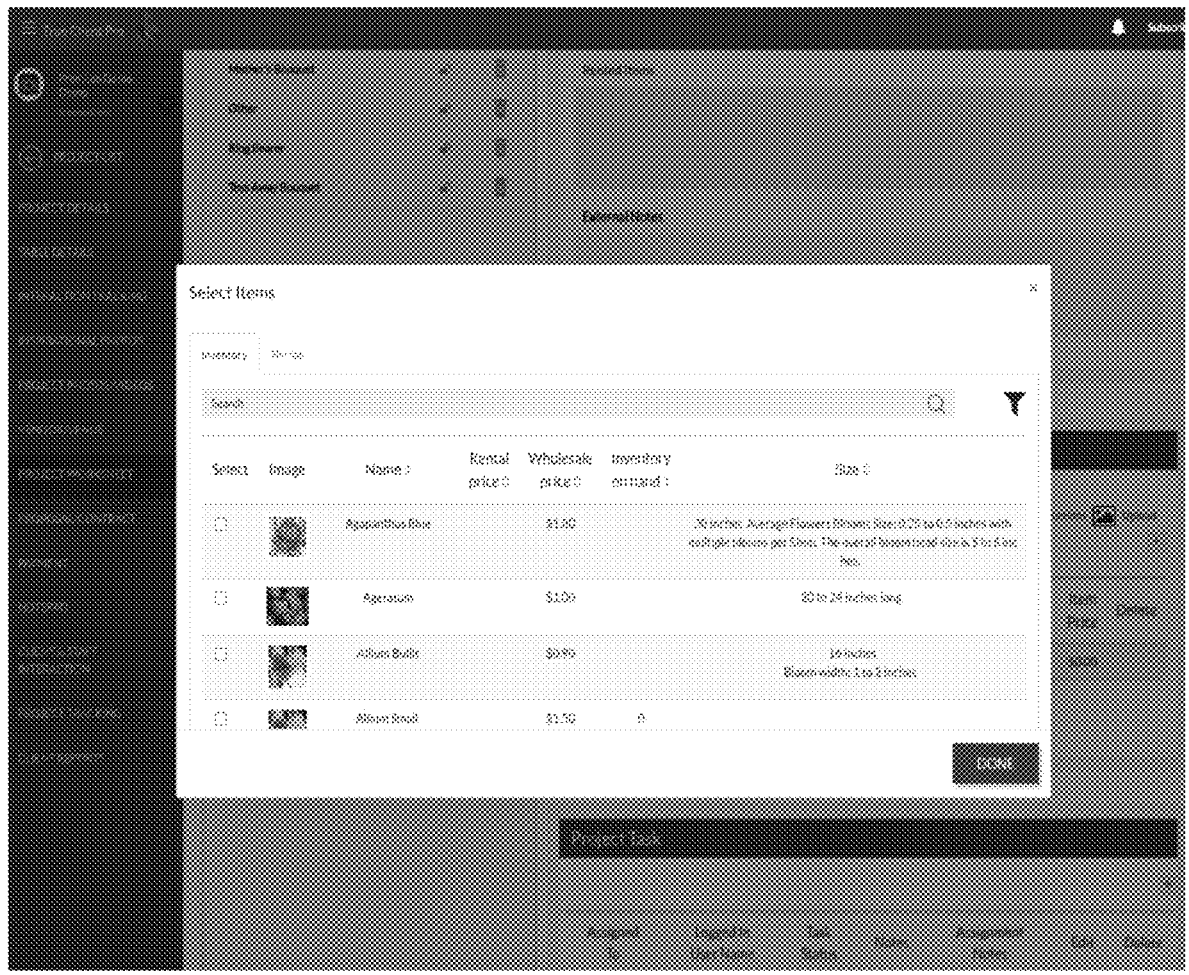
Figure 4P:
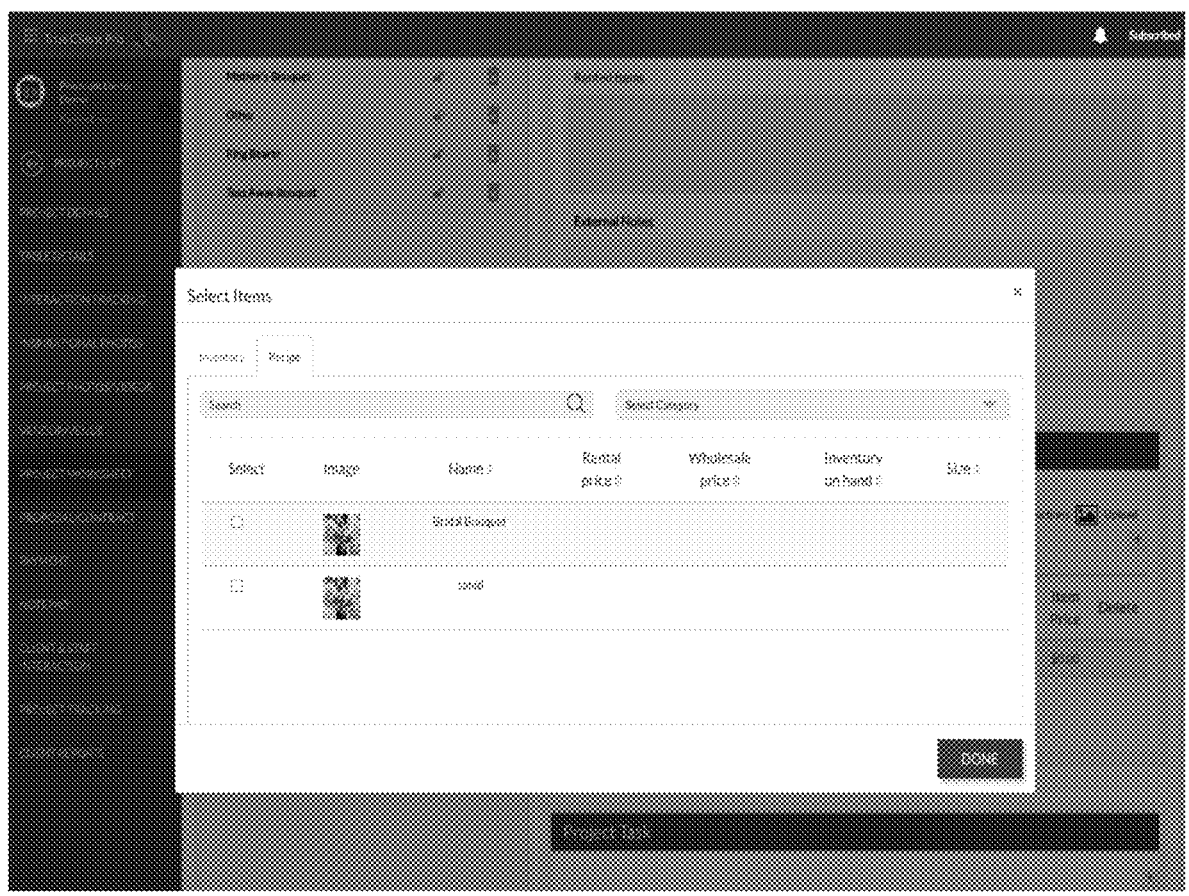
Figure 4Q:
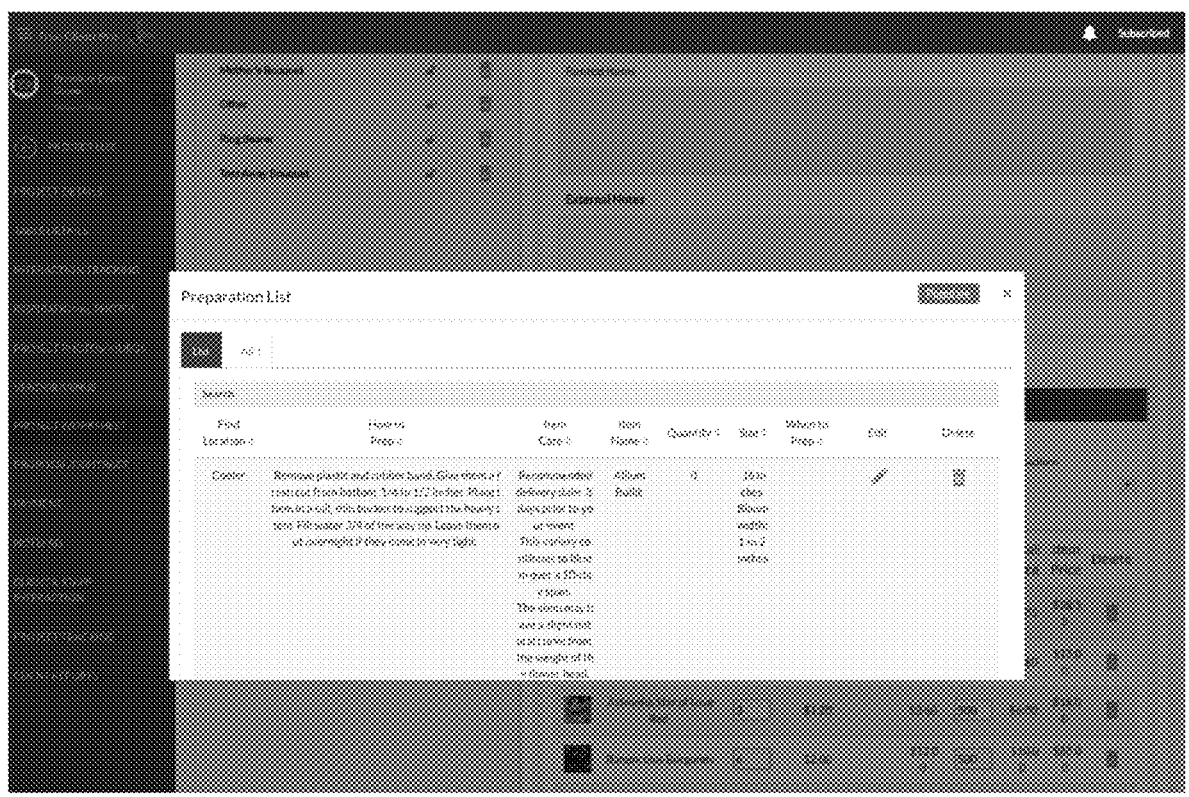
Figure 4R:
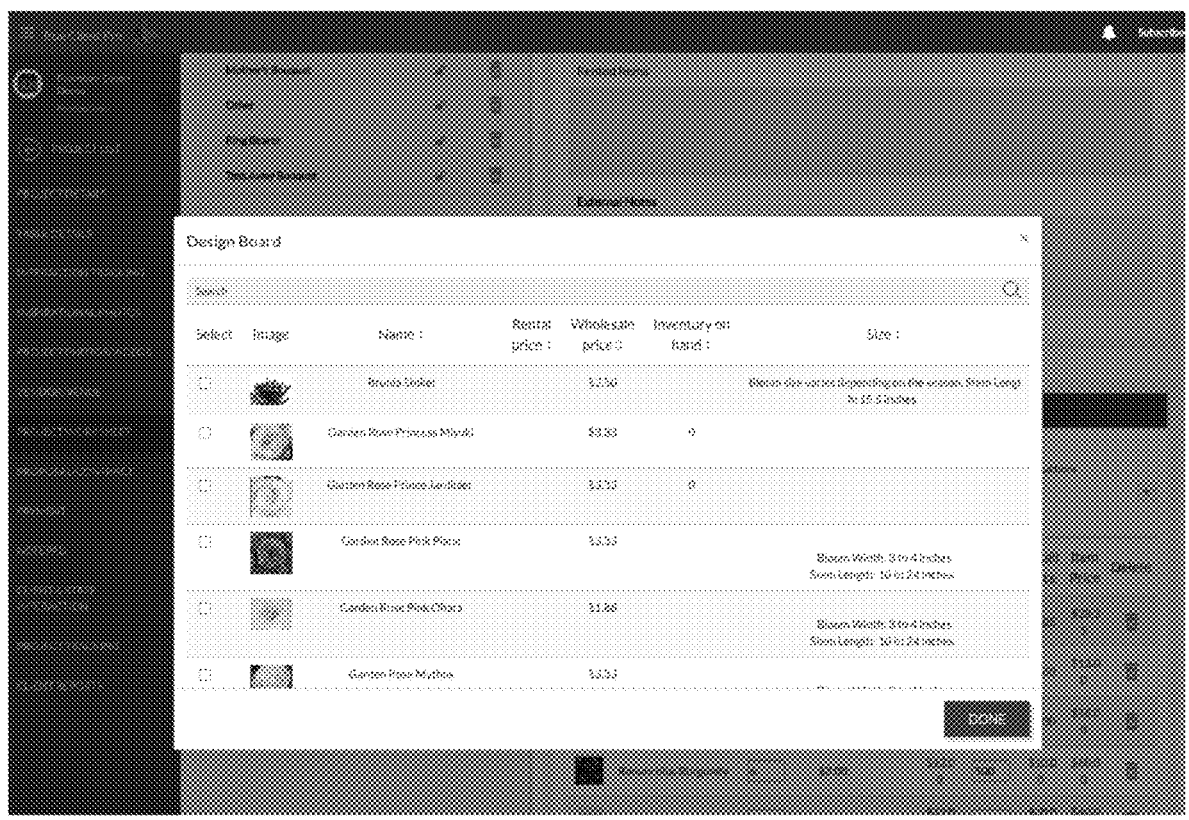
Figure 4S:
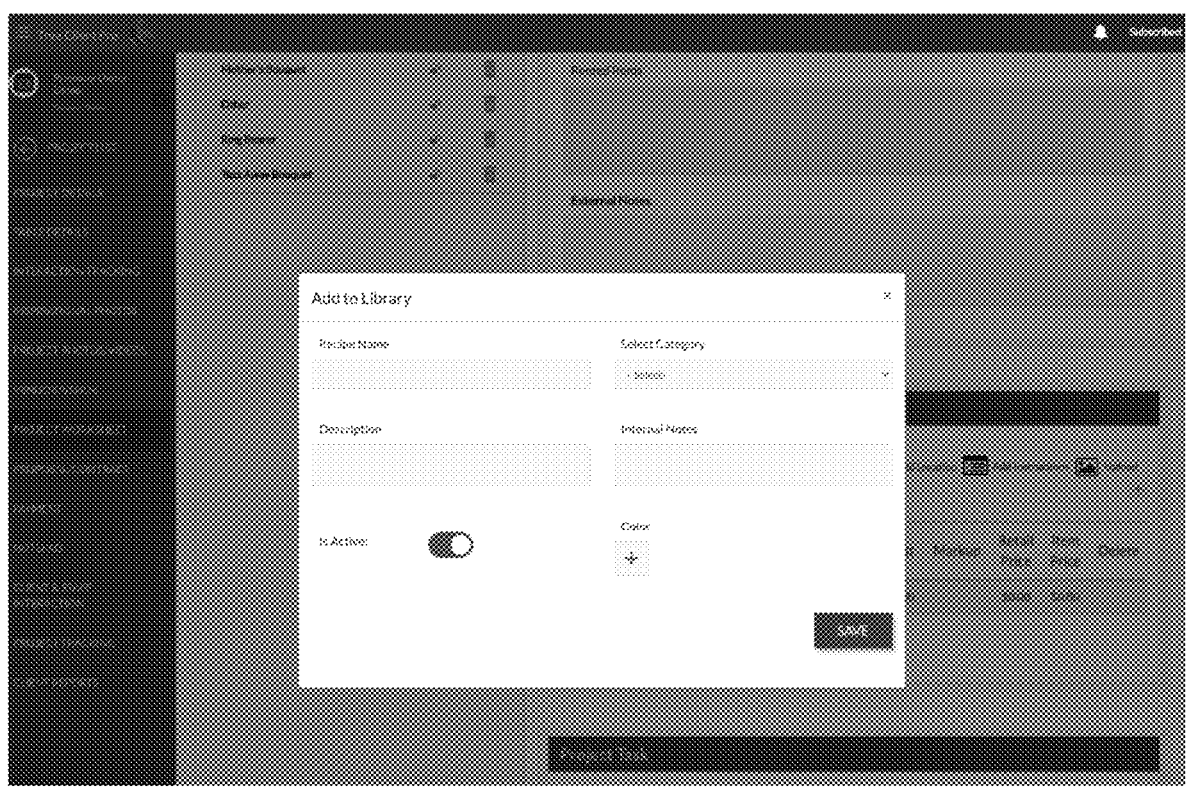
Figure 4T:
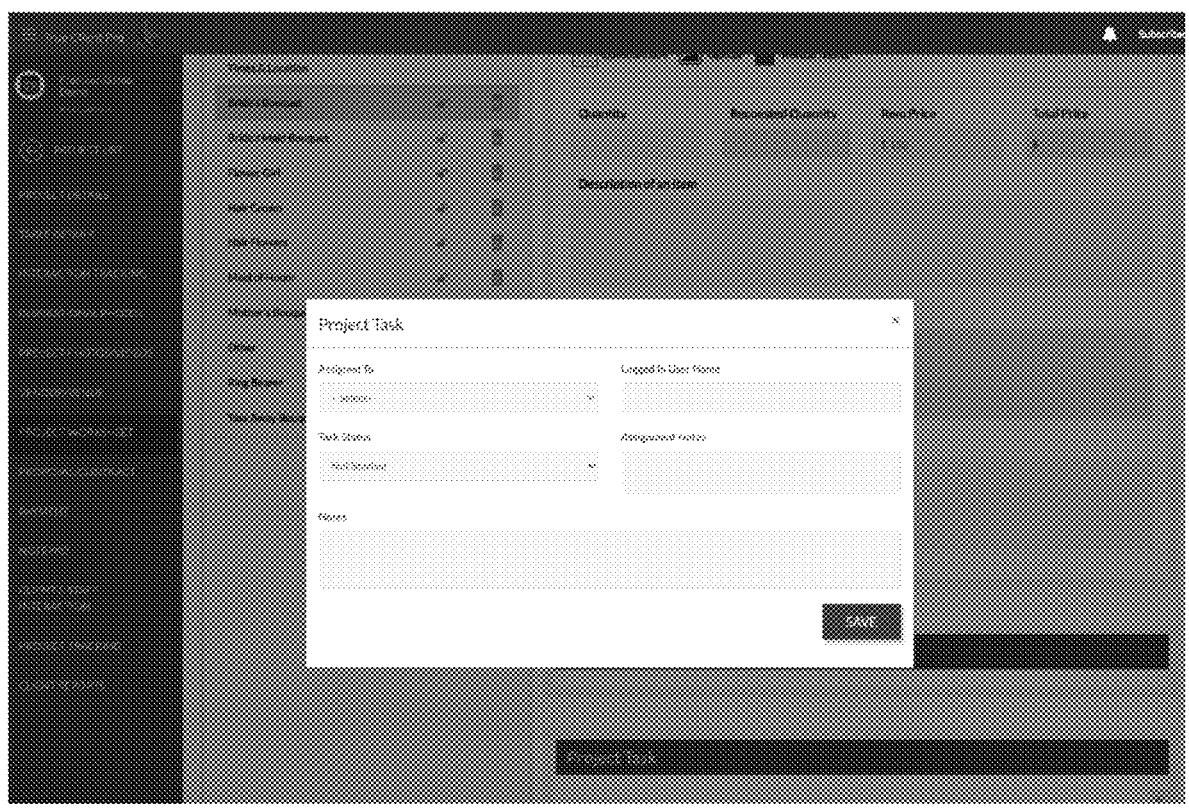
Figure 4U:
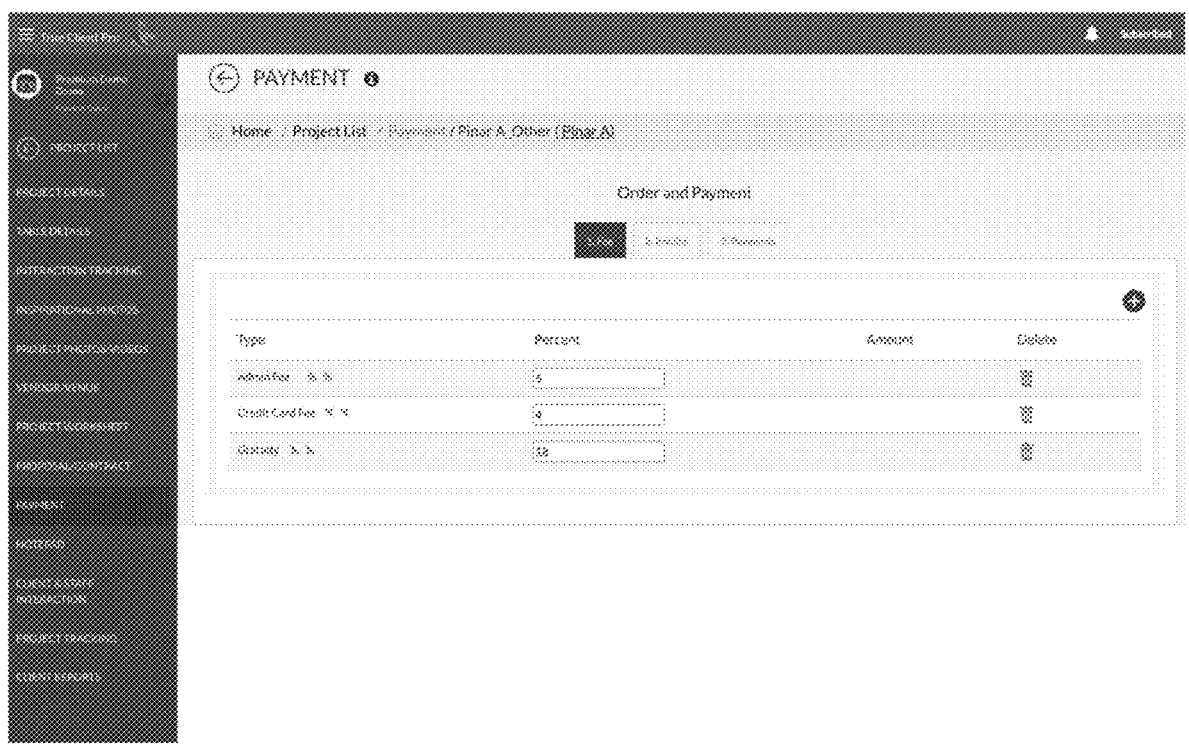
Figure 4W:
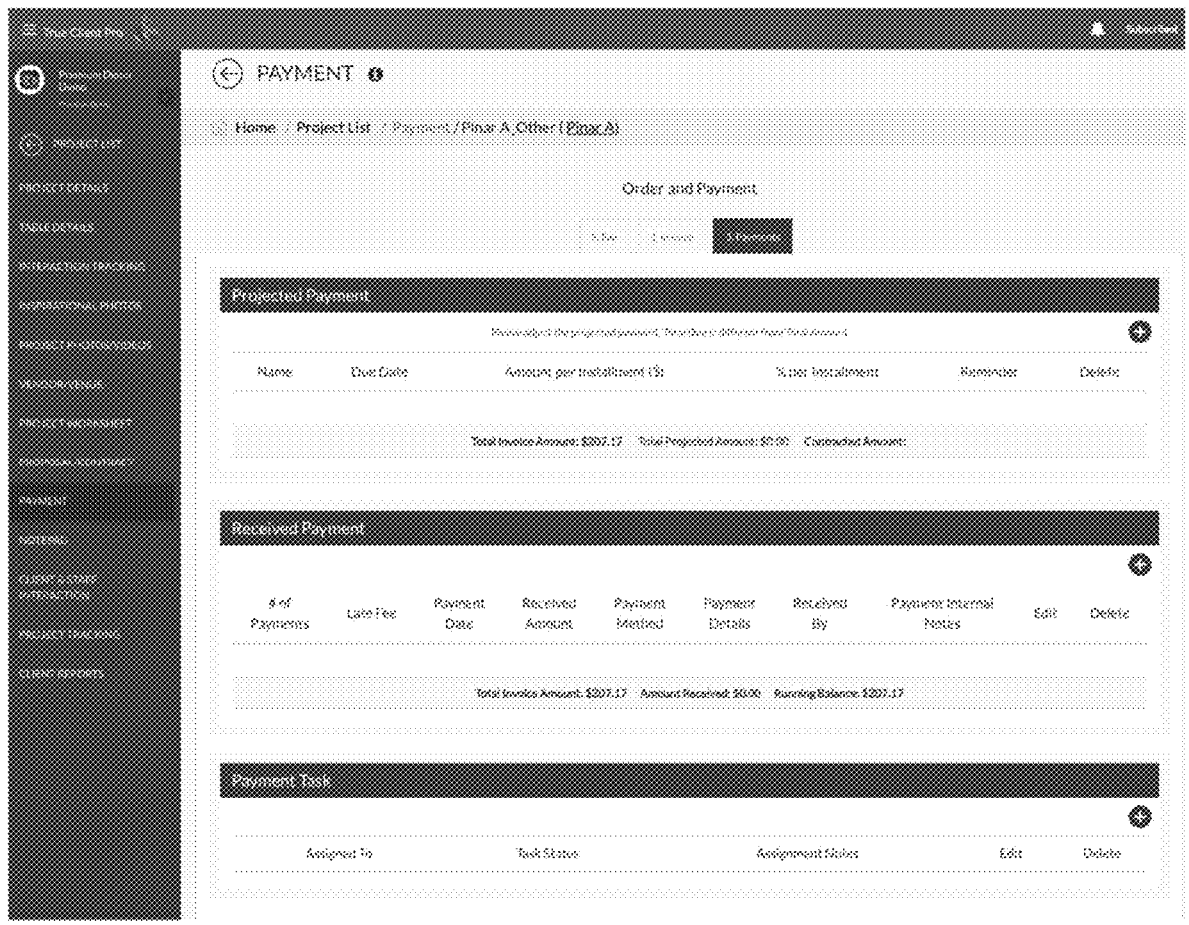
Figure 4X:
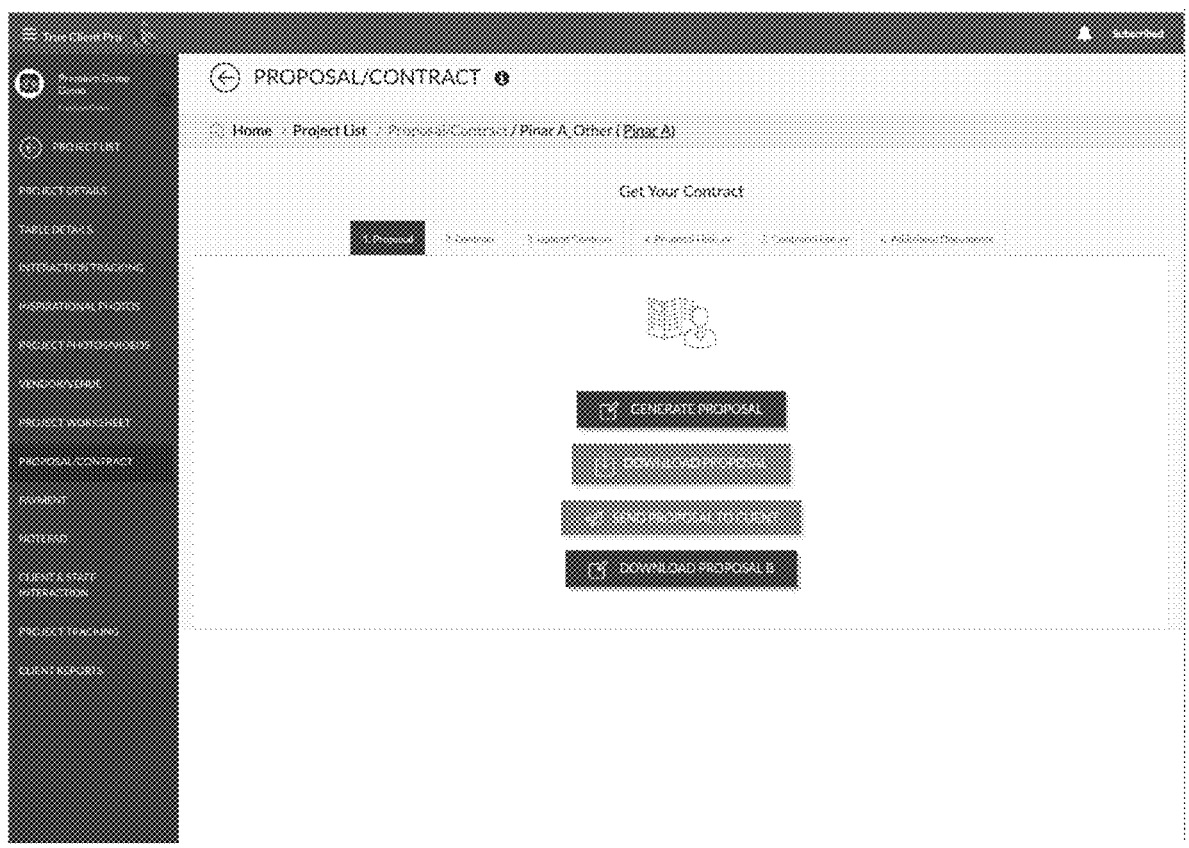
Figure 4Y:
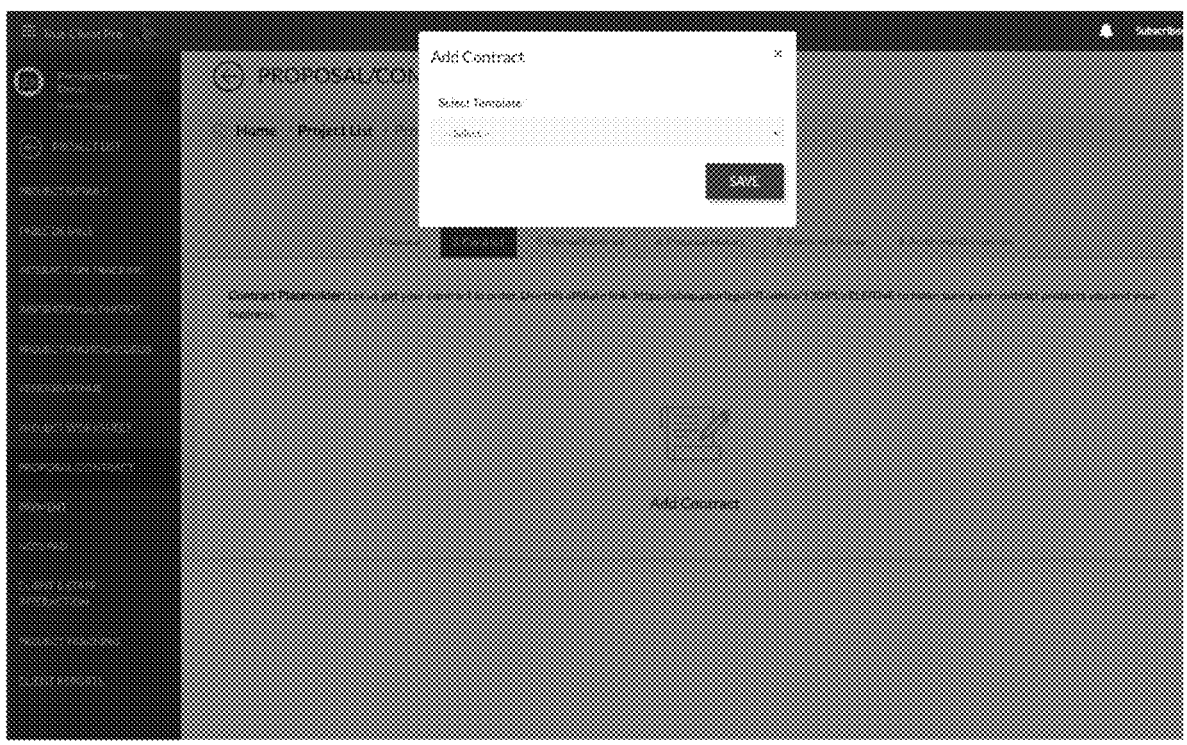
Figure 4Z:
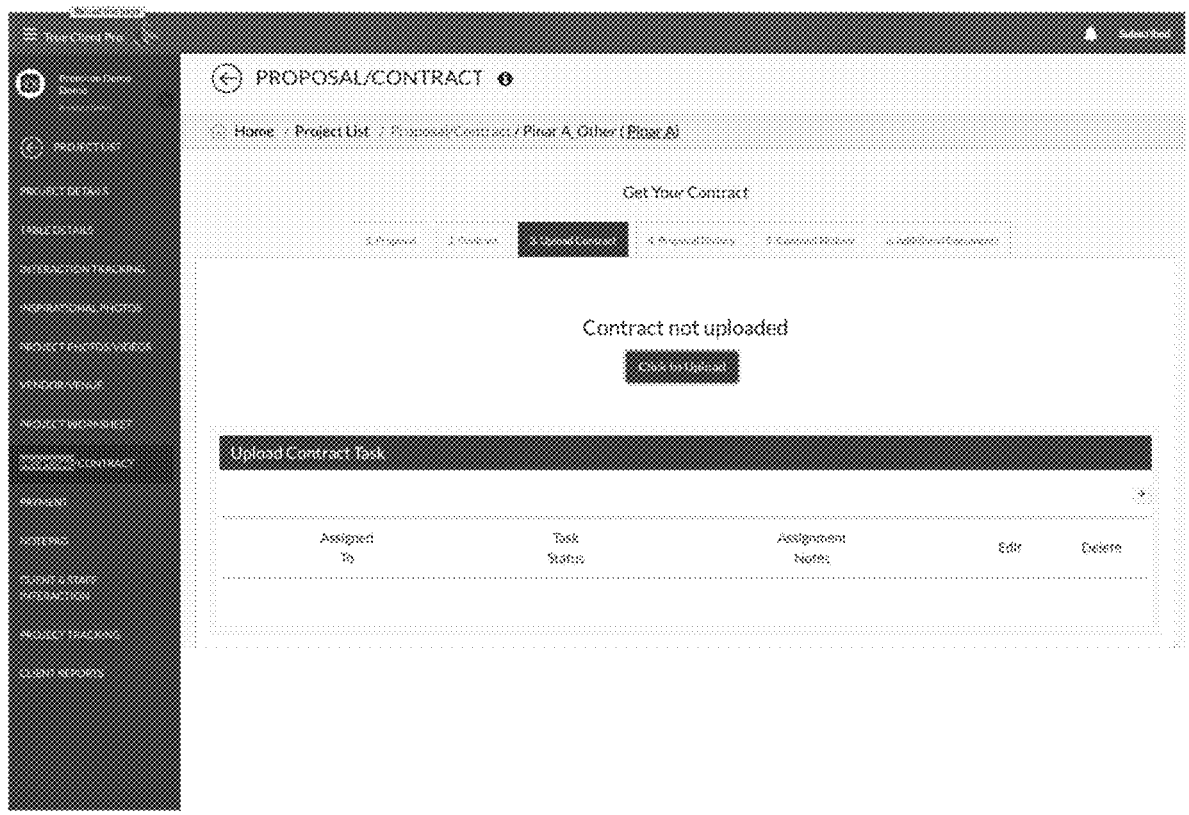
Figure 4A:
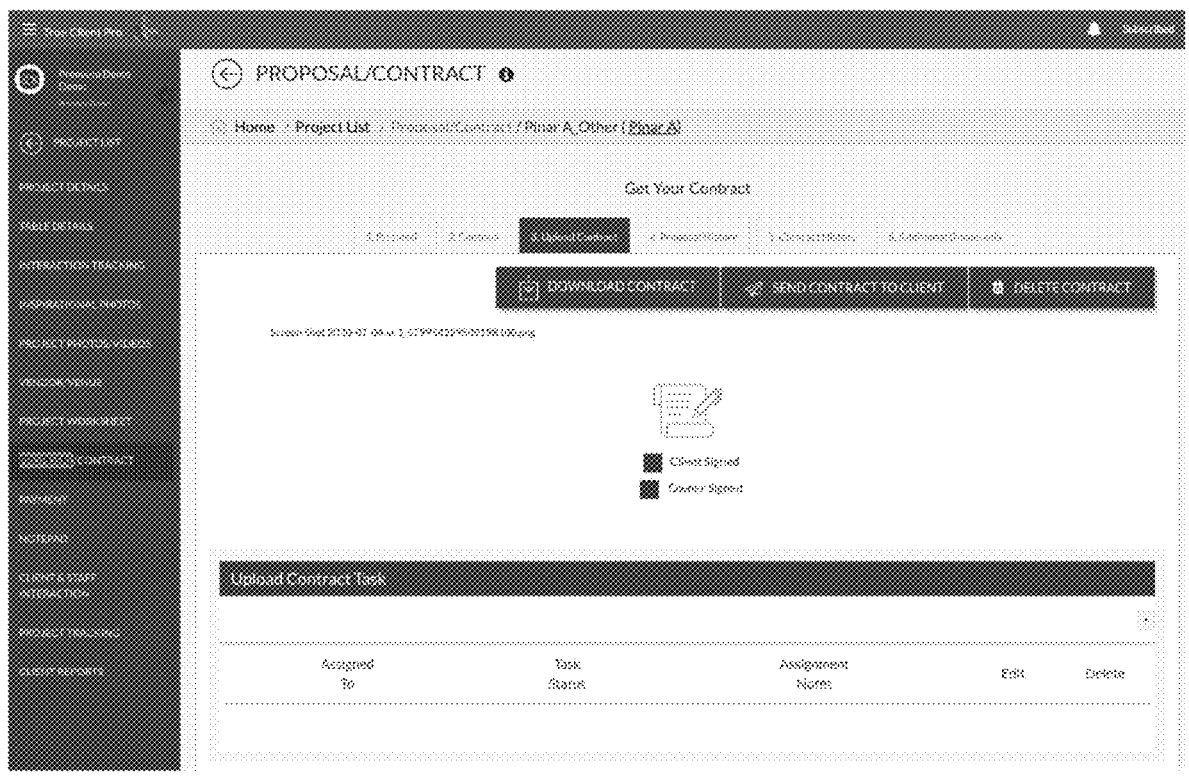
Figure 4A:
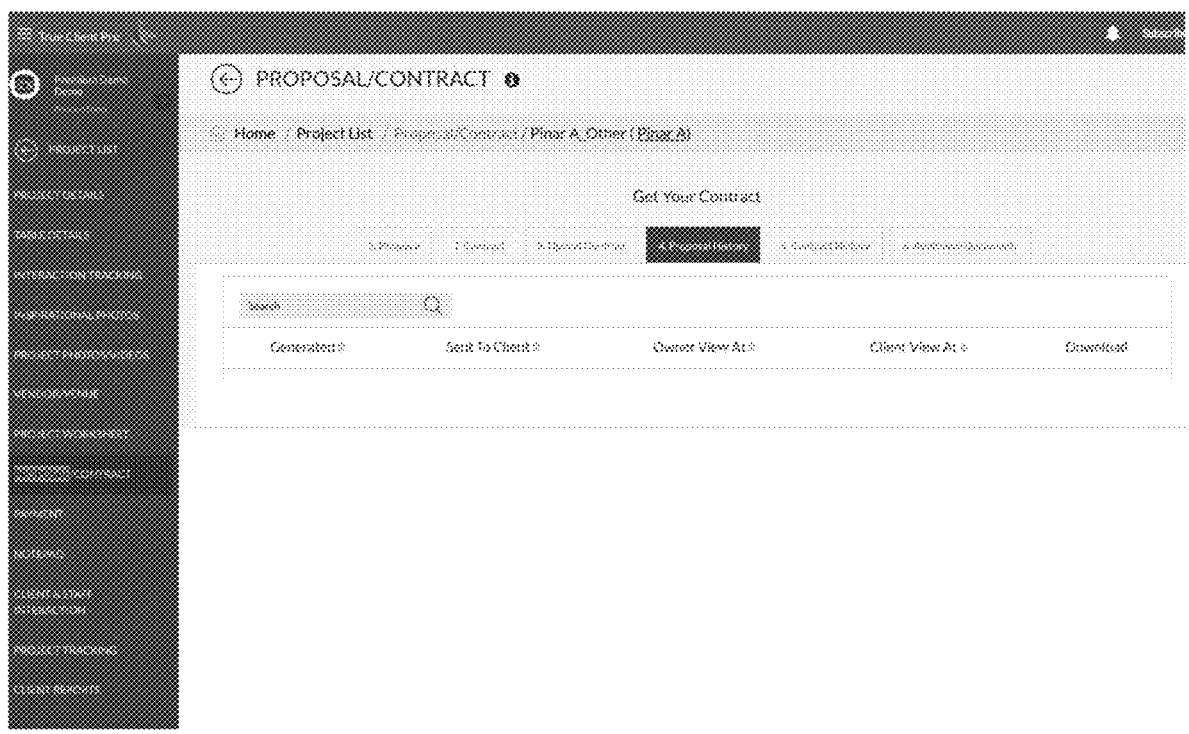
Figure 4A:
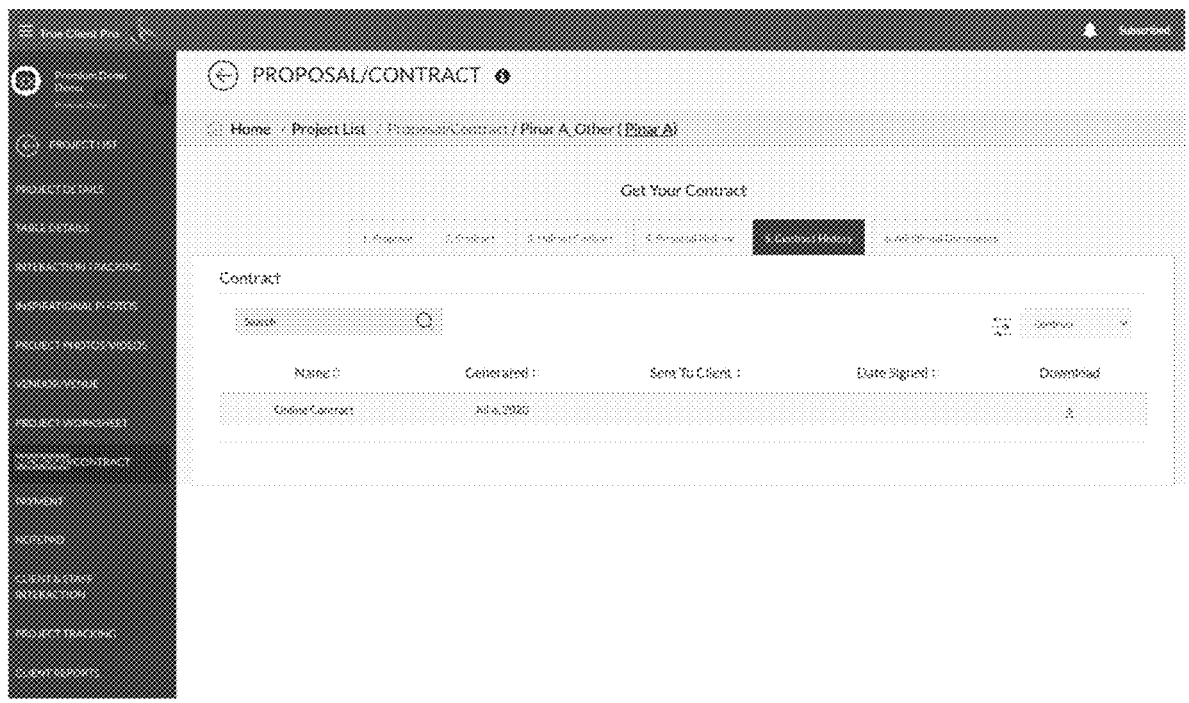
Figure 4A:
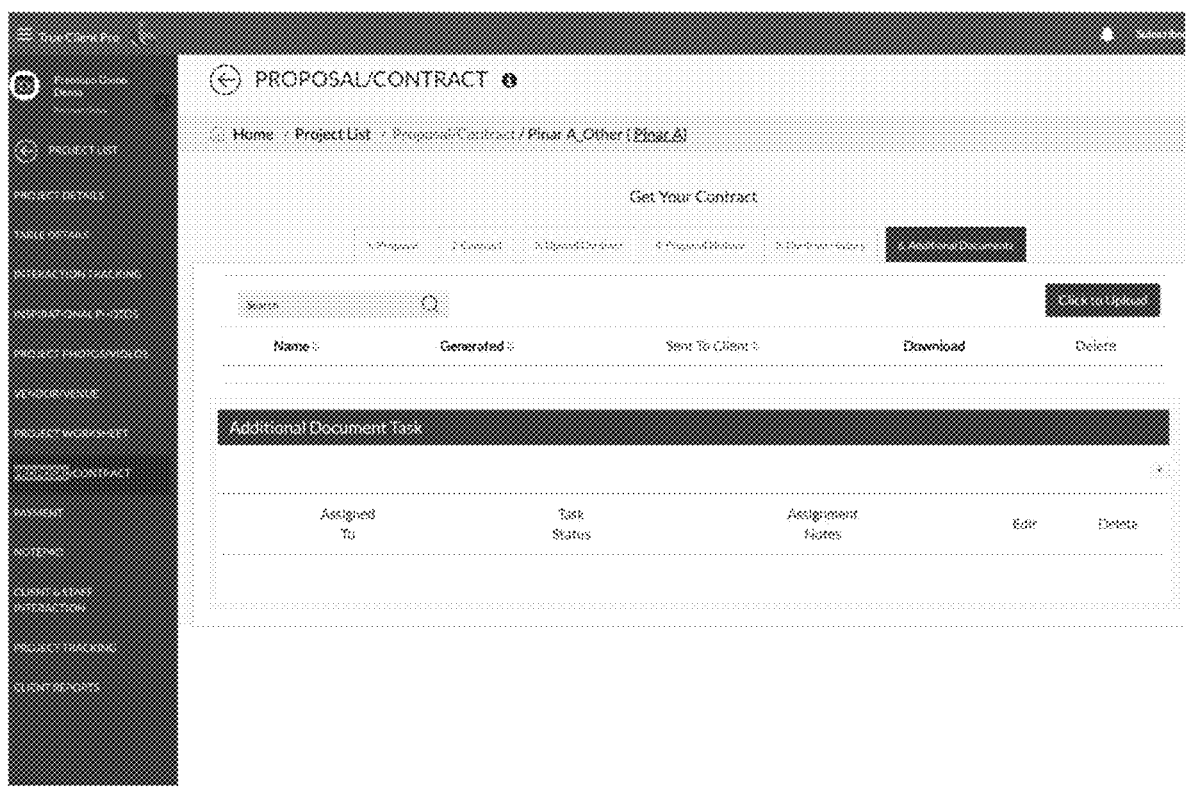
Figure 4A:
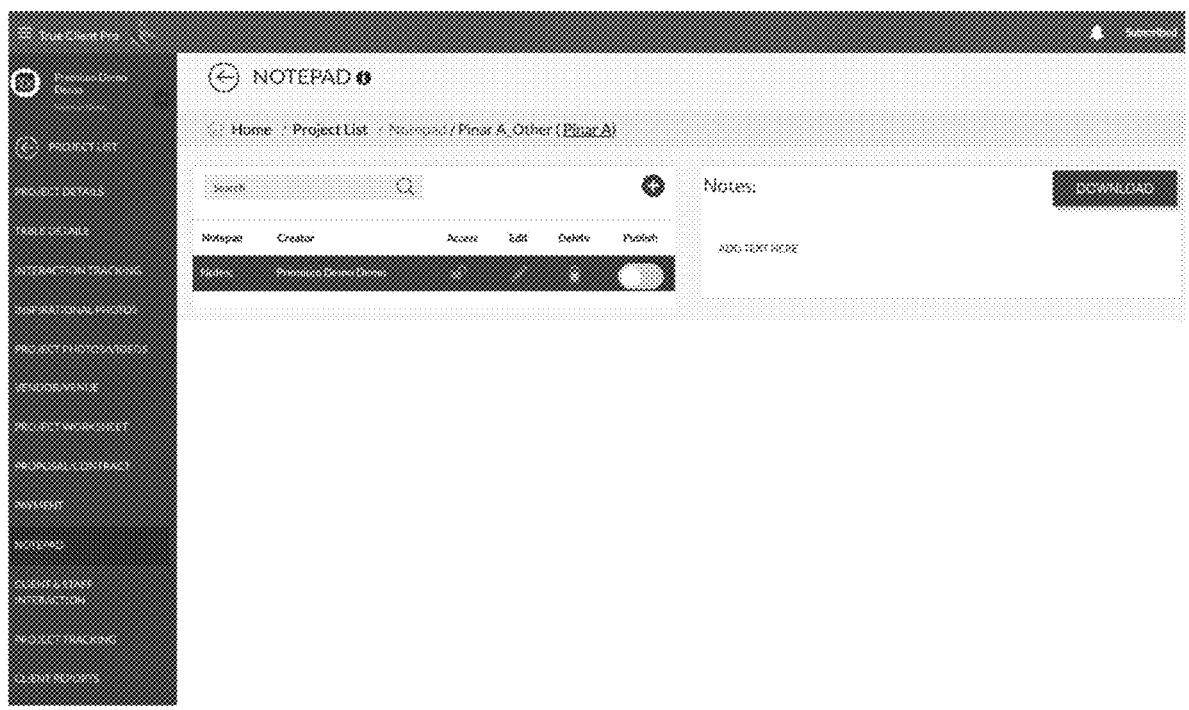
Figure 4A:
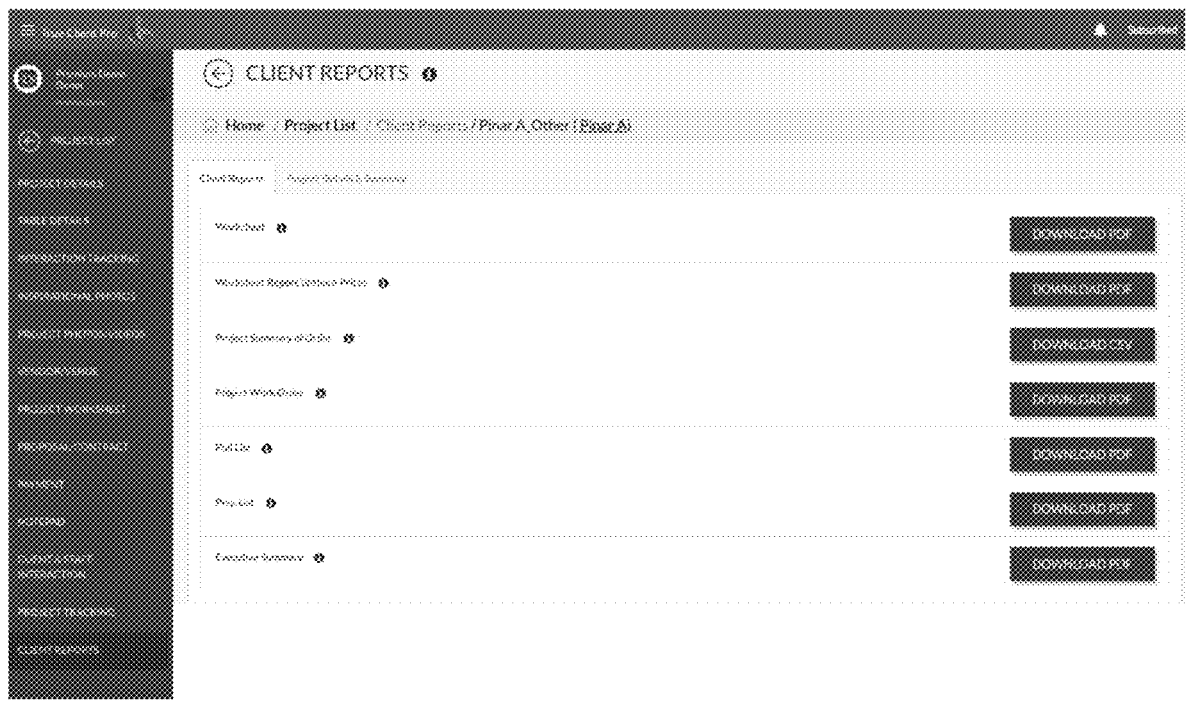
Figure 4A:
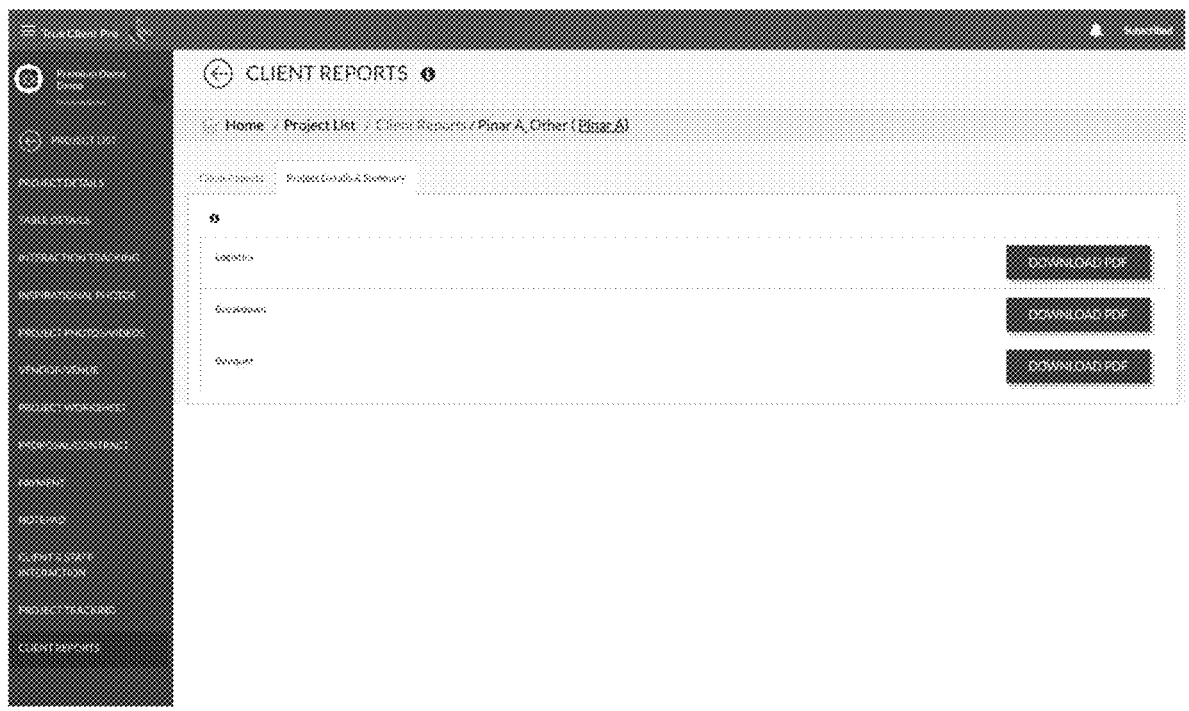
Figure 4A:
Figure 4A:
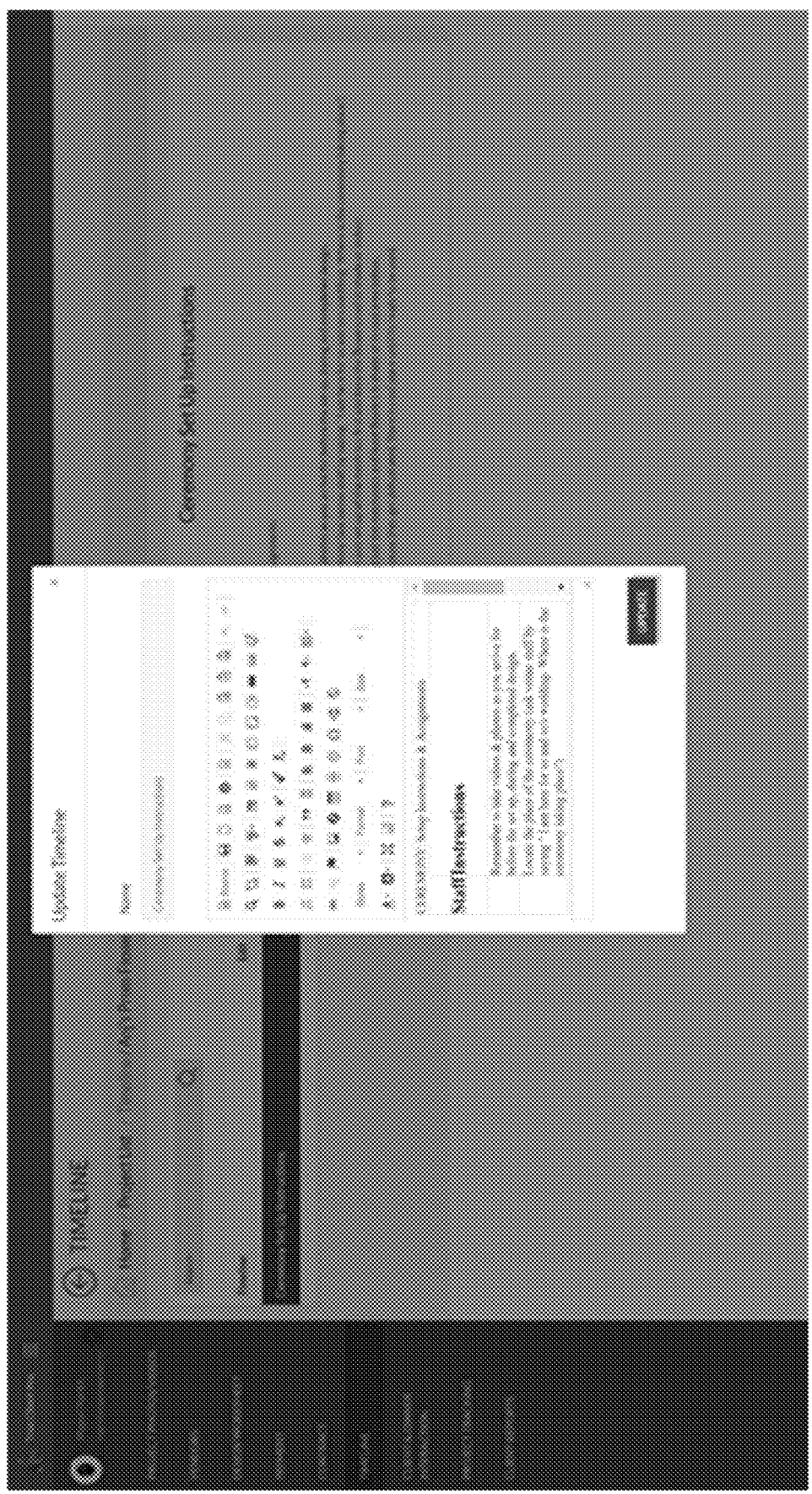
Figure 4A:
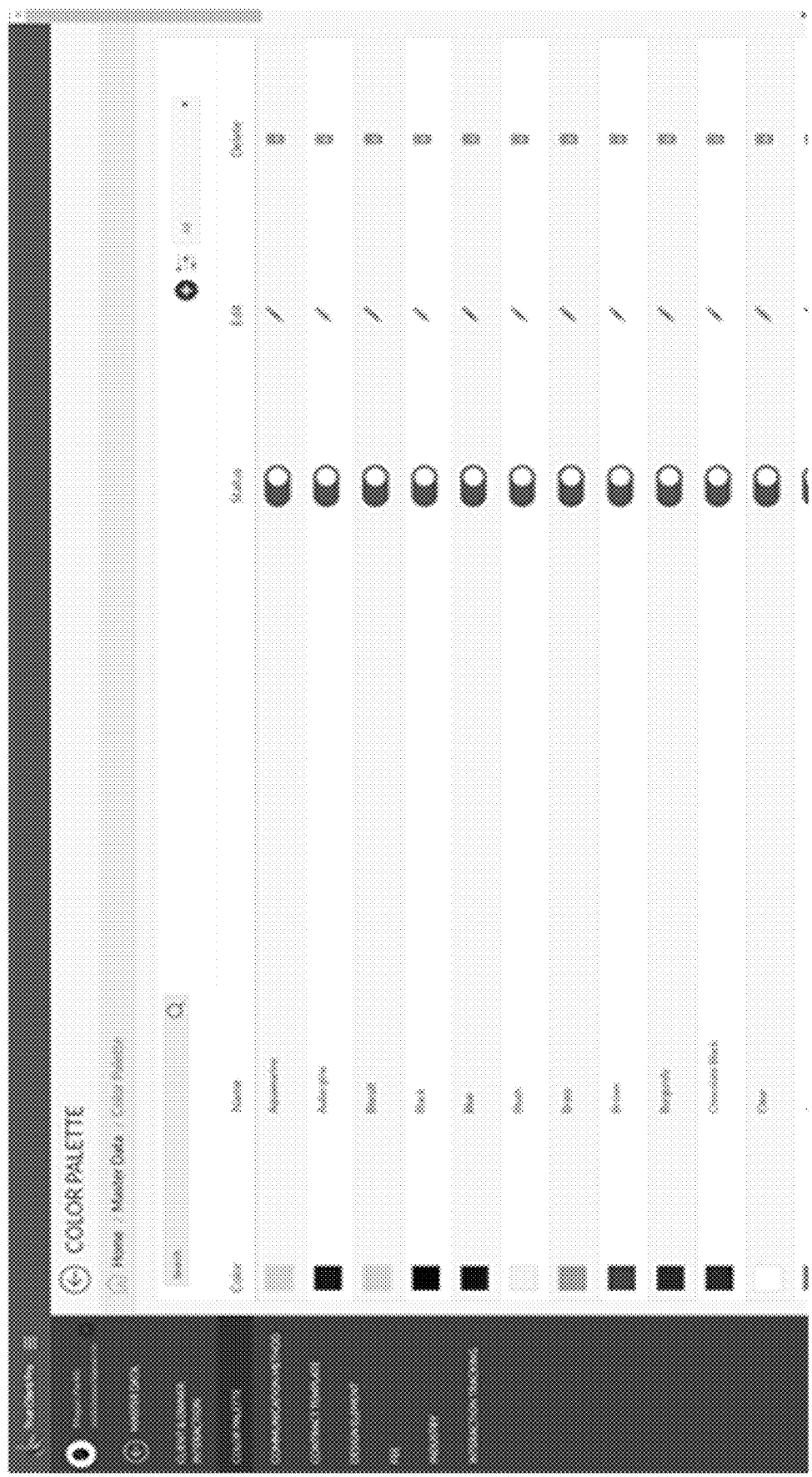
Figure 4A:
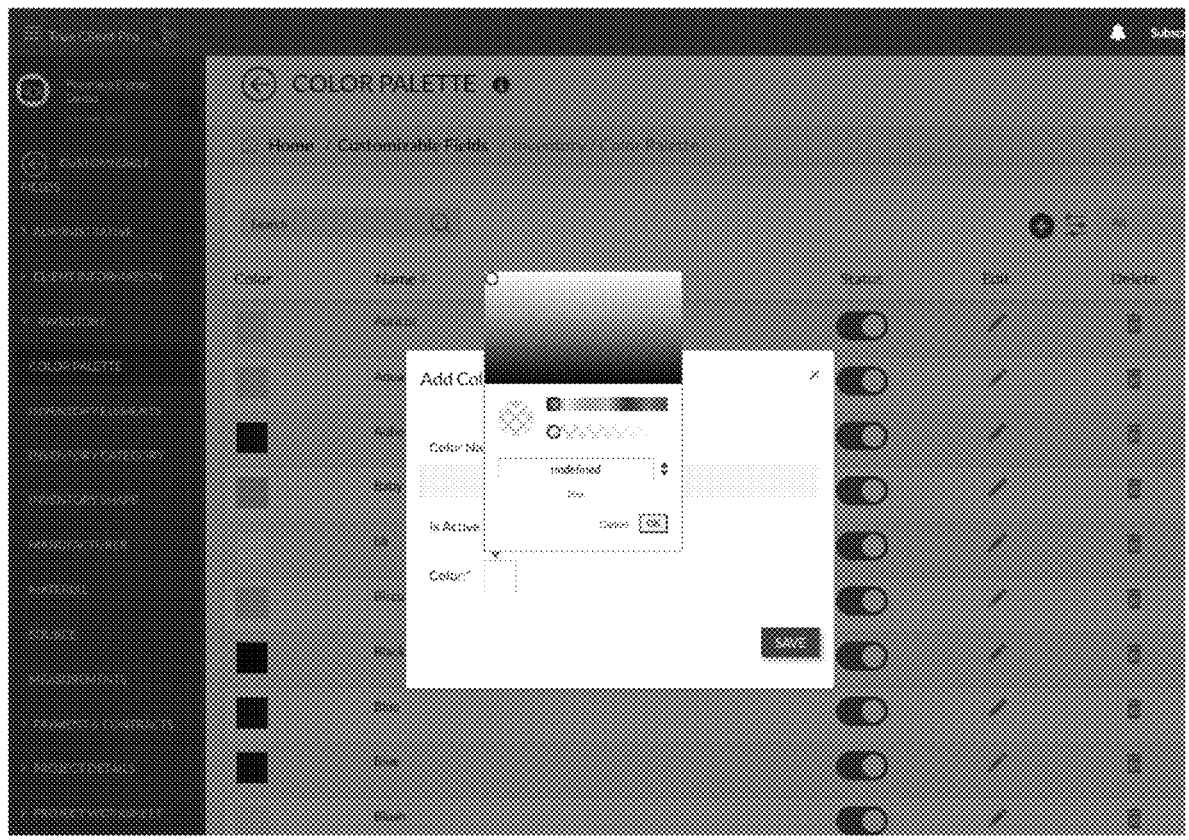
Figure 4A:
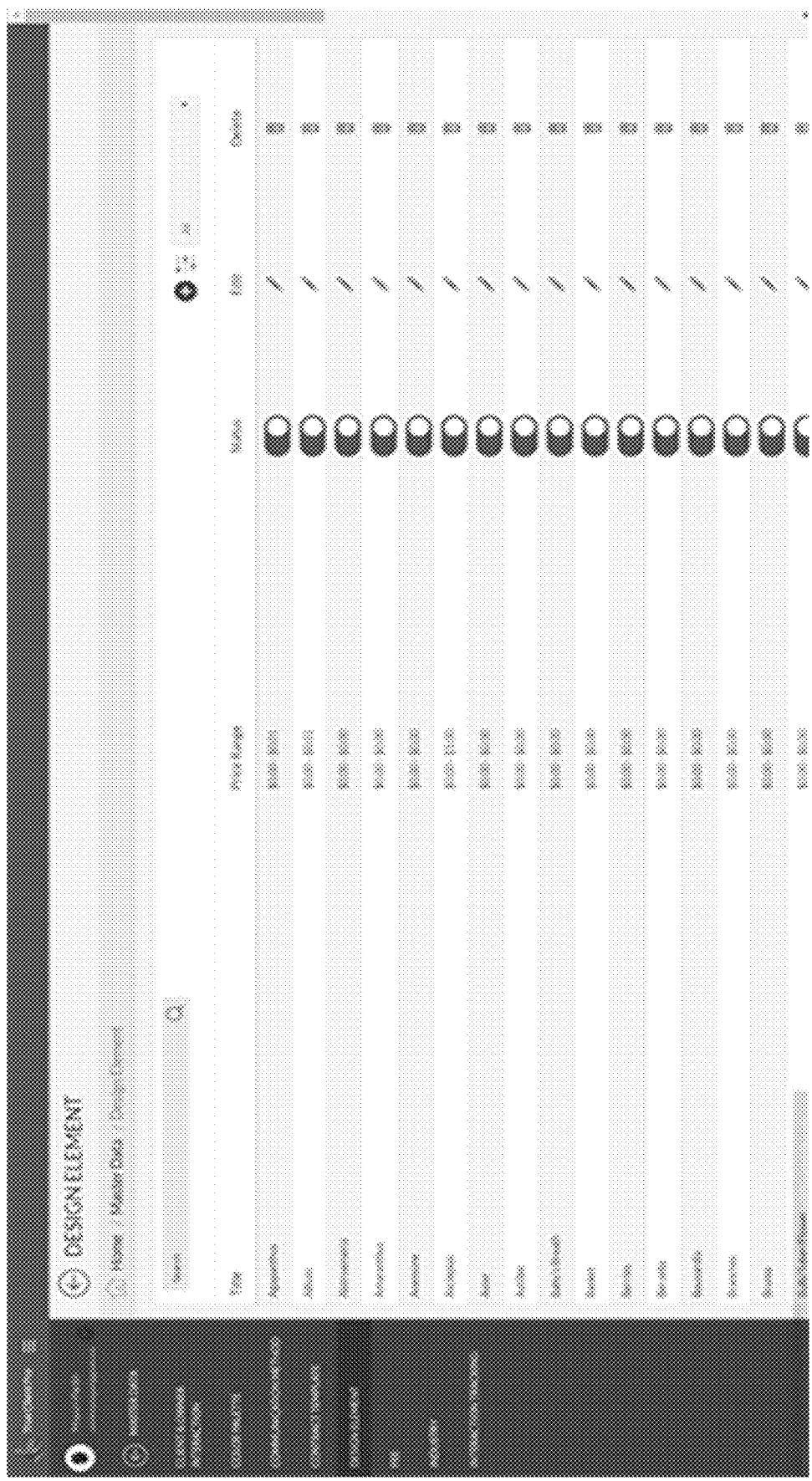
Figure 4A:
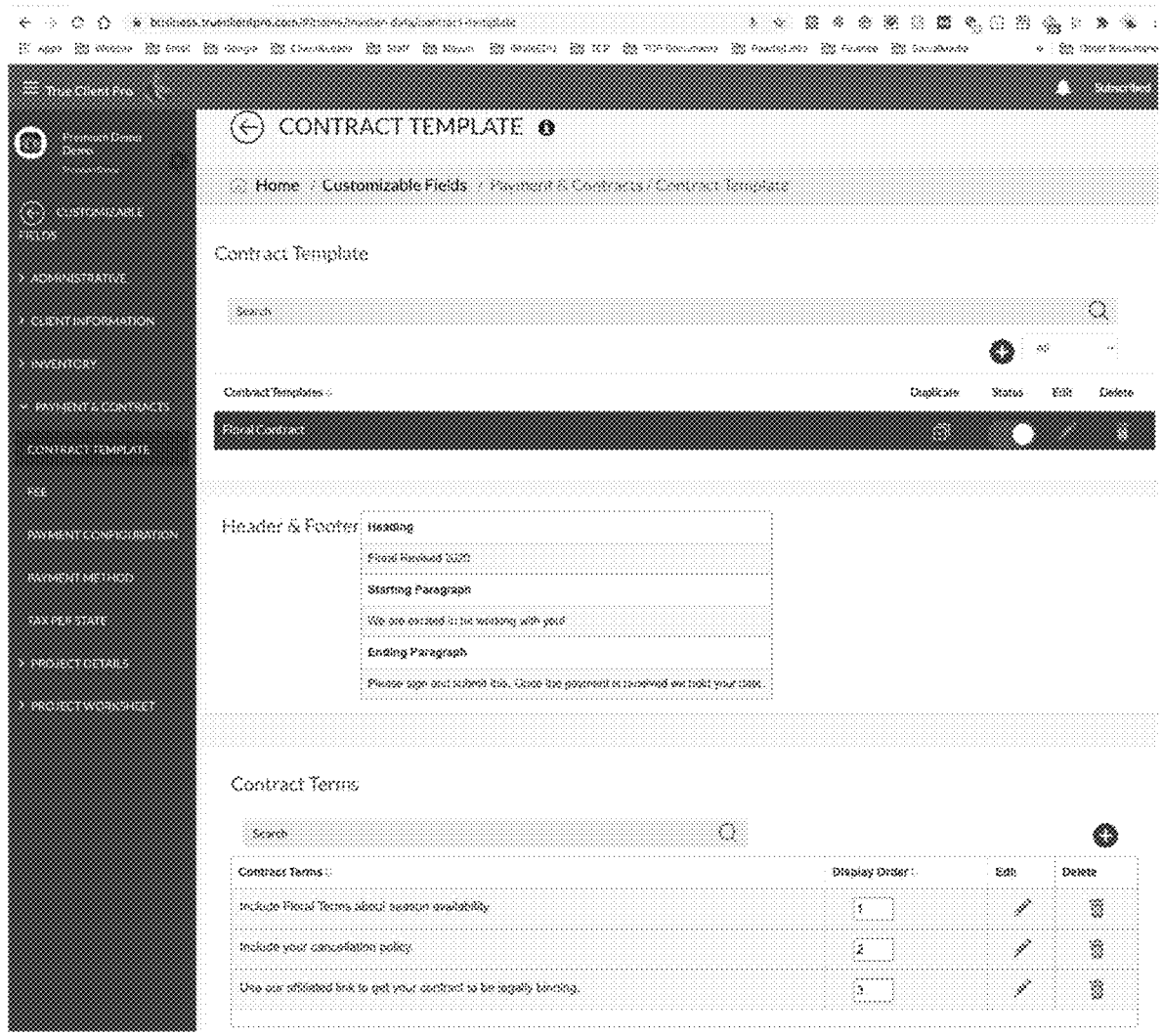
Figure 4A:
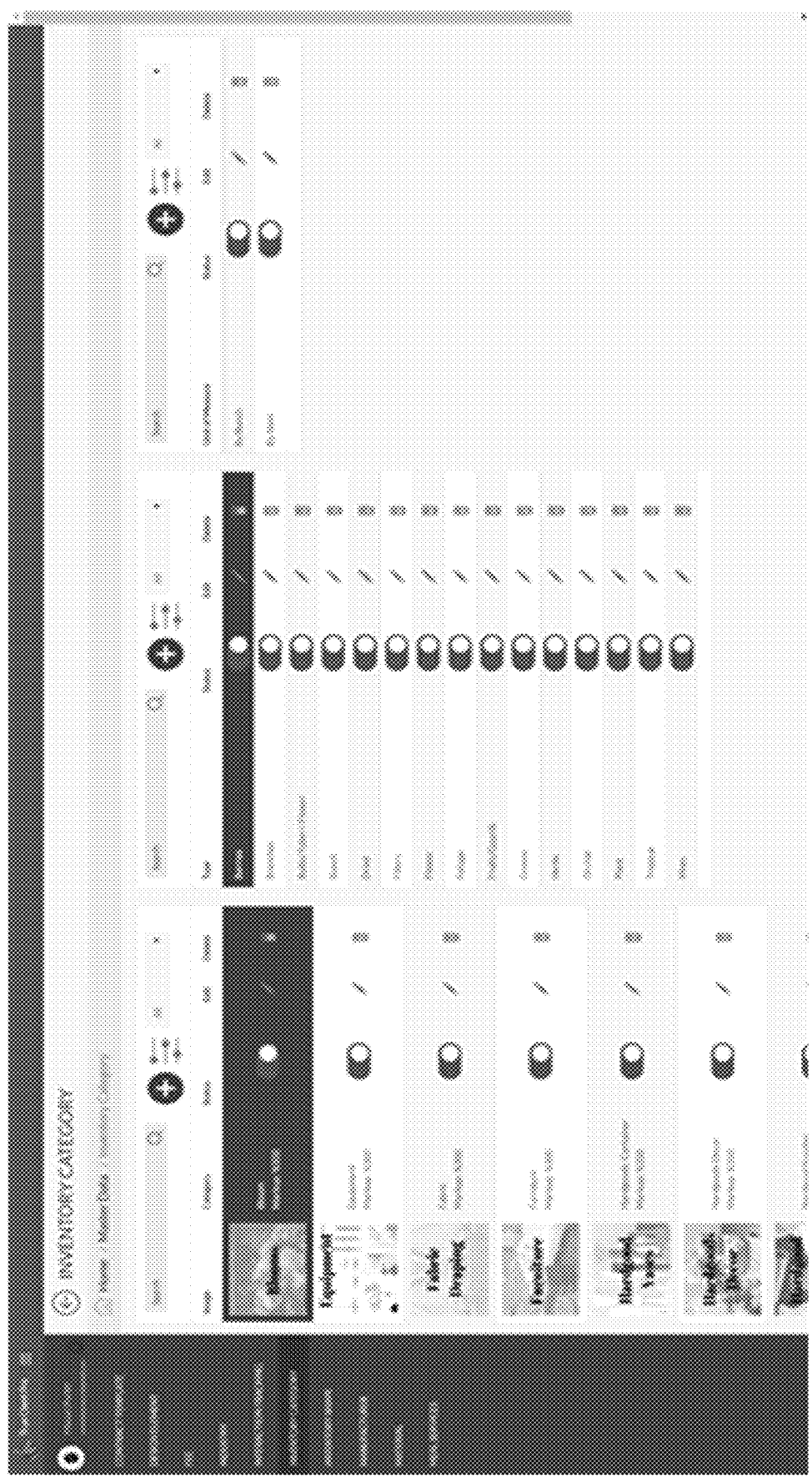
Figure 4A:
Figure 4A:
Figure 4D:
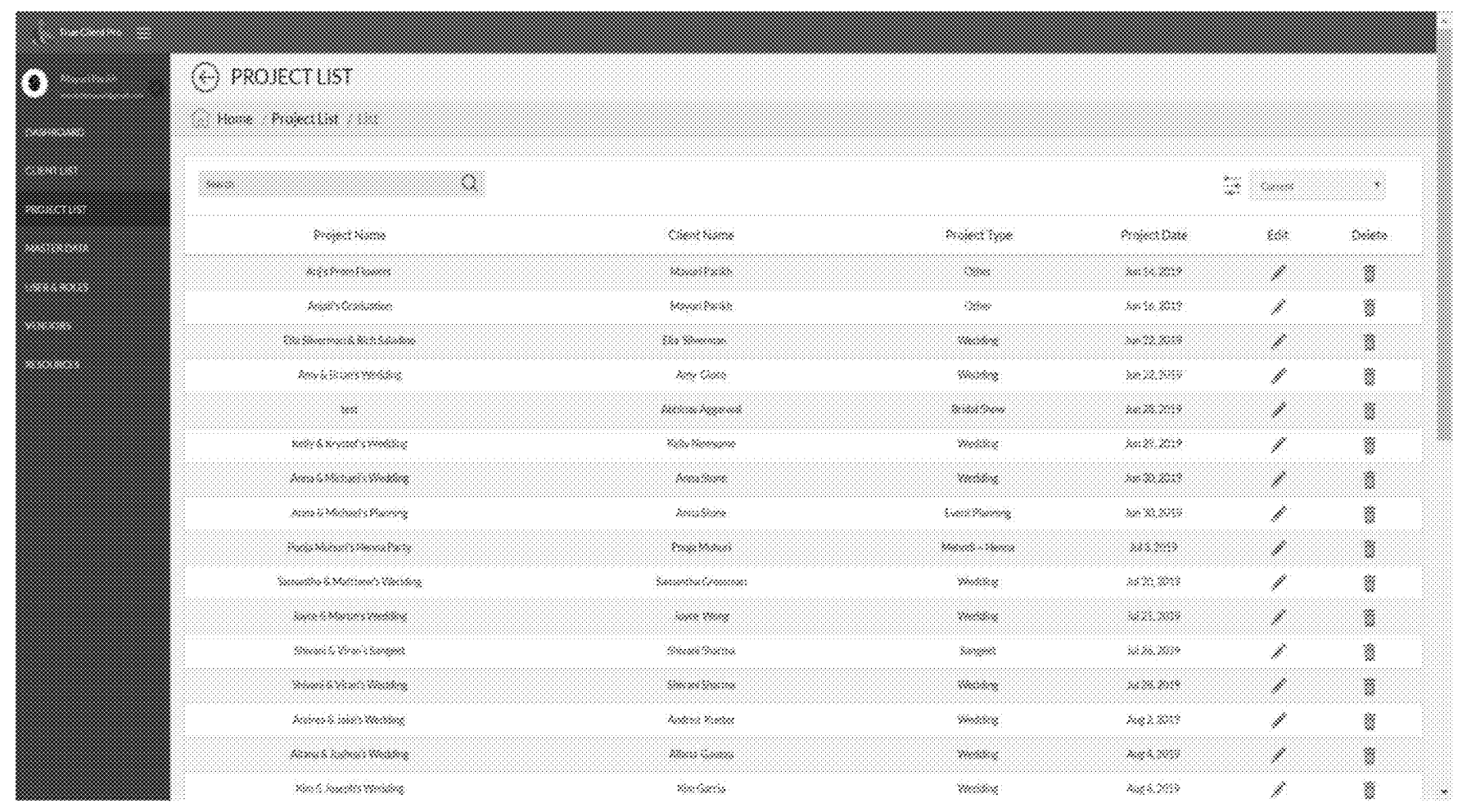
Figure 4E:
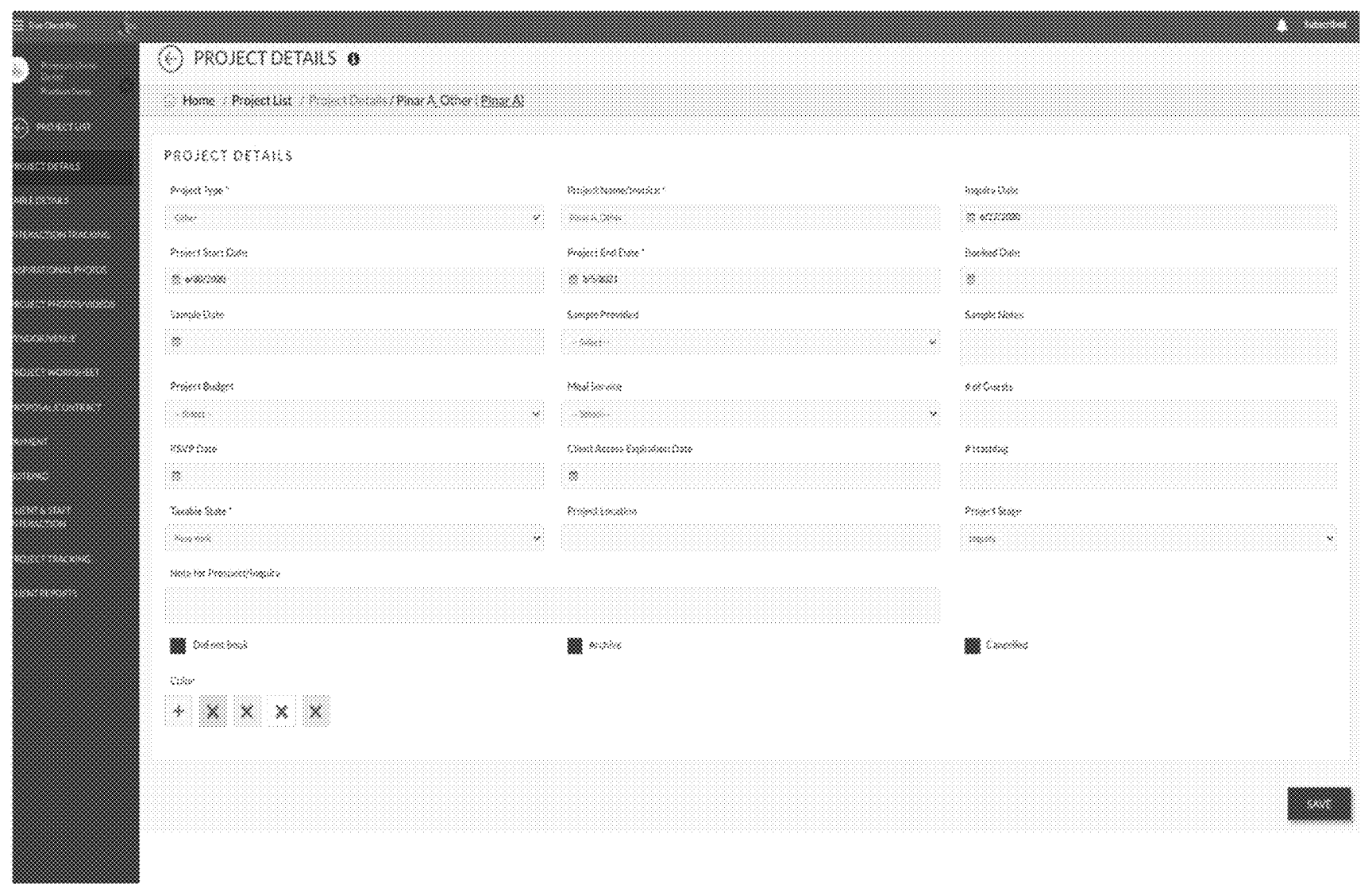
Figure 4V:
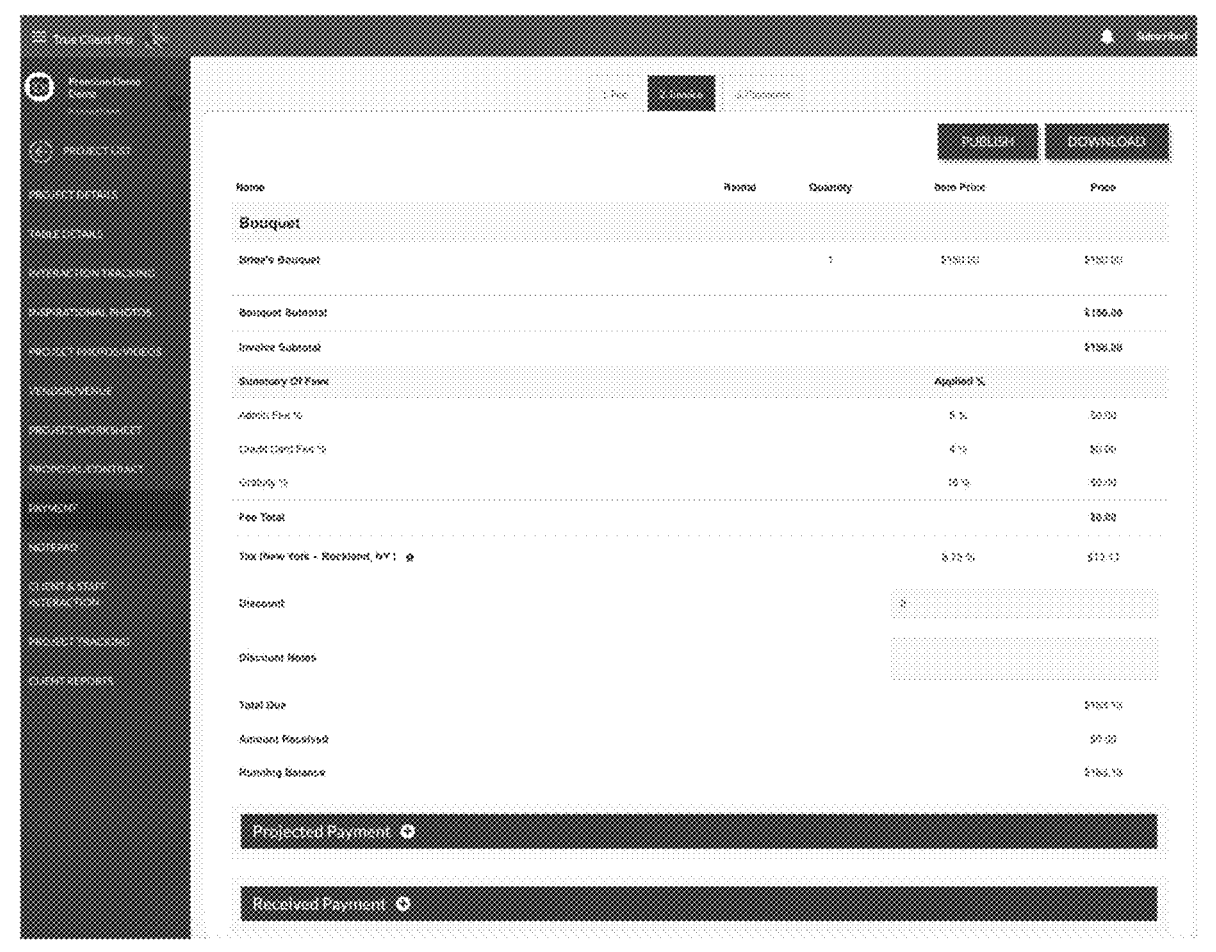
Figure 4A:
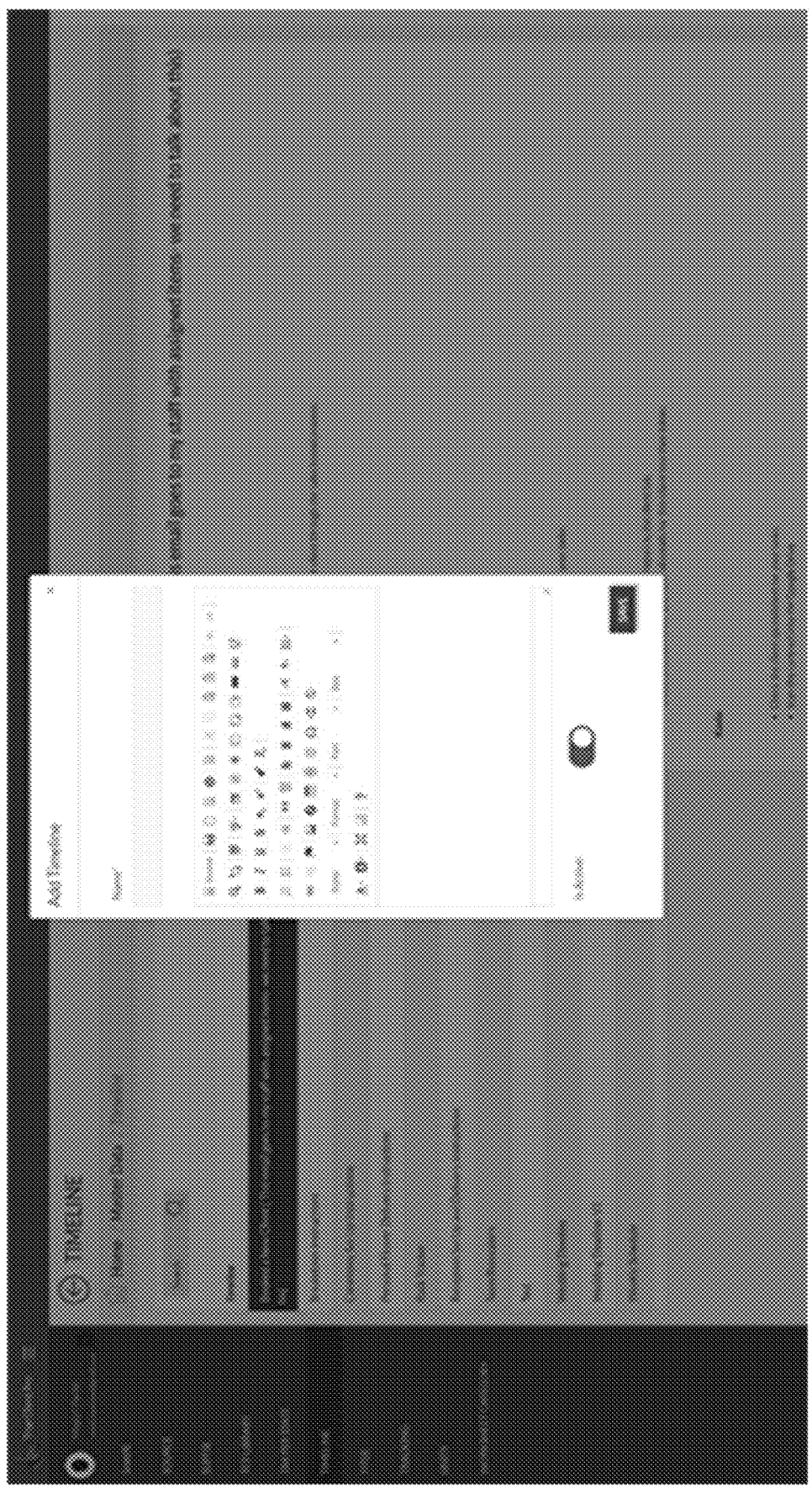
Figure 4A:
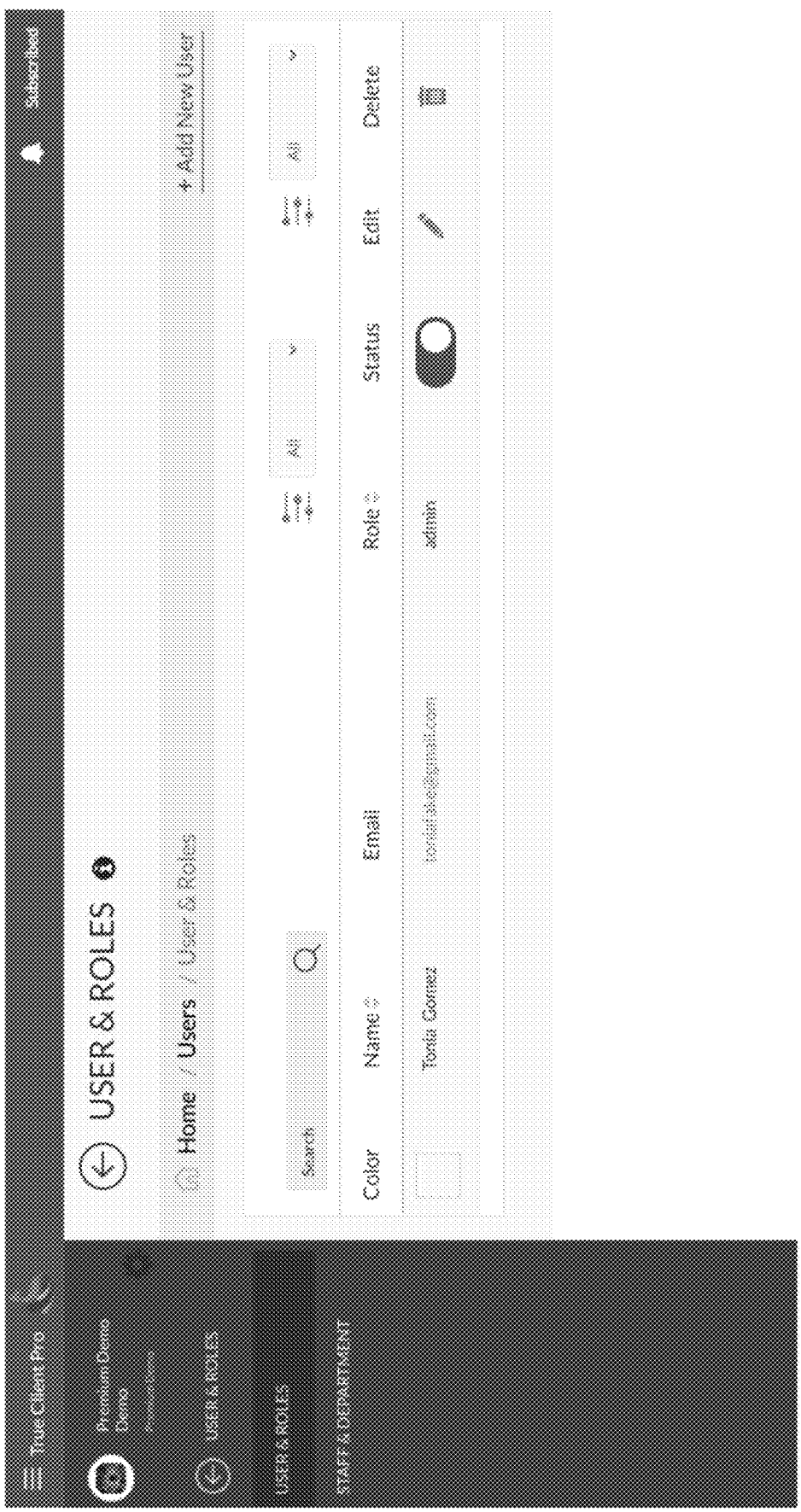
Figure 4A:
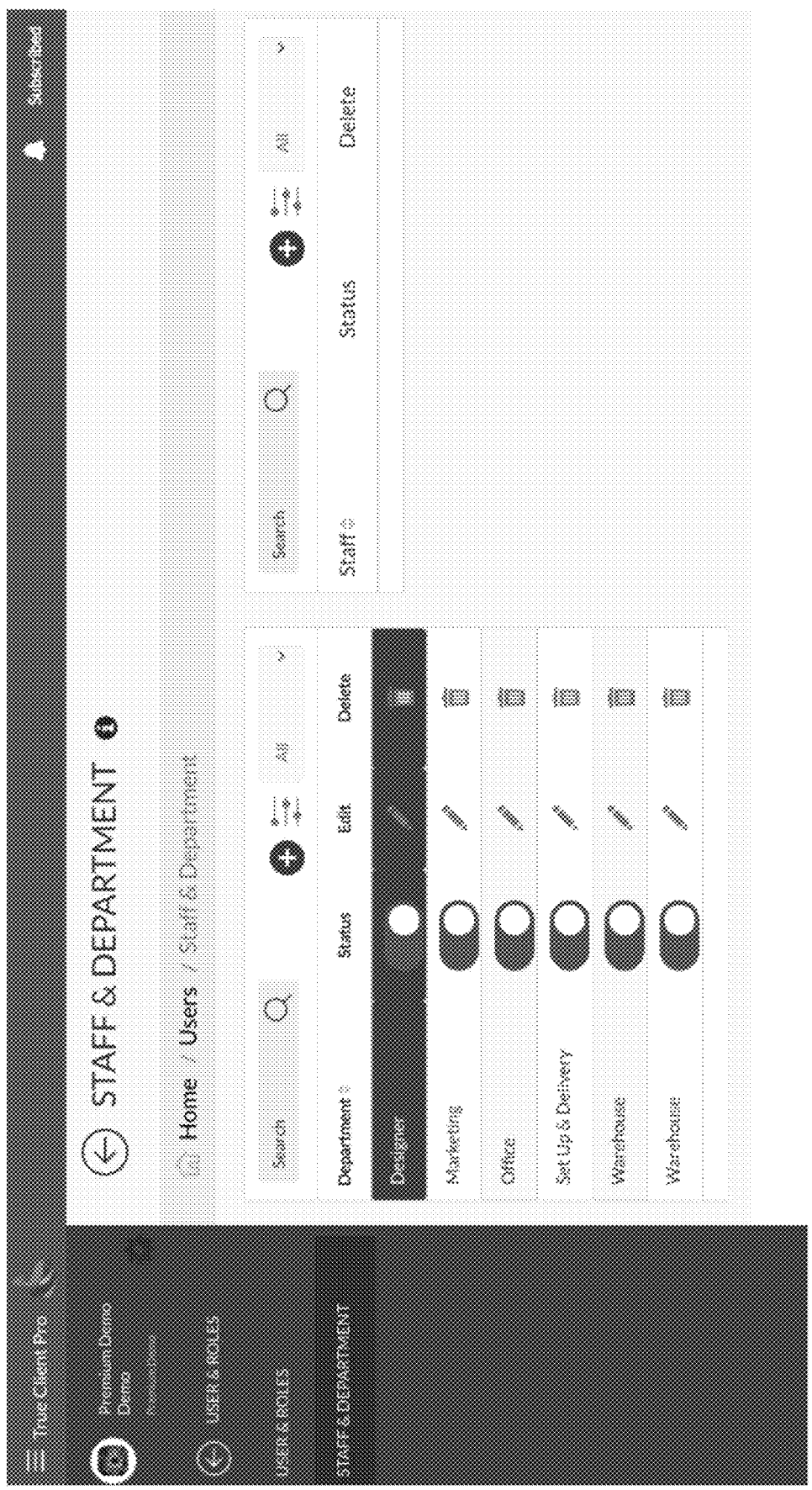
Figure 4A:
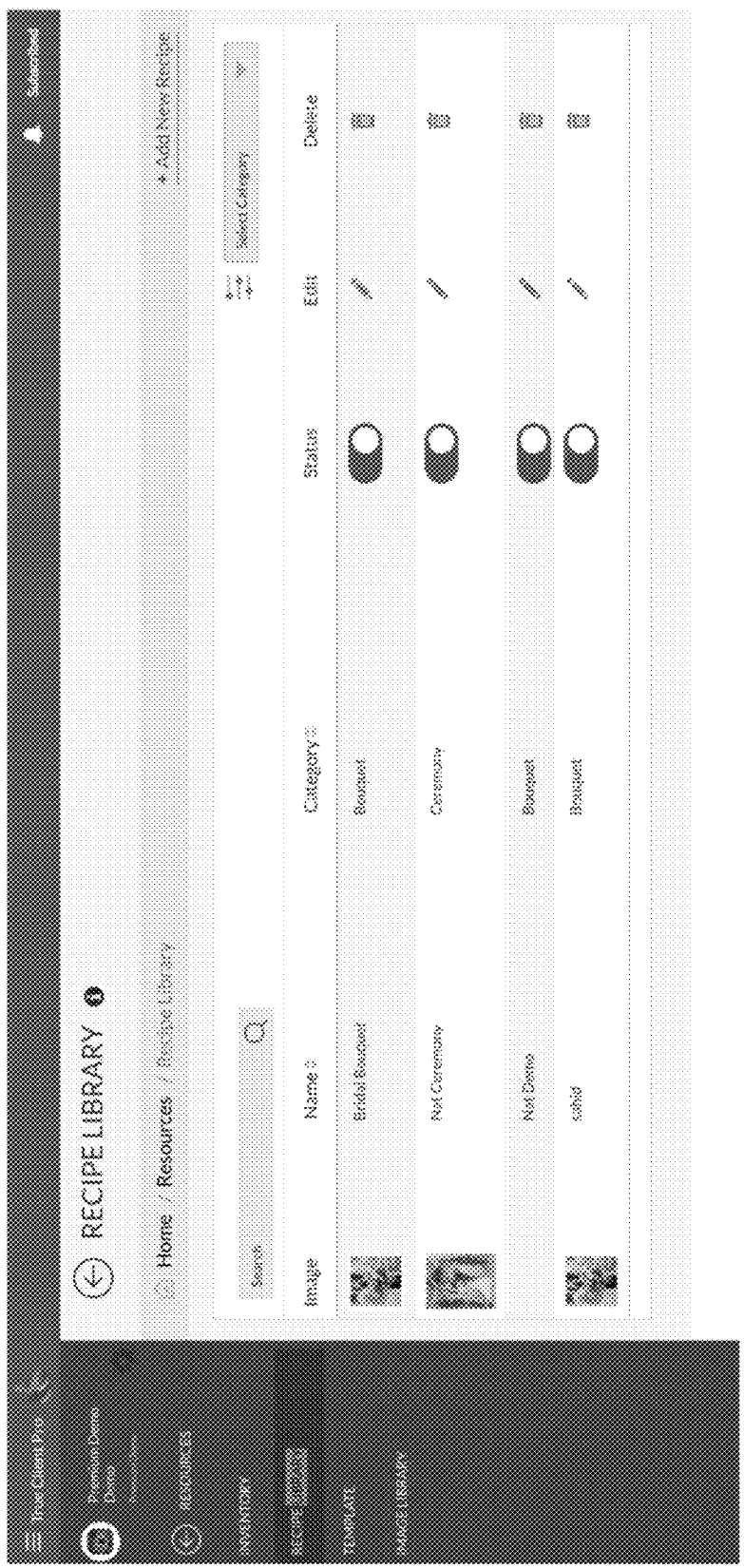
Figure 4A:
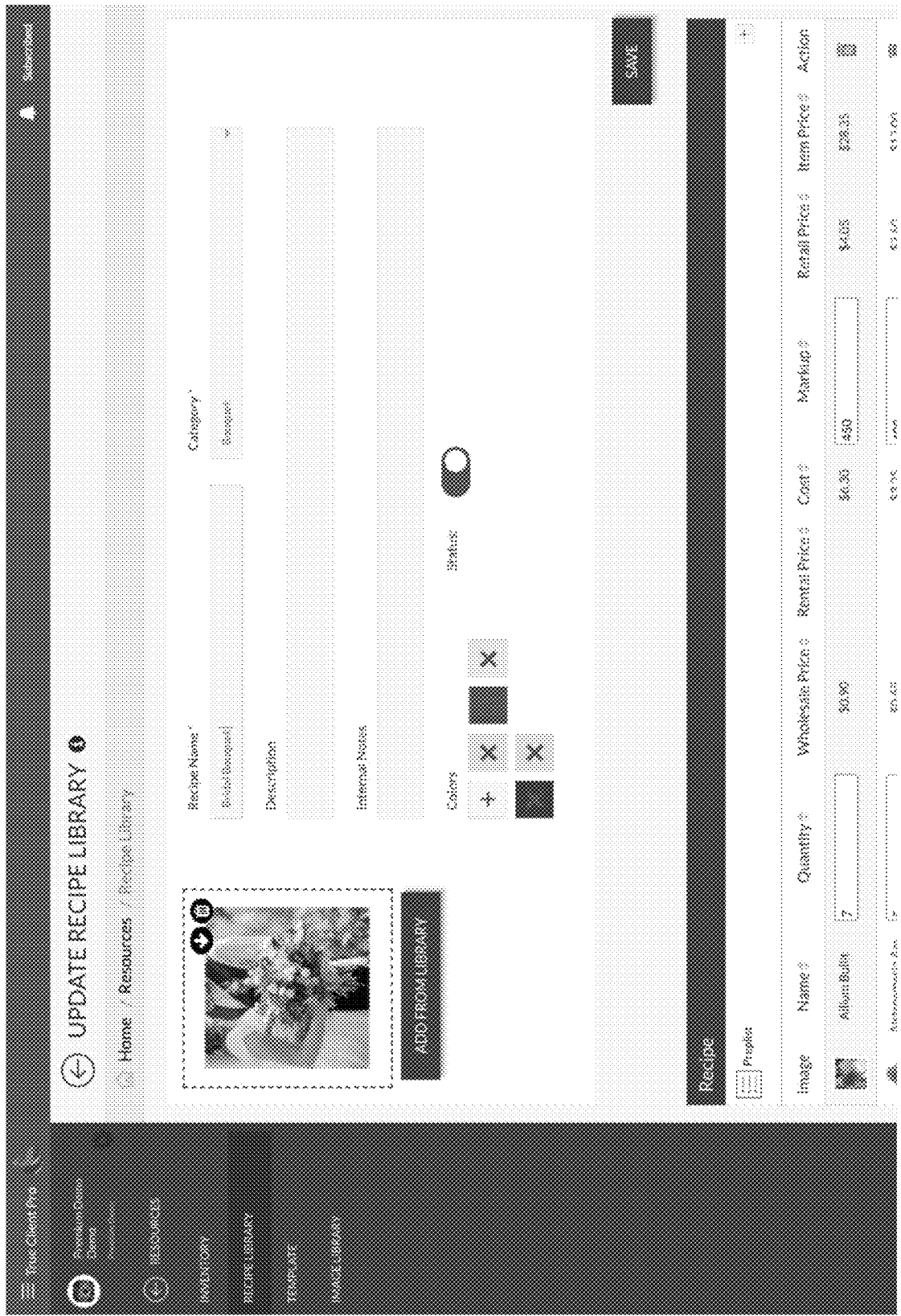
Figure 4A:
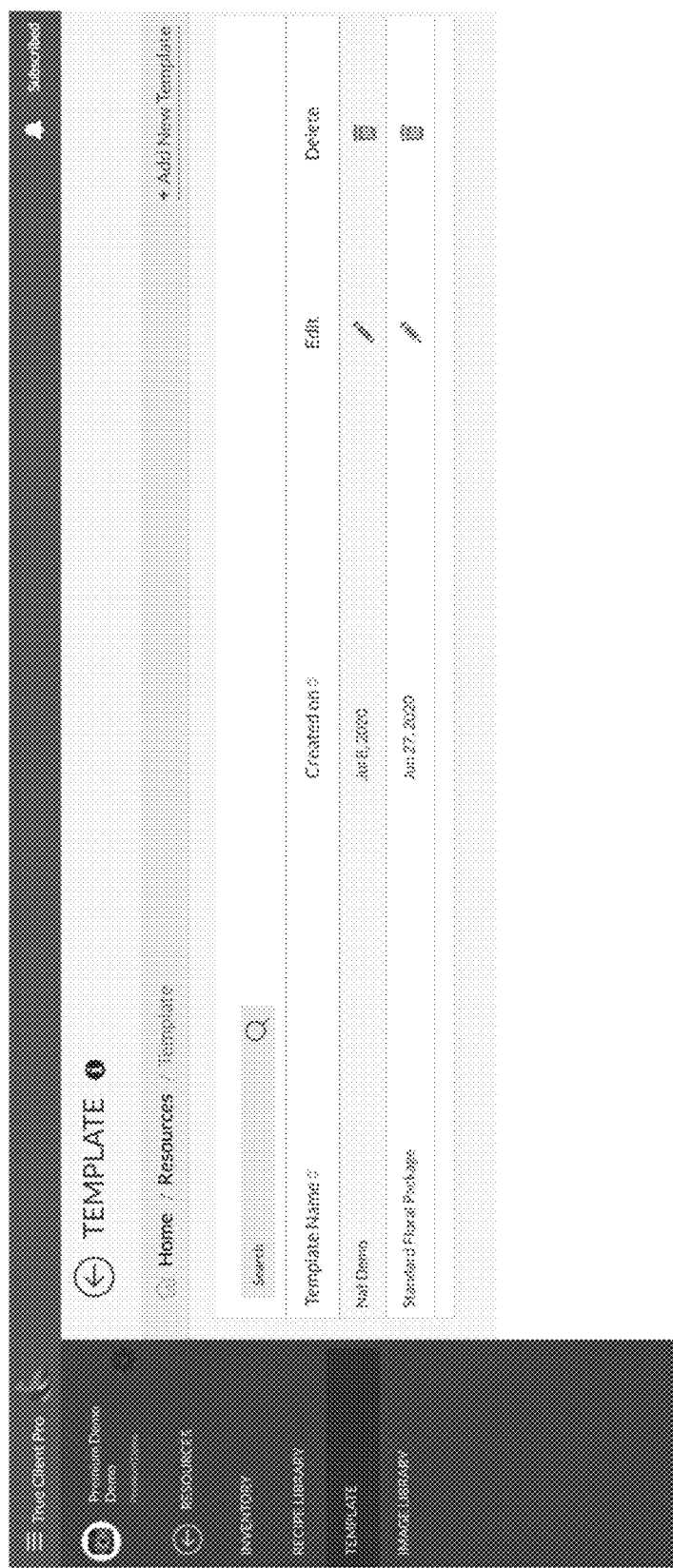
Figure 4A:
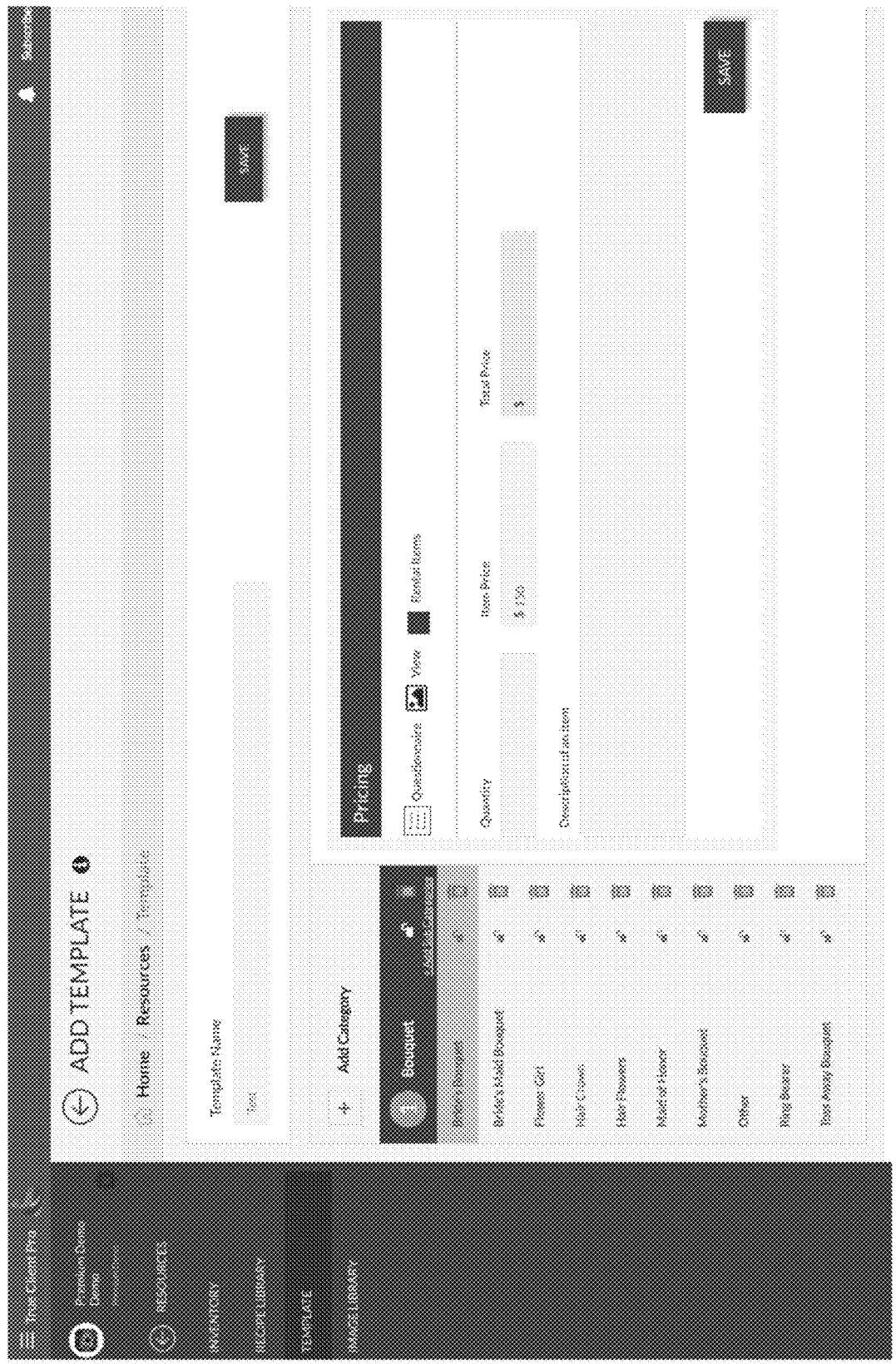

FIG. 4A illustrates a concrete example of dashboard screen 320, according to an embodiment. As illustrated, dashboard screen 320 comprises a panel for inquiries, upcoming projects, client and staff interactions, recent clients, a productivity list, and upcoming payments. For a business user, this combination of panels may provide the business user with a current high-level snapshot of relevant business (e.g., clients and/or projects being managed). For client users, the combination of panels may provide the client user with a current high-level snapshot of the client's project or projects being managed by a business. Notably, in the illustrated embodiment, dashboard screen 320 comprises navigation screen 315 on a left side of graphical user interface 300.

Each panel may comprise a respective list with a title, column headings (e.g., each comprising an input for sorting by the respective column), zero or more entries, an input for viewing all entries (e.g., as opposed to an unviewed or most recent subset of entries), and/or the like. Each entry in each list in each panel may comprise a link to a details screen with detailed information about the entry (e.g., parameter values defining the data object represented by the entry).

In an embodiment, the inquiries panel comprises a list of inquiries from prospective clients, vendors, or other contacts. Each entry in the list of inquiries may comprise the name of the inquirer, a project name with which the inquiry is associated, a date on which the inquiry was received, a mobile number of the inquirer (if known), an email address of the inquirer (if known), and/or the like. The list of inquiries may be initially sorted according to the date of the inquiry.

In an embodiment, the upcoming projects panel comprises a list of projects that are due within an upcoming future window of time (e.g., upcoming week, upcoming month, etc.). Each entry in the list of projects may comprise the name of the project, the type of project, and an end date (e.g., due date or expected completion date) of the project. The list of projects may be initially sorted according to the end date, for example, from closest in time to the current time to furthest in time from the current time. Selection of a "view all" input in the upcoming projects panel may redirect graphical user interface 300 to projects screen 330.

In an embodiment, the client-and-staff-interactions panel comprises a list of interactions between the user and a client and/or team member. Each entry in the list of interactions may comprise a name of the user with whom the interaction occurs, a project name associated with the interaction, a date of the interaction, a type of the interaction, a view of the interaction, and/or the like. The list of interactions may be initially sorted according to the date of the interaction.

In an embodiment, the recent-clients panel comprises a list of clients with whom the business has recently contracted, interacted with, and/or the like. Each entry in the list of clients may comprise the name of the client, an email address of the client, a telephone number of the client, and/or the like. The list of clients may be initially sorted according to name or date of contract, interaction, or the like. Selection of a "view all" input in the upcoming projects panel may redirect graphical user interface 300 to clients screen 325.

In an embodiment, the productivity panel comprises a list of tasks that need to be completed and/or have been completed by team members or the client. Each entry in the list of tasks may comprise a name of the client, a name or other identifier of the task, a date that the task was due, a date that the task was completed, and/or the like. The list of tasks may be initially sorted according to the due date, for example, from closest in time to the current time to furthest in time from the current time. Thus, a user can quickly monitor and track tasks, thereby freeing up his or her time to focus on more important matters. In an embodiment, tasks that have been completed may be removed from the list of tasks in the productivity panel, so that the user can focus on just those tasks that have not yet been completed.

In an embodiment, the upcoming-payments panel comprises a list of payments with upcoming due dates. Each entry in the list of payments may comprise a name of the project for which the payment is due, a type of the project, the amount of payment, and the due date of the payment. This list of payments may be initially sorted according to due date, for example, from closest in time to the current time to furthest in time from the current time.

2.6. Clients

Clients screen 320 comprises may comprise a list of all clients being by a business user. Client screen 320 may be accessible via navigation screen 315 and/or one or more client-related links within other screens. In an embodiment, the list of clients may comprise entries consisting of the most essential information needed for each client, and may be organized into a grid. Whenever a non-client initiates contact with a business (e.g., by submitting information in a contact form), the application may automatically generate and store a data structure representing that lead as a prospective client, such that the data structure will be retrieved and used to populate an entry in the list of clients in clients screen 320. It should be understood that data structures for active clients will also be retrieved and used to populate entries in the list of clients in clients screen 320. Once a prospective client executes a contract with the business, the status of the client may be changed from prospective to active by changing a value of a status parameter in the data structure, thereby seamlessly transitioning the client from prospective to active.

FIG. 4B illustrates a concrete example of clients screen 325, according to an embodiment. As illustrated, clients screen 325 may comprise a list of clients. Each entry in the list of clients may represent a client data object and comprise a status of the client, a name of the client, an industry of the client, social media information for the client, an email address of the client, a mobile number of the client, project details, interaction tracking, an input for editing information about the client, an input for deleting the client, and/or the like. The status of the client may comprise an indication of whether the client is prospective (e.g., no contract yet), active (e.g., contracted), archived (contracted but all active projects have been completed), and/or not booked (e.g., no contract ever), which can be used by the user to determine the best method for interacting with the associated client. In addition, clients screen 325 may comprise one or more inputs for editing information about each client, deleting each client, searching for clients (e.g., based on keywords and/or regular expressions), filtering clients (e.g., based on one or more criteria), and adding a new client.

Notably, clients screen 325 may be updated in real time as clients submit requests for contact (e.g., via a contact form on the business's website, hosted by platform 110 or another platform). For example, whenever a prospective client fills out and submits a contact form or otherwise initiates contact with the business, platform 110 may generate a data structure that represents the prospective client and populate values of parameters in that data structure with information that was submitted by the prospective client. Thus, when a business user accesses clients screen 325, the application will retrieve all data structures representing clients from database 114 and generate the list of clients in clients screen 325 to include representations of all of the clients, including the prospective client. This prospective client may be distinguished from active clients by its status (e.g., "P" for prospective). Once the prospective client executes a contract, the client's status may be changed (e.g., to "A" for active).

FIG. 4C illustrates a concrete example of a client-details screen for adding or editing a client, according to an embodiment. Graphical user interface 300 may be redirected to the client-details screen in response to the user selecting an input for adding a new client or an input for editing an existing client in clients screen 325. As illustrated, the client-details screen comprises inputs for specifying information about the client. Such information may comprise contact details (name, address, email address, mobile number, etc.), social media information (e.g., website, screenname for one or more social media platforms, etc.), communication details (e.g., preferences for contact method, contact time, etc., title to be used, etc.), status, notes, and/or the like. A business user can use the client-details screen to track the status of each client, for example, by changing the client's status from prospective (e.g., before a contract is executed) to active (e.g., after a contract is executed) or not booked (e.g., if no contract will be executed) to archived (e.g., when all projects for the client have been completed).

Such information may also comprise one or more inputs for associating additional contacts to the client. Each additional contact may be specified by name, role, email address, mobile number, relationship to client, whether or not the contact is responsible for or has authority to execute a contract on behalf of the client, date that a contract was executed, and/or the like. For a particular client, all additional contact(s) may be provided as a list (e.g., in the client-details screen) with pertinent information for each entry, similar to the list of clients in client screen 325. In addition, each additional contact may be added or edited in a similar manner as a client, using similar screens as the client-details screen.

It should be understood that the primary difference between the client-details screen when adding a new client and editing an existing client is that, when editing, the client-details screen will be pre-populated with previously specified information (e.g., parameter values retrieved from an existing data structure stored for the existing client). However, the client-details screens may comprise other differences, depending on whether a client is being added or edited, such as differences in inputs. For example, the client-details screen for editing an existing client may comprise an input for sending access to the associated client and/or terminating access by the associated client. Sending access may comprise sending access details (e.g., username and/or password, link for resetting username and/or password, temporary password, etc.) to the client (e.g., via text or email), for example, when the client has forgotten or misplaced those access details.

In an embodiment, the client-details screen for a client may also comprise a list of project(s) associated with the client and/or one or more inputs for adding or editing each project associated with the client. The list of project(s) may be similar or identical to the list of project(s) in projects screen 330 described elsewhere herein. However, it should be understood that the list of project(s) in the client-details screen is limited to those project(s) that are associated with the particular client represented in the client-details screen, whereas the list of project(s) in projects screen 330 may comprise all projects across all clients managed by the user. In addition, the screen for adding or editing a project may be similar or identical to the project-details screen described elsewhere herein with respect to projects screen 330. Through the client-details screen, a user may specify information for new or existing projects, respectively, and the list of project(s) may provide a subset of this information in a grid format. Examples of this information include, without limitation, the name of the project, the type of project, an inquiry date, a project date, a booked date, a sample date, a provided sample, notes about the sample, number of guests, project budgets, meal services, RSVP deadline, expiration date for the client's access to the application, hashtags related to the project, taxable state of the project, location of the project, current stage of the project, colors to be used in the project, status of the project (e.g., active, did not book, archived, canceled, etc.) and/or the like.

In an embodiment, the client-details screen for a client may also comprise a list of interactions with the client and/or one or more inputs for viewing a list of interactions with the client represented in the screen. Each entry in the list of interactions may comprise a description or other identifier of the interaction, a department of the business, a name or other identifier of the project, a type of project associated with the interaction, a date of the interaction, a staff member of the business assigned to the interaction, a link for editing the interaction (e.g., via an edit interaction screen), a link for deleting the interaction, notes entered for the interaction, and/or the like. The list of interactions may also be associated with one or more inputs for adding a new interaction with the client (e.g., via an add interaction screen which may be similar or identical to the edit interaction screen, but without pre-populated data). When a team member is assigned to an interaction, the team member may receive a notification alerting him or her about the assignment (e.g., via email or in dashboard screen 320 of the team member's account, optionally with a snippet of a message associated with the interaction). Interactions enable team members to communicate efficiently with each other and/or the client.

2.7. Projects

Projects screen 330 may comprise a list of all projects managed by the business and/or the particular business user. Projects screen 330 may be accessible via navigation screen 315 and/or one or more project-related links within other screens. In an embodiment, the list of projects may comprise entries consisting of the most essential information needed for each project, and may be organized into a grid. Each project may be stored as a data structure comprising or associated with parameter values representing information, such as the type of project, name or other identifier of the project, invoice(s) for the project, name or other identifier of the client associated with the project, project start date, project end date, inquiry date, date the project was booked (e.g., date the contract was executed), dates of any provided samples (e.g., photographs, videos, etc.), identifiers of any provided samples, notes about any provided samples, budget for the project, meal services, number of guests, RSVP date, expiration date for the client's access, hashtags associated with the project, taxable state, location of the project, stage of the project, colors for the project, notes for the project, project status (e.g., active, not booked, archived, canceled, etc.), table details (e.g., tables specifications and/or assignments for an event, such as a wedding reception), vendors associated with the project, design worksheet for the project, payment details for the project, contract for the project, project timeline, project-related interactions between business and client and/or within the business, project-related reports, and/or the like.

FIG. 4D illustrates a concrete example of projects screen 330, according to an embodiment. As illustrated, projects screen 330 may comprise a list of projects (e.g., sorted in chronological order). Each entry in the list of projects may comprise a status of the project, a stage of the project, a name or other identifier of the project or invoice associated with the project, a name of the client associated with the project, a type of project, the end date of the project, the inquiry date for the project, an input for editing the project, an input for deleting the project, and/or the like. Projects screen 330 may also comprise project-related statistics for the projects managed by the business or the particular user, including, without limitation, number of inquiries, numbers of communications (e.g., emails, calls, in-person meetings, etc.), number of payments outstanding and/or received, number of projects pending and/or completed, an input for editing the project, an input for deleting the project, and/or the like. In addition, projects screen 330 may comprise a search input for searching the projects based on one or more keywords, a filter input for filtering the projects based on one or more criteria, an add input for adding a new project (e.g., via a project-details screen), and/or the like.

FIG. 4E illustrates a concrete example of a project-details screen for adding or editing a project, according to an embodiment. Graphical user interface 300 may be redirected to the project-details screen in response to the user selecting an input for adding a new project or an input for editing an existing project in projects screen 330. As illustrated, the project-details screen comprises inputs for specifying information about the project. Such information may comprise the type of project, name or other identifier of the project and/or associated invoice, inquiry date, project start date, project end date, booked date, sample date, a list of one or more samples that were provided (e.g., by the client), notes about the provided samples, project budget, meal service, number of guests attending an event (e.g., wedding, wedding reception, party, etc.) represented by the project, RSVP date, client access expiration date, one or more hashtags to be used for tagging social media (e.g., photographs, videos, posts on social media sites, such as Twitter™, Facebook™, Instagram™, etc.) associated with the project, state to which taxes for the project are payable, project location, project stage, project notes, status of the project (e.g., did not book, archive, canceled, etc.), colors associated with the project, table details (e.g., for a wedding reception or other event), inspirational photographs, project-related media, a list of one or more vendors (e.g., including a venue) to be used for the project, a design worksheet, payment information, contract information, a timeline, project-related interactions, project tracking, project-related and/or client-related reports, and/or the like. The project-details screen may also comprise one or more inputs (e.g., checkboxes) for tracking a project's status between booked, not booked, archived, or canceled.

As noted above, the project information may include table details. In an embodiment, a separate table-list screen may be provided for specifying tables associated with a particular project. This table-list screen may be accessible via a link on the project-details screen. The table-list screen may comprise a list of tables. Each entry in the list of tables may comprise a type of table, a number of tables of that type which will be used for the project, the number of guests to be assigned to each table, an identifier of the table type, a length of the table type, a height of the table type, an input for editing the entry, an input for deleting the entry, and/or the like. All of the information about each entry in the list of tables may be edited, for example, via a separate table-details screen by selecting the input for editing the entry. In addition to the information in each entry in the list of tables, this information may comprise a meal service assigned to the table, a purpose of the table, a seating chart (e.g., with assigned guests), and/or the like. The table-list screen may also comprise one or more inputs for adding a new table entry to the list of tables, searching the list of tables, sorting the list of tables, and/or the like.

As noted above, the project information may include project-related interactions. In an embodiment, a separate interactions screen may be provided for tracking interactions associated with the particular project. The interactions screen may be accessible via a link on the project-details screen, and enables a user to track communications between the business and client, as well as notify (e.g., via a user's dashboard 320, email message, etc.) other team members on the project so that they are aware of the communications that have taken place. The interactions screen may comprise a list of project-related interactions. Each entry in the list of interactions may comprise a description or other identifier of the interaction, a department of the business associated with the interaction, a project type, an interaction date, an identifier of a user to whom the interaction is assigned, an input for editing the interaction, an input for deleting the interaction, and/or the like. All of the information about each entry in the list of interactions may be edited, for example, via a separate interaction-details screen by selecting the input for editing the interaction. In addition to the information in each entry in the list of interactions, this information may comprise a project name, notes about the interaction (e.g., to be used to provide details about a conversation between the user and the associated client), and/or the like. The interactions screen may also comprise one or more inputs for adding a new interaction, searching the list of interactions based on one or more keywords, sorting the list of interactions, filtering the list of interactions based on one or more criteria (e.g., a specific time period, specific value for any of the information, etc.), and/or the like.

As noted above, the project information may include inspirational photographs. For example, the client may provide or agree upon one or more photographs that are to be used as inspiration for the decorations and/or theme of an event related to the project. If the event is a wedding, the inspirational photographs may comprise images of objects related to a desired theme of the wedding (e.g., examples of decorations, food, colors, materials, etc. to be used in the wedding; a city, beach, park, or other place that the client desires to see represented in the wedding; examples of other weddings or events; depictions of themes to be used for the wedding; etc.). FIG. 4F illustrates a concrete example of an inspiration screen, according to an embodiment. The inspiration screen may comprise one or more inputs for specifying an inspirational photograph or batch of inspirational photographs (e.g., via drag-and-drop from the user's computer into a dedicated region of the screen, via a selection using the standard browse input, via selection from a library of images accessible to the user and stored in database 114, via a hyperlink to an image on the Internet, etc.), entering a description or notes related to the specified inspirational photograph, and/or the like. In addition, the inspiration screen may comprise a list of inspirational photographs that are currently associated with the project. Each inspirational photograph in the list may be represented by a thumbnail with one or more inputs for viewing the photograph at a higher resolution, downloading the photograph, deleting the photograph, locking the photograph (e.g., by a business user so that it can no longer be edited or deleted by the associated client user), and/or the like. It should be understood that, as inspirational photographs are associated with a project, they are viewable in real time with respect to that project (e.g., by other users, including team members and the client associated with the project). The inspiration screen may also comprise one or more inputs for adding links, notes, and/or the like.

Each inspirational photograph that is added to a project by a user may be stored in association with the project and in a library associated with the user on platform 110. Thus, once a user uploads an inspirational photograph, regardless for which project the user uploaded the inspirational photograph, the inspirational photograph may be accessible and selectable by the user from his or her library for association with any other project, without leaving platform 110. Thus, platform 110 may automatically store user-specific libraries of media that are uploaded by each user, so that each user can access previously uploaded media for repetitive future use. Specifically, the application may store a first copy of any uploaded medium in association with the project for which it was uploaded, and automatically store a second copy of the uploaded medium in a library, associated with the user that uploaded the medium, for future use.

As noted above, the project information may include project-related media (e.g., in addition to or instead of inspirational photographs). For example, the project-related media may comprise photographs or video of actual decorations, cakes, or other objects to be used in a wedding or other event, photographs and/or video captured during the event or during event planning, and/or the like. A screen for managing the project-related media may be similar or identical to the inspiration screen described above. In addition, as with inspirational photographs, the project-related media uploaded by a user may be stored in association with the project and automatically, for future use, in a library associated with the user on platform 110.

As noted above, the project information may include vendors to be used for the project. It should be understood that vendors may include venues. In an embodiment, a separate vendor-list screen may be accessible via a link on the project-details screen. The vendor-list screen may comprise a list of vendors to be used for supplying one or more items for the project (e.g., decorations, flowers, cake, meal service, photography service, venue, party favors, photo booth, etc.). Thus, a user may build a custom directory of vendors for any given project. Each entry in the list of vendors may comprise an industry of the vendor, a name or other identifier of the vendor, a mobile number of the vendor, an input for viewing or editing the vendor, an input for deleting the vendor from the project, and/or the like. All of the information about each entry in the list of vendors may be edited, for example, via a separate vendor-details screen by selecting the input for editing the entry. The vendor-list screen may also comprise one or more inputs for adding a new vendor entry to the list of vendors, searching the list of vendors based on one or more keywords, sorting the list of vendors, filtering the list of vendors based on one or more criteria, and/or the like.

In an embodiment, projects screen 330 and/or one of its sub-screens may provide access to a project worksheet that facilitates management and entry of project information. FIG. 4G illustrates a concrete example of a project-worksheet screen, implementing the project worksheet, according to an embodiment. As illustrated, the project worksheet may comprise panels for project management, color and elements management, a design board, category management, and/or the like.

As illustrated in an embodiment in FIG. 4H, the panel for project management may comprise one or more inputs for specifying project information. This project information may comprise a team member to which the project is assigned (e.g., the current business user or another team member) for purposes of establishing responsibility for the overall management of the project, a date of the project, a date that a sample was provided, an identifier of the provided sample, an expiration date for client access, notes, and/or the like.

As illustrated in an embodiment in FIG. 4I, the panel for colors and elements management may comprise a section for colors and a section for design elements. Each color may represent a color within a color scheme of the project, and each design element may represent an item or product to be used for the project (e.g., in an assembly, as described elsewhere herein). The colors section of the panel may comprise thumbnails of all of the colors that have been associated with the project, and an input for associating a new color to the project. Similarly, the elements section of the panel may comprise thumbnails of all of the elements that have been associated with the project, and an input for associating a new element to the project. Each thumbnail of a color or element may comprise an input (e.g., an "x") for deleting the particular color or element from the project. FIG. 4J illustrates an embodiment of a frame for associating one or more new colors with the project, and FIG. 4K illustrates an embodiment of a frame for associating one or more new elements with the project, according to an embodiment. Each frame may be overlaid in graphical user interface 300 in response to a user's selection of the respective input for associating a new color or element. Each frame may comprise thumbnails of all of the available colors or elements, along with associated checkboxes for selecting each of the colors or elements. Thus, a user may easily select all of the colors or elements to be associated with the project. Each frame may also comprise a search input for performing a keyword search on the colors or elements, and a save input for saving the selected colors or elements in association with the project.

As illustrated in an embodiment in FIG. 4L, the panel for the design board may comprise thumbnails representing inventory items that match the colors and/or elements specified in the color and elements panel. Automatically or in response to user selection of a "populate" input, the application may retrieve any inventory items (e.g., from database 114) that match at least one of the specified colors and comprise at least one of the specified elements. The inventory items may represent specified elements that are in inventory (e.g., to be used to create an assembly) and/or assemblies of two or more elements (e.g., a bouquet of different types of flowers) that are in inventory. Each inventory item may be represented by a thumbnail with one or more inputs for downloading the image of the inventory item, viewing the image in higher resolution, adding the inventory item to the project, removing the inventory item from the project, and/or the like. In addition, the panel may comprise an input for adding a new inventory item from an inventory database (e.g., maintained by the business account) and/or from the user's library. Thus, a user can easily build a custom set of inventory items to be used for the project, for example, by starting from a large set of all inventory items that match the selected colors and elements (e.g., collectively defining a theme of an event represented by the project), and narrowing the large set down to a smaller, custom set of inventory items. Advantageously, this allows an otherwise overwhelming amount of data to be quickly filtered down to the most relevant data, thereby improving the search, storage, and retrieval functions of the application executing on platform 110. This functionality can be especially useful for users that are not familiar with what inventory items are relevant to the particular industry of the project.

As illustrated in an embodiment in FIG. 4M, the panel for category management may comprise a list of selectable categories of items, and sub-panels for pricing, assembly, and tasks related to each selected category of items. Each entry in the list of categories may comprise a name or other identifier of the category, an input for locking the category (e.g., so that it cannot be deleted or otherwise altered by a client), an input for deleting the category, and/or the like. Each category may comprise one or more subcategories with similar entries. The panel may also comprise an input for adding or creating a new category or subcategory to the project.

When a category or subcategory is selected from the list of categories, the pricing, assemblies, and tasks sub-panels may be automatically populated with category information for the selected category or subcategory. Each sub-panel comprises one or more inputs for specifying this category information. For example, the pricing sub-panel may comprise inputs for viewing a questionnaire for the category or subcategory, uploading an image for the category or subcategory, finding related items for the category or subcategory, viewing additional details, and specifying a quantity, requested quantity, unit price, total price, description, whether or not the items in the category or subcategory are being rented, notes, and/or the like for the category or subcategory of items. The pricing sub-panel may also provide a list of rented items that is automatically updated, for example, when an assembly is added that comprises a rented item. The questionnaire, available through the pricing sub-panel may comprise questions for the client to aid in selection of items for the category or subcategory, and may be customized by a user for the business.

As illustrated in an embodiment in FIG. 4N, the sub-panel for the assembly (also referred to as a "recipe") may comprise a list of items used to build the assembly. Each entry in the list may comprise an image of the item, a name of the item, a quantity of the item, a wholesale price of the item, a rental price of the item, a cost of the item, a retail price of the item, a markup amount of the item (e.g., the difference between the cost and retail price), a unit price of the item, an input for deleting the item from the assembly, and/or the like. In addition, the sub-panel for the assembly may comprise inputs for viewing a preparation list for the assembly, a design board for the assembly, adding the assembly to the user's library, adding a location of the assembly (e.g., the location at which the assembly has been stored after being assembled), adding instructions for the assembly (e.g., instructions on how the assembly should be handled for placement or final delivery that are viewable by all or relevant team members), specifying an image of the assembly (e.g., by uploading an image via a drag-and-drop region, selecting an image from the user's library, etc.), checking an availability of rented items for the assembly (e.g., by viewing a list of items that indicates, for each item, whether the item is rented, in inventory on hand, or out of stock), adding a new item to the assembly, and/or the like.

It should be understood that the price (e.g., specified in the pricing sub-panel) of an assembly may be determined based on the price of each item in the list of items included in the assembly. For example, the price of the assembly may be the sum of the cost of each item included in the assembly (e.g., with any markup added). This price may be automatically updated as new items are added, existing items are removed from the assembly, and quantities of existing items in the assembly are changed.

If the user selects the input for adding a new item, a frame may be overlaid in graphical user interface 300, as illustrated in FIGS. 4O and 4P, according to an embodiment. The frame may comprise an inventory tab, as illustrated in FIG. 4O, and an assembly tab, as illustrated in FIG. 4P. The inventory tab may comprise a list of items comprising thumbnails of all of the available items in inventory (e.g., stored in the inventory database for the business), along with associated checkboxes for selecting each of the inventory items and information about each of the inventory items (e.g., name, retail price, wholesale price, markup amount, amount of inventory on hand, size, manufacturer, etc.). The assembly tab may comprise a list of stored assemblies (e.g., in the inventory database, the user's library, etc.) comprising thumbnails of all of the stored assemblies, along with associated checkboxes for selecting each of the assemblies and information about each of the assemblies (e.g., name, rental price, wholesale price, amount of inventory on hand, size, etc.). The assembly tab may also comprise a drop-down menu for selecting a category or subcategory of assemblies. Each tab may also comprise a search input for performing a keyword search on the respective list, and a save input for saving the selected entries in association with the selected category or subcategory.

If the user selects the input for viewing the preparation list, a frame may be overlaid in graphical user interface 300, as illustrated in FIG. 4Q, according to an embodiment. A user may select a populate input to populate the preparation list with instructions for assembling the items listed for the assembly, or the instructions may be automatically populated into the preparation list. In an embodiment, the instructions may be retrieved from database 114, which may store a default instruction in association with each item. For example, each direction in the preparation list may comprise a location of the item to which the direction pertains, preparation instructions for preparing the item, care instructions for the caring for the item, a name or other identifier of the item, a quantity of the item to be used, a size of the item, when to prepare the item, an input for editing the instruction, an input for deleting the instruction, and/or the like. The frame may also comprise an input for adding instructions, a search input for searching the instructions by keyword, and a save input for saving the preparation list. Thus, advantageously, preparation lists can be automatically created for each assembly, for a virtually infinite number of assemblies, whereas previously each preparation list would have had to be painstakingly created manually. In other words, the use of item data structures to store default instructions in database 114 enables the automated creation of custom preparation lists for a virtually limitless number of assemblies, thereby improving conventional methods of creating preparation lists which were not previously capable of being automated. It should be understood that the preparation list may be added to various reports (e.g., the logistic report) and/or be printable so that it can be easily provided to those responsible (e.g., a team member, a caterer if the preparation list is for a recipe or meal service, a florist if the preparation list is for a bouquet or centerpiece, any other vendor responsible for the assembly, etc.).

If the user selects the input for the design board for the assembly, a frame may be overlaid in graphical user interface 300, as illustrated in FIG. 4R, according to an embodiment. The frame may comprise a list of items, in the selected category or subcategory, that correspond to the specified colors and/or elements for the project. Each entry in the list of items may comprise an input for selecting the item for the assembly, a thumbnail of the item, a name of the item, a rental price of the item, a wholesale price of the item, a quantity of the item on hand in inventory, a size of the item, and/or the like. The frame may also comprise a search input for searching the items by keyword, and a save input for saving the selected items as the assembly. Using this design board, the user can quickly access items and build assemblies that are appropriate for the project (e.g., match the theme, defined by colors and elements), while simultaneously understanding the cost of the assembly. In other words, the design board enables a user to more quickly and easily navigate and aggregate the voluminous and disparate data stored in database 114, thereby solving the technological problem of how to store, retrieve, view, and otherwise manage such large amounts of data in a manner that is accessible to humans.

If the user selects the input for adding the assembly to the user's library, a frame may be overlaid in graphical user interface 300, as illustrated in FIG. 4S, according to an embodiment. The frame may comprise one or more inputs for specifying information to be associated with the assembly, and a save input that, when selected, saves the assembly in association with the specified information into the user's library (e.g., stored in database 114). The specifiable information may comprise, without limitation, a name for the assembly, a category of the assembly, a description of the assembly, notes related to the assembly, whether or not the assembly is active, one or more colors associated with the assembly, and/or the like. Advantageously, the association of color(s) with the assembly enables the application to retrieve the assembly by its color (e.g., for a design board in a future project). In an embodiment, the color(s) to be associated with an assembly may be automatically populated with the color(s) associated with the individual items in the assembly. For example, an assembly comprising red and white items may be automatically associated with both the red and white colors.

The sub-panel for project-related tasks may comprise a list of tasks that are associated with the selected category. A user may add or edit a task using the frame illustrated in FIG. 4T, according to an embodiment. The user may specify information for each task, such as the user to which the task is assigned (e.g., via a drop-down menu of available users), logged in user name, task status, assignment notes, task notes, and/or the like. When a user is assigned to a task, a notification may be sent to the assigned user via the assigned user's dashboard 320 and/or email. The assigned user may modify the task status as needed (e.g., to "completed" once the task has been completed).

As noted above, the project information may include payment information. The payment information may be used to generate financial reports for the business (e.g., for accounting and tax purposes). The payment information may be represented in a payment screen. FIGS. 4U-4W illustrate a fee tab, invoice tab, and payments tab of the payment screen, respectively, according to an embodiment.

As illustrated in FIG. 4U, the fee tab may comprise a list of fees (e.g., administrative fees, credit card fees, gratuities, etc., as a percentage of cost) to be added to the cost of the project. Each entry in the list of fees may comprise a type of fee, an editable specification of the fee (e.g., percentage), an amount of the fee, an input for deleting the fee, and/or the like. The fee tab may also comprise an input for adding a new fee to the list of fees.

As illustrated in FIG. 4V, the invoice tab may comprise a representation of an invoice to the client, including line-item costs, fees, taxes, sub-totals (e.g., by category), discounts (e.g., with notes), a total amount owed, received payments, a remaining balance (i.e., the difference between the total amount owed and received payments), and/or the like. All of the values in the invoice tab may be automatically calculated by the application (e.g., using prices associated with assemblies and/or other inventory items, rentals, vendors, etc.). The invoice tab may also comprise one or more inputs for publishing the invoice (e.g., to make it accessible to the client to which the invoice pertains, via platform 110 (e.g., via a Uniform Resource Locator (URL)), prior to execution of a contract), download the invoice (e.g., in any standard format, such as Portable Document Format (PDF)), and/or the like.

As illustrated in FIG. 4W, the payments tab may comprise a list of projected payments, a list of received payments, and a list of payment tasks. Each entry in the list of projected payments may comprise a name of the payment, a due date of the payment, an amount per installment, a percentage per installment, an input for sending, setting, or viewing reminders to the client, an input for deleting the projected payment, and/or the like. These entries may be automatically calculated and scheduled based on a payment plan agreed upon with the client (e.g., in the executed contract). The list of projected payments may also provide a total invoice amount, total projected amount (which may be distinguished in red until it matches a total due amount), and a contracted amount. Each entry in the list of received payments may comprise a number of the payment, a late fee, a payment date, a received amount, a payment method, payment details, a name or other identifier of a team member that received the payment, payment notes, an input for editing the entry, an input for deleting the entry, and/or the like. Each entry in the list of payment tasks may comprise a name or other identifier of the team member to which the task is assigned, a task status, task notes, an input for editing the task, an input for deleting the task, and/or the like. Each list may be associated with an input for adding a new entry.

As noted above, the project information may include contract information. The contract information may be represented in a contract screen. In an embodiment, the contract screen comprises a proposal tab, a contract tab, an upload contract tab, a proposal history tab, a contract history tab, and an additional documents tab.

FIG. 4X illustrates a concrete example of the proposal tab of the contract screen, according to an embodiment. The proposal tab may comprise one or more inputs for generating a proposal, downloading a generated proposal, sending a generated proposal to the associated client, and downloading a tiered proposal. User selection of the input for generating a proposal may result in a frame being overlaid in graphical user interface 300 with inputs for specifying parameters of the proposal. User selection of the input for downloading the proposal may result in the proposal being downloaded in a ubiquitous format (e.g., PDF). The proposal may include the name of the client, the date of the event associated with the project, the details and pricing of the project (e.g., fees, discounts, taxes, total cost due), a projected payment schedule, and/or the like. The tiered proposal may be similar to the regular proposal, but may comprise a range of prices (e.g., based on price ranges of items set by the user), so that the client can see how pricing is affected by various option selections. User selection of the input for sending the proposal to the client may result in sending a notification to the client (e.g., via a client user's dashboard 320, email, etc.), and optionally an administrative user (e.g., business owner) who is responsible for the client (e.g., unless that user is the same as the user generating the proposal). In an embodiment, the proposal tab or other portion of the contract screen may provide an indication of the status of the proposal (e.g., whether or not the client has opened or reviewed the proposal). The application may automatically determine that the client has opened the proposal if the client logs in to the client account and views the proposal through graphical user interface 300 (e.g., via the client's version of the contract screen), and update the status of the proposal accordingly.

FIG. 4Y illustrates a concrete example of the contract tab of the contract screen, according to an embodiment. As illustrated, when no contract has yet been specified, the contract tab may overlay a frame for selecting a template to be used for the contract. A user may select a contract template, for example, from a drop-down menu, to add a contract. Each contract template may be a data object that is stored in a data structure in database 114 in association with a particular business or user (e.g., in a business library or user library), or available to every business user of platform 110 (e.g., in a global library). The application may automatically populate the contract template with business-specific, client-specific, and/or project-specific information to generate a custom contract between the business and client. For example, personal data about the client and the client's preferences may be populated into a contract template that fits the client's particular budget with specific contract terms for options of event features that the client has chosen based on the client's desired price points. Once generated, the user may send the contract to the client for execution (e.g., electronically, via the client user's dashboard 320 or email message, or as a hard copy).

FIG. 4Z illustrates a concrete example of the upload contract tab of the contract screen, according to an embodiment. As illustrated, the upload contract tab may comprise an input for uploading an executed contract (e.g., a PDF document representing a contract that has been manually or electronically executed by both the business and the client). In addition, the upload contract tab may comprise a list of tasks related to executing the contract (e.g., obtaining business's signature, obtaining client's signature, etc.). Each entry in the list of tasks may comprise a name or other identifier of the team member to which the task is assigned, the status of the task, notes, an input for editing the task, an input for deleting the task, and/or the like.

In an alternative embodiment, the upload contract tab may be replaced with an execution tab comprising one or more inputs for electronically executing the contract via an electronic signature (e.g., via authentication, via drawing of a signature using a touch sensor on a user system 130, etc.). This embodiment can reduce time and energy required for executing the contract by allowing the parties to the contract to execute the contract at their convenience, for example, using their mobile devices.

Once a contract has been uploaded, the contract tab may be updated as illustrated in FIG. 4AA, according to an embodiment. As illustrated, the contract tab may now comprise a representation or screenshot of the contract, along with inputs (e.g., checkboxes) for indicating whether or not the contract has been executed by the client and whether or not the contract has been executed by the business. In an embodiment, the client account is not established until after the contract has been fully executed. In this embodiment, when the user interacts with the inputs to indicate that the contract has been executed by both the business and the client, the application may automatically trigger an inquiry (e.g., email message with prompt and hyperlink to registration screen 310) to the client to become a user of the application (e.g., by registering with the application via registration screen 310). In addition, the contract tab may comprise one or more inputs for downloading the contract (e.g., in PDF), sending the executed copy of the contract to the client (e.g., a PDF copy via email message, etc.), deleting the contract (e.g., if inadvertently uploaded), and/or the like. The contract tab continues to comprise a list of tasks.

FIG. 4AB illustrates a concrete example of the proposal history tab of the contract screen, according to an embodiment. As illustrated, the proposal history tab may comprise a list of proposals generated for the project. In other words, the application automatically saves (e.g., in database 114) all versions of the proposal generated for a project. Each entry in the list of proposals may comprise a date on which the proposal was generated, a date on which the proposal was sent to the client, a date on which the proposal was viewed by the business, a date on which the proposal was viewed by the client, an input for downloading the proposal, and/or the like. Thus, the user can easily view all versions of the proposal that have been generated for the project. In addition, the proposal history tab may comprise a search input for searching the list of proposals based on one or more keywords.

FIG. 4AC illustrates a concrete example of the contract history tab of the contract screen, according to an embodiment. As illustrated, the contract history tab may comprise a list of contracts generated and/or uploaded for the project. In other words, the application automatically saves (e.g., in database 114) all versions of the contract generated for a project. Each entry in the list of contracts may comprise a name or other identifier of the contract, a date on which the contract was generated, a date on which the contract was sent to the client, a date on which the contract was signed, an input for downloading the contract, and/or the like. Thus, the user can easily view all versions of the contract that have been generated for the project. In addition, the contract history tab may comprise a search input for searching the list of contracts based on one or more keywords, a filter input for filtering the list of contracts based on one or more criteria, and/or the like.

FIG. 4AD illustrates a concrete example of the additional documents tab of the contract screen, according to an embodiment. As illustrated, the additional documents tab may comprise an input for uploading an additional document (e.g., a PDF document representing something other than the contract, such as an addendum to a previously executed contract), and a list of all additional documents that have been uploaded. Each entry in the list of additional documents may comprise a name or other identifier of the document, a date on which the document was generated or uploaded, a date on which the additional document was sent to the client, an input for downloading the document, an input for deleting the document, and/or the like. In addition, the additional documents tab may comprise a list of tasks related to the additional documents (e.g., filling out a document, obtaining a signature on a document, etc.). Each entry in the list of tasks may comprise a name or other identifier of the team member to which the task is assigned, the status of the task, notes, an input for editing the task, an input for deleting the task, and/or the like.

As noted above, the project information may include project notes. FIG. 4AE illustrates a concrete example of a notepad screen, according to an embodiment. The user may utilize the notepad screen to add a virtually unlimited number of notepads. For example, a user may add a notepad by selecting a template (e.g., from a drop-down menu) from a plurality of templates (e.g., stored in database 114) to be used for the notepad. Templates may be provided for notepads that can be used to store free-form notes for the project, a timeline of the project, bodies or templates of email messages related to the project, questionnaires for an event or other aspect of the project, and/or the like. As illustrated, the notepad screen may comprise a panel with a list of notepads. Each entry in the list of notepads may comprise a description of the notepad (e.g., the template used, a summary or subset of text in the notepad, etc.), the creator of the notepad, whether or not access to the notepad is locked, an input for editing the notepad, an input for deleting the notepad, an input (e.g., toggle input) for publishing the notepad, and/or the like. When a notepad is not published, it is neither viewable nor editable by the client. When a notepad is published and locked, it is viewable but not editable by the client. When the notepad is published and unlocked, it is viewable and editable by the client. In addition, the notepad screen may comprise a search input for searching the notepads based on one or more keywords, an input for adding a new notepad, and/or the like. As illustrated, when a user selects one of the notepads from the list of notepads, an adjacent panel in the notepad screen may be automatically populated with the contents of the notepad. This adjacent panel may comprise one or more inputs for downloading the notepad (e.g., as a PDF, Microsoft Word™ DOCX, or other electronic document), as well as editing the contents of the notepad, for example, via a word-processing interface that enables the user to write a timeline in a rich text format (e.g., different sized text, fonts, colors, italics, weights, underlining, etc.).

As noted above, the project information may include project-related interactions (e.g., between team members and the client). In an embodiment, an interaction comprises a message. For example, the application may provide an internal messaging system. Thus, team members can chat with client users via the internal messaging system, and client users can chat with team members via the internal messaging system, on various customized topics related to the project. This can help create and maintain boundaries between team members and the client. It should be understood that interactions need not be limited to interactions via an internal messaging system. For example, the application may interface with one or more messaging gateways to automatically record interactions (e.g., SMS messages, MMS messages, email messages, etc.) occurring through the messaging gateway(s), users may manually record transactions (e.g., by selecting a type of interaction, and inputting a description of the interaction), and/or the like.

In an embodiment, a separate interactions-list screen for a project may be accessible via a link on the project-details screen. The interactions-list screen may comprise a list or log of all project-related interactions (e.g., communications, meetings, etc.) with the client. Thus, all of the interactions can be reviewable in one location for easy management. Each entry in the list of interactions may comprise a type of the interaction (e.g., chat, telephone call, email, in-person, etc.), a description or notes about the interaction, a date on which the interaction occurred, an input for replying to the interaction, an input for deleting the interaction, and/or the like. The interactions-list screen may also comprise one or more inputs for adding a new interaction, for example, by specifying a type of interaction and a description of the interaction.

As noted above, the project information may comprise project tracking. FIG. 4AF illustrates a concrete example of a project-tracking screen, according to an embodiment. The project-tracking screen may comprise separate lists of tasks for different sub-projects within the project. For example, the sub-projects for a wedding project may comprise maintaining a wedding blog, sending email messages to the client and/or wedding guests, sending thank-you cards or email messages to the wedding guests, managing inventory for the wedding and reception, sending anniversary cards or email messages to the client one or more years after the wedding, and/or the like. Tasks for the wedding blog may comprise publishing the blog, writing blog entries, and/or the like. Tasks for the emails may comprise setting up an email broadcast, sending thank-you emails, sending follow-up emails, sending welcome emails, and/or the like. Tasks for inventory management may comprise obtaining items, returning rental items, creating assemblies, and/or the like. Tasks for office logistics may comprise sending a thank-you card or email message to the client, checking mail, and/or the like. Each entry in the lists of tasks may comprise a description or other identifier of the task, a due date for completion of the task (e.g., with or comprising an input for editing this value), a name or other identifier of a team member to whom the task is assigned (e.g., with or comprising an input for editing this value), a completion date of the task (e.g., with or comprising an input for editing this value), a name or other identifier of a team member who completed the task (e.g., with or comprising an input for editing this value), and/or the like.

As noted above, the project information may include project-related and/or client-related reports. These reports may be represented in a reports screen for the business. FIGS. 4AG and 4AH illustrates a client-reports tab and a project-reports tab of the reports screen, respectively, according to an embodiment. The application may generate the reports automatically, based on data stored for the client and/or project (e.g., in database 114). Users can create reports and summaries to stay organized and maintain the accountability of team members. In an embodiment, users may select from a predefined set of reports. Alternatively, the application may provide a screen with inputs that the user may use to create custom reports from any of the data managed by platform 110 for a project.

As illustrated in FIG. 4AG, the client-reports tab comprises a list of client-related reports. Each entry in the list of reports may comprise a name of the report, a description of the report (e.g., via a link to a pop-up informational frame), an input for downloading the report (e.g., as a PDF file, comma separated values (CSV) file, spreadsheet file, etc.), and/or the like. Example reports include, without limitation, a worksheet report, a worksheet report without price information, a project summary of order, a project work order, a pull list, a preparation list, an executive summary, a payments report, and/or the like. The worksheet report may comprise a client's name, date of the project, project details (e.g., colors, elements, items with prices and quantities, assemblies with component items), project description, project notes, any questionnaires with answers, status, name or other identifier of the assigned team member, and/or the like. The project summary of order may comprise categories and subcategories of assemblies with source (e.g., client, rental, perishable, disposable, non-inventory, non-rental, etc.), and with like items consolidated to facilitate a user's ability to efficiently order or otherwise acquire the items. To facilitate manipulation of data, the project summary of order may be provided as a CSV or spreadsheet file. The project work order may comprise the cost of a project based on the items (e.g., individual items, assemblies, etc.), to facilitate an understanding of the project's expense. The pull list may comprise a list of all items that need to be acquired (e.g., pulled from inventory, purchased, rented, etc.), with each entry in the list of items comprising an image of the item, name or other identifier of the item, color of the item, location of the item in inventory, quantity of item, size of item, description of item, directions for preparing the item, name or other identifier of the team member who pulled the item (e.g., blank to be filled in upon acquisition of the item), and/or the like. The pull list can be used by team members to acquire all non-perishable items, while understanding exactly what they are acquiring and how it is to be used. The preparation list may comprise for each category and sub-category of assemblies, the items required for the assembly, the location of the items or assembly, the quantity of the assembly, the size of the assembly, the name or other identifier of a team member assigned to pull the assembly, the name or other identifier of a team member assigned to prepare the assembly, a time and/or date on which to prepare the assembly, directions for preparing the assembly, and/or the like. The preparation list can be used to quickly educate team members on how to prepare the assemblies, without the need for human instruction, which would tie up another team member's time. Notably, the application may provide default preparation instructions for assemblies (e.g., stored in database 114) that can be customized by users for storage in and future retrieval from their user libraries. The worksheet report without price information may comprise the same information as the worksheet report but without prices for items. The executive summary report may comprise a list of each category and subcategory of assemblies with description, quantity, indications of who has approved the totals (e.g., representatives of the client and/or business), and/or the like.

As illustrated in FIG. 4AH, the project-reports tab may comprise a list of project-related reports. Each entry in the list of reports may comprise a name of the summary, a description of the summary (e.g., via a link to a pop-up informational frame), an input for downloading the summary (e.g., as a PDF file), and/or the like. Example reports include, without limitation, a logistics summary, a breakdown, and/or the like. In addition, one or more event-specific reports may be provided, such as a bouquet summary for a wedding project. One or more of the reports may be intended for use on the day of the event to which the project is directed. For example, they may help team members with information, such as the location of the event, date of the event, start time of the event, end time of the event, name of the client, list of vendors, responsible team members, photographer's arrival time, set up date, breakdown date and time, whether or not team members need to be present during the event, mobile numbers, delivery addresses, if any items are being repurposed, project-related notes, and/or the like. Thus, the project-related reports can help team members be independent and productive during execution of the event, with minimal error. For example, the logistics summary may comprise all of the logistical details (e.g., what, when, where, etc.) for easy reference by the team leader of the project, vendors, and/or the like. These logistical details may facilitate social media engagement (e.g., when and what to post throughout the event), networking, assembly of items, and/or the like. The breakdown may be automatically populated with information about any rental items (i.e., items associated with the project that are marked as rentals), including, for each rental item, the name or other identifier of the team member assigned to the rental item, the rental location (e.g., address of rental store), the start time of the rental, the end time of the rental, what to bring to the rental location, when to bring the item back to the rental location, how many items to bring back to the rental location, and/or the like. Team members may use the breakdown to document how many items were unloaded and where to return the items to complete the project.

As noted above, the project information may include a design worksheet. FIG. 4AI illustrates a concrete example of a design worksheet, according to an embodiment. As illustrated, the design worksheet may comprise panels for worksheet management, colors and elements management, a design board, category management, and/or the like. The panel for worksheet management may comprise one or more inputs for specifying worksheet information, such as a team member to which the worksheet is assigned, a date that a sample was provided, a name or other identifier of the sample that was provided, and any notes on the assignment. The panel for colors and elements management, the design board, and category management are described elsewhere herein with respect to the project worksheet, and therefore, will not be redundantly described in this section.

As noted above, the project information may include a timeline. In an embodiment, a separate timeline-list screen may be provided for creating one or more timelines for the project. This timeline-list screen may be accessible via a link on the project-details screen. The timeline-list screen may comprise a list of timelines. Each entry in the list of timelines may comprise a name or other identifier of the timeline, an input for editing the timeline, an input for deleting the timeline, and/or the like. When an entry in the list of timelines is selected, a preview of the selected timeline may be provided adjacent to the list of timelines. The timeline-list screen may also comprise one or more inputs for adding a new timeline to the list of timelines. When adding a new timeline, the user may be prompted to select one of a plurality of timeline templates (e.g., from a drop-down menu) that define different types of timelines, and then fill the timeline with one or more assigned tasks. As illustrated in FIG. 4AJ, in an embodiment, the input for inputting the timeline may comprise a textbox for inputting a title, and a word-processing interface that enables the user to write a timeline in a rich text format (e.g., different sized text, fonts, colors, italics, weights, underlining, etc.). When a new timeline is created, notifications may be sent to each team member with an assigned task (e.g., via the team members' respective dashboards 320). In addition, a timeline may be published to the client and/or the vendors of the project (e.g., close to the date of an event of the project, so that the client and/or vendors know how to care for, prepare, set up, and/or breakdown relevant items). In an alternative embodiment, the timeline may be conflated with the notepads discussed elsewhere herein, such that timelines are implemented as one type of notepad template.

2.8. Master Data

Master data screen 335 may comprise a plurality of screens for viewing and/or editing different subsets of data that will be used across the plurality of clients and projects managed by a particular business. While each of these screens and data subsets will be described in turn, it should be understood that graphical user interface 300 may comprise fewer, more, or different screens than those described for editing fewer, more, or different data subsets than those described. Thus, for example, an embodiment could omit one or more of the described screens or data subsets, as well as include screens or data subsets that are not specifically described herein. It should be understood that master data screen 335 may only be accessible and/or editable by an administrator of the business account (e.g., a user with an administrative role). Thus, users that do not possess an administrative role may not have access to master data screen 335 and may not even have a visible link to master data screen 335 in their navigation screen 315. Alternatively, master data screen 335 may be accessible and/or editable to business users with other roles or all business users.

Master data screen 335 may comprise one or more customizable-data screens that provide inputs for specifying business-specific data that may be used by all users associated with the business and across all clients and/or projects managed by the business. It should be understood that a plurality of companies may have accounts with platform 110. Thus, this business-specific data enables each business to customize its account with platform 110 (e.g., to match its brand), such that different companies may have customized data that are different than other companies with accounts on platform 110. However, to provide turnkey service, when a business first registers its account, its business-specific data may be automatically populated with default values, such that the business can begin using platform 110 immediately. The set of default values to be used to automatically populate the business-specific data may be based on the industry of the business. For example, each of a plurality of industries may be associated with a different set of default values, and the set of default values associated with the particular industry selected by a business user (e.g., when registering through registration screen 310) may be used to initially populate the business-specific data for the business account. It should be understood that these default values may subsequently be modified by the business user as needed or desired.

The data may be updated in real time for all users. Thus, as data is updated via master data screen 335 by one user, the data appearing in graphical user interface 300 seen by other users is also automatically updated. This is because all of the data may be pulled from the same database 114, such that all data across all user is always in synchrony. However, it should be understood that there may be some delay between an update to data in database 114 and an update to the same data in the graphical user interfaces 300 of other users, due to the latency in pushing, pulling, storing, and retrieving the data over network 120. In an embodiment, graphical user interface 300 may be dynamically updated (e.g., by platform 110 pushing out any updates or graphical user interface 300 periodically polling for updates), while in another embodiment, graphical user interface 300 may need to be refreshed by the user. Conflicting changes to data (e.g., two users altering the same data in different ways) may be handled using any known conflict-resolution techniques.

Each customizable-data screen may enable modification of a subset of the business-specific data. In an embodiment, unless otherwise specified, each of the customizable-data screens generally comprises an editable list of values that represent available options for the value of various parameters described herein. For example, the options may represent the available values for a parameter (e.g., to be specified in a drop-down menu) in one or more of the screens described herein. Each entry in a list of values in a customizable-data screen may comprise the value, the status (e.g., a toggle input for toggling the status of the value between active and inactive), an input for editing the value (e.g., via a pop-up frame with inputs for specifying one or more parameters representing the value), an input for deleting the value, and/or the like. In the event that values in a list are associated with an image, each entry in the list of values may also comprise a thumbnail of the image with which the value is associated. When a value's status is active, it is available to be selected (e.g., by appearing in drop-down menus, color panels, and other selection inputs), and, when a value's status is inactive, it is no longer available to be selected (e.g., by no longer appearing in selection inputs). Thus, instead of deleting a value, a user can temporarily deactivate the value, for example, if the user contemplates reactivating the value at a future time. In addition, each list may be associated with an add input for adding a new value to the list, a search input for searching the data based on one or more keywords, one or more filter inputs for filtering the data based on one or more criteria, and/or the like.

The customizable subsets of the business-specific data may comprise one or more, and potentially all, of the following:

Category data, comprising values representing available categories and subcategories of inventory that may be utilized by users, for example, to group assemblies and/or other inventory items (e.g., blooms, equipment, fabric draping, furniture, hard-good vases, hard-good décor, hard-good supplies, etc.).

Colors data, comprising values representing available colors that may be utilized by users, for example, to associate projects, inventory items, elements, and/or the like with one or more specific colors. Each value in the colors data may also be associated with an image of a color swatch representing the color represented by the value.

Communication methods data, comprising values representing available communication methods that may be utilized by users, for example, to specify a method of communication (e.g., email, in-person meeting, Facebook™ message, Instagram™ direct message, internal messaging system, telephone, text message, other type of communication, etc.).

Contracts data, comprising templates that may be utilized by business users, for example, to generate contracts for projects.

Elements data, comprising values representing available elements that may be utilized by users, for example, to identify inventory items to be used in a project.

Fee data, comprising values representing available fees or other line items that may be utilized by business users, for example, to calculate invoice costs when billing a client for a project (e.g., administrative fee, sample fee, delivery fee, fuel fee, set-up fee, breakdown fee, discount, rental fee, late fee, planning fee, refundable deposit, site-visit fee, etc.). Each fee may be defined in the fee data by a description of the fee, calculation type (e.g., percentage, dollar amount, etc.), a value of the fee (e.g., a percentage number if the calculation type is percentage, a dollar amount if the calculation type is dollar amount, etc.), an indication of whether or not the fee is taxable, an indication of whether or not the fee is administrative, and/or the like.

Industry data, comprising values representing available industries (e.g., for vendors, venues, etc.) that may be utilized by users, for example, to specify an industry of a vendor (e.g., artist, bakery, band, barns and farms, bartender, beauty and health, beverage, calligrapher, caricature artist, catering, churches and temples, etc.). Each value in the industry data may also be associated with an indication of whether or not the value represents a venue, so that the application can distinguish venues from other types of vendors.

Interaction tracking data, comprising values representing available types of interaction that may be utilized by users (e.g., contract, design, general email, initial call, inquiry, invoice, meeting, mock up, payment, proposal, team interaction, timeline, walkthrough, other type of interaction, etc.).

Manufacturer data, comprising values representing available manufacturers that may be utilized by users, for example, to specify the manufacturer of an element or inventory item, so that they can be searched and/or filtered by manufacturer, the manufacturer can be included in the worksheet report to facilitate ordering, and/or the like. Each value in the manufacturer data may comprise a name of the manufacturer, an email address of the manufacturer, a telephone number of the manufacturer, and/or the like.

Material data, comprising values representing available materials that may be utilized by users, for example, to specify the material of elements or inventory items (e.g., acrylic, bamboo, birch, bloom, brass, cardboard, ceramic, concrete, copper, crystal, drift, fabric, fiberglass, galvanized, etc.) so that they can be searched and/or filtered by material.

Meal services data, comprising types of meal service that may be utilized by users, for example, to specify the meal service to be used for an event of a project (e.g., buffet, cocktail, family, food truck, French, plated, other type, etc.). A selected meal service may be useful, for example, in determining the size of a centerpiece or floral arrangement for each table, table setting details, number of guests per table, and/or other project-related details.

Measurement data, comprising values representing available units of measurement that may be utilized by users, for example, to specify the dimensions of elements or inventory items (e.g., centimeter, meter, inches, feet, etc.).

Media library, comprising media files in a business-specific library that may be utilized by business users of that particular business account and/or client users managed by that particular business account, for example, in any place where photographs or other media may be associated with a data object. The media library may be arranged into a plurality of sub-libraries or folders, representing different categories of media.

Notepad data, comprising notepad templates that can be used across projects. For example, a user may select a notepad template for use in the notepad screen for a project. Each notepad template may comprise one or more fields (e.g., within static text) that can be used to organize notes associated with a particular data object (e.g., project). Notepad templates may be created in a similar or identical manner as timelines (e.g., as described with respect to FIG. 4AJ). In an embodiment, notepads may be used as a substitute for timelines. For example, instead of timelines, one or more notepad templates may be configured as a timeline.

Payment configuration data, comprising payment configurations that may be utilized by users, for example, to specify a payment plan for a client (e.g., ten installments of 10% of the total due, four installments of 25% of the total due, etc.). Each payment configuration may be defined in the payment configuration data by a description of the payment configuration, a type of payment configuration (e.g., percentage, dollar amount, etc.), an installment amount (e.g., if the type of payment configuration is dollar amount), and/or the like.

Payment method data, comprising payment methods that may be utilized by client userts (e.g., barter, cash, cash app, certified check, Chase™ quick pay, in-person credit card, over-the-phone credit card, Paypal™, personal check, Venmo™, Zelle™, etc.).

Project budget data, comprising project budgets (e.g., ranges with a minimum and/or maximum dollar amount) that may be utilized by users, for example, to set the budget for a project (e.g., $1500-$2000, $2000-$3000, $3000-$3500, $3500-$4000, etc.). In an embodiment, a prospective client may select one of the project budget options (e.g., when submitting a contact form), to help a business user vet or screen prospective clients. For example, business users could specify a minimum and/or maximum budget that they are willing to accept, and prospective clients may be screened or routed (e.g., automatically screened or routed by the application) based on the business user's specified budget range.

Project stages data, comprising values representing available types of project stages that may be utilized by users, for example, to specify the stage of a client's project (e.g., inquiry, email follow up, discovery call, in-person meeting, proposal sent, lost lead, contract sent, contract signed, payment, rescheduled, completed/delivered, canceled, etc.). Each value in the project stages data may also be associated with a display order, such that the values are always displayed in their specified display order (e.g., in a drop-down or other selection menu). Advantageously, this may allow more frequently used project stages to be displayed first to increase selection efficiency.

Project tracking data, comprising tracking categories and subcategories that may be utilized by users, for example, for tracking a project (e.g., categories of client information, emails, gifts, office logistics, photographer, post event, reviews, restocking of rental inventory, warehouse, etc., and subcategories of added to calendar, client info added, contract filed, contract scanned, dress swatch received, etc.). For example, each tracking category may be associated with zero or more subcategories or "tasks" (e.g., a blog tracking category may be associated with tasks, such as write the blog, and publish the blog). The project tracking data enables a user of a business account to track tasks within a project workflow. Allowing the project tracking data to be customized enables the business to expand its workflow as its business grows.

Project type data, comprising project types that may be utilized by users, for example, to specify a type of project (e.g., anniversary, baby shower, birthday party, bridal shower, corporate event, engagement party, event planning, everyday order, fundraiser, holiday party, other, wedding, etc.). The project type data may also comprise one or more delivery types (e.g., for all project types or associated with individual project types) that may be utilized by users, for example, to specify how or where the project is to be delivered (e.g., where the event is to occur, such as a home, hotel, park, as a pick up, restaurant, venue, etc.). For example, the delivery type for a project may be included, along with time and location of the delivery, in the logistics report for the project.

Referral source data, comprising values representing available referral sources that may be utilized by users, for example, to specify the source that referred a client to the business (e.g., Facebook™, friend/family, Google™, Instagram™, online search, past client, podcast, staff, The Knot™, Thumtack™, other source, etc.).

Roles data, comprising values representing available roles that may be assigned by users, for example, to specify the role of each participant in a project (e.g., assistant, bride, client, father, friend, groom, manager, mother, other, owner, planner, etc.).

Sample data, comprising values indicating the provision status of a sample that may be utilized by users, for example, to specify whether or not a sample was provided (e.g., yes, no, to be determined, not available, etc.).

Shape data, comprising values representing available shapes that may be utilized by users, for example, to specify the shape of elements and/or inventory items (e.g., bell, circular, clustered, cone, crescent, cube, cup, cylinder, etc.) so that they can be searched and/or filtered by shape. Each value in the shape data may also be associated with an image representing the shape represented by the value.

Source data, comprising values representing available sources that may be utilized by users, for example, to specify the source of elements or inventory items (e.g., clients, disposable, non-inventory, inventory, non-rental, perishable, rental, etc.) so that they can be searched and/or filtered by source, the source can be included in the project summary, and/or the like.

Suffix data, comprising values representing available suffixes that may be utilized by users, for example, to specify the name suffix of a client, lead, vendor, contact, or other individual (e.g., D.O., II, III, Jr., M.D., P.A., Ph.D, Sr., etc.).

Tax data, comprising values indicating a tax rate per state that may be used to calculate taxes for amounts due on projects. For example, when generating invoices, the application may apply a tax percentage associated with the client's state of residence, the state in which an event of the project is to occur, the state of a vendor (e.g., venue) that is being used, and/or the like.

Timeline data, comprising timeline templates that may be utilized by business users, for example, to generate timelines for projects.

Title data, comprising values representing available titles that may be utilized by users, for example, to specify the title of a client, lead, vendor, contact, or other individual (e.g., Dr., Miss, Mr., Mrs., Ms., etc.).

Worksheet data, comprising worksheet categories and subcategories that may be utilized by users, for example, for project or design worksheets (e.g., categories of bouquets, boutonnieres, ceremony, cocktail, corsage, draping, event planning, everyday order, furniture and props, garland, memory table, reception, team essentials, etc., and zero or more subcategories for each category, such as, for the bouquets category, bridal bouquet, bridesmaid bouquet, flower girl bouquet, hair crown, etc.). For example, each worksheet category may be associated with zero or more subcategories (e.g., a "bouquet" category may comprise subcategories of "bride's bouquet," "maid of honor," "bridesmaid bouquet," "toss away bouquet," "mother's bouquet," "hair crown," "flower girl," "ring bearer," "hair flowers," "other," etc.). Each category may be associated with a display order (e.g., to specify the order in which categories are displayed in graphical user interface 300, such as in a worksheet or contact form), and each subcategory may be associated with a display order, a visibility status (e.g., whether or not to be shown to clients), a taxable status, a first price, a second price, a third price, a default price (e.g., from among the three prices), a status, and/or the like. The subcategories can be used to organize invoices, and to more quickly create proposals. In addition, each subcategory can be associated with a questionnaire that is designed to elicit information from a client. For example, each questionnaire may comprise a list of question objects, wherein each question object comprises a question to be asked, a status (e.g., active, in which case the question is included in the questionnaire, or inactive, in which case the question is excluded from the questionnaire), and an indication of whether or not the question is internal (i.e., to be answered by, and only visible to, team members) or external (i.e., to be answered by and visible to the client). In an embodiment, the questionnaires for all subcategories can be viewed in the project and/or design worksheets, as well as on the worksheet report. Furthermore, once a subcategory with a questionnaire is added to a project, the external questions in the questionnaire may be sent to the client and the internal questions in the questionnaire may be sent to assigned team member(s) (e.g., in the recipient's dashboard 320 to be filled out electronically, or via email message).

FIG. 4AK illustrates a concrete example of a customizable-data screen for the colors data, according to an embodiment. As illustrated, the screen may comprise a list of entries, with each entry representing a color value by a color swatch, represented by a hexadecimal number associated with the color, and a name of the color. Each entry may also comprise a toggle input for activating or deactivating the color, an input for editing the color, an input for deleting the color, and/or the like. FIG. 4AL illustrates a concrete example of an overlaid frame on the customizable-data screen for adding or updating a color value. As illustrated, the frame may comprise inputs for specifying a name of the color, specifying a status of the color, setting the color, saving the color value, and/or the like. The input for setting the color may comprise a further overlaid frame that enables a user to specify an exact color (e.g., by hexadecimal number, movement of a cursor on a two-dimensional spectrum of all possible colors, selection of a set of predefined colors, etc.). In all cases, the color may be converted to the hexadecimal number representing the color, and a color swatch may be created based on that hexadecimal number.

FIG. 4AM illustrates a concrete example of a customizable-data screen for the elements data, according to an embodiment. Each element value represents a design element that can be used, for example, to identify one or more matching inventory items (i.e., associated with or having the design element). As illustrated, the screen comprises a list of entries, with each entry representing an element by a name and price range (e.g., minimum price and maximum price to acquire the element as an inventory item). Each entry may also comprise a toggle input for activating or deactivating the element, an input for editing the element, and input for deleting the element, and/or the like. Although not shown, each entry may also comprise an image representing the element.

FIG. 4AN illustrates a concrete example of a customizable-data screen for the contracts data, according to an embodiment. As illustrated, the screen may comprise separate panels for template management, headers/footers, and contract terms. The panel for template management may comprise a list of selectable contract templates. Each entry in the list of contract templates may comprise a name or other identifier of the contract template, an input for duplicating the contract template, a toggle input for activating or deactivating the contract template, an input for editing the contract template, an input for deleting the contract template, and/or the like. In addition, the panel for template management may comprise a search input for searching the contract templates based on one or more keywords, a filter input for filtering the contract templates based on one or more criteria, an add input for adding a new contract template, and/or the like. When a contract template is selected from the list of contract templates, the panels for headers/footers and contract terms may be automatically populated with template information for the selected contract template.

The panel for headers/footers may comprise one or more inputs (e.g., textboxes) for specifying a heading of the contract template, a starting paragraph of the contract template, an ending paragraph of the contract template, a footer of the contract template, and/or the like. The panel for contract terms may comprise a list of contract terms. Each entry in the list of contract terms may comprise the text of the contract term, an input for specifying the order of the contract term among all contract terms in the contract template, an input for editing the text of the contract term, an input for deleting the contract term, and/or the like. In addition, the panel for contract terms may comprise a search input for searching the contract terms based on one or more keywords, an input for adding a new contract term, and/or the like. It should be understood that, when a user generates a contract from a contract template, the contract will be generated by incorporating the heading, starting paragraph, contract terms, ending paragraph, and footer into an electronic document according to a fixed layout. In an embodiment, the generated contract may be customized (e.g., contract terms may be adjusted according to a particular client's needs) and may require a client to check off or initial each contract term.

FIG. 4AO illustrates a concrete example of a customizable-data screen for the category data, according to an embodiment. As illustrated, the screen may comprise separate panels for category management, subcategory management, and measurement management. Each category may represent a category of inventory. The panel for category management may comprise a list of selectable categories. Each entry in the list of categories may comprise a thumbnail image representing the category, a name of the category, a markup associated with the category (e.g., a percentage by which the acquisition cost of each inventory item within the category should be increased when invoiced to the client), a toggle input for activating or deactivating the category, an input for editing the category, an input for deleting the category, and/or the like. In addition, the panel for category management may comprise a search input for searching the categories based on one or more keywords, a filter input for filtering the categories based on one or more criteria, an input for adding a new category, and/or the like. When a category is selected from the list of categories, the panel for subcategory management and/or measurement management may be automatically populated with respective information for the selected category.

The panel for subcategory management may comprise a list of subcategories associated with the selected category. Each entry in the list of subcategories may comprise a name of the subcategory, a toggle input for activating or deactivating the subcategory, an input for editing the subcategory, an input for deleting the subcategory, and/or the like. In addition, the panel for subcategory management may comprise a search input for searching the subcategories based on one or more keywords, a filter input for filtering the subcategories based on one or more criteria, an input for adding a new subcategory to the selected category, and/or the like. When a subcategory is selected from the list of subcategories, the panel for measurement management may be automatically populated with measurement information for the selected subcategory.

The panel for measurement management may comprise a list of units of measure to be used for the selected category and/or subcategory. Each entry in the list of units of measure may comprise the name of a unit of measure, a toggle input for activating or deactivating the unit of measure, an input for editing the unit of measure, an input for deleting the unit of measure, and/or the like. In addition, the panel for measurement management may comprise a search input for searching the units of measure based on one or more keywords, a filter input for filtering the units of measure based on one or more criteria, an input for adding a new unit of measure to the selected category and/or subcategory, and/or the like.

FIG. 4AP illustrates a concrete example of a customizable-data screen for the media library, according to an embodiment. As illustrated, the screen may comprise separate panels for library management and media preview. The panel for library management may comprise a list of sub-libraries or folders. Each entry in the list of sub-libraries may comprise a description of the sub-library, an input for activating or deactivating the sub-library, an input for editing the sub-library, an input for deleting the sub-library, and/or the like. In addition, the panel for library management may comprise a search input for searching the sub-libraries based on one or more keywords, an input for adding a new sub-library, and/or the like. When a sub-library is selected from the list of sub-libraries, the panel for media preview may be automatically populated with a grid of thumbnails of media (e.g., photographs, video, etc.) in the selected sub-library. The panel for media preview may also comprise an input (e.g., drag-and-drop input, browse input, etc.) for adding a new media file to the selected sub-library, an input for adding a batch of new media files to the selected sub-library, and/or the like. Thus, users of a business account can upload media files to the business-specific library and arrange those media files into one or more sub-libraries or folders for utilization by users of the business's account. It should be understood that the stored media may be used for any purpose in the application, including, without limitation, as inspirational photographs, project photographs, the image for inventory items (e.g., to be used in project and/or design worksheets), and/or the like. In addition, different users may have access to different subsets of the sub-libraries and/or media (e.g., based on roles, permissions, etc.), and the customizable-data screen for the media library may provide access to only those sub-libraries and/or media to which the user has access. In an embodiment, each user could also have an individual user sub-library that is only accessible to the specific user.

FIG. 4AQ illustrates a concrete example of a customizable-data screen for timeline templates, according to an embodiment. As illustrated, the screen may separate panels for template management and template preview. The panel for template management may comprise a list of timeline templates. Each entry in the list of timeline templates may comprise a name or other identifier of the timeline template, an input for editing the timeline template, an input for deleting the timeline template, and/or the like. When a timeline template is selected from the list of timeline templates, the panel for template preview may be automatically populated with a preview of the contents of the timeline template. The panel for template management may also comprise one or more inputs for adding a new timeline template to the list of timeline templates. As illustrated in FIG. 4AR, in an embodiment, the input for adding or editing a timeline template may comprise a textbox for inputting a title, and a word-processing interface that enables the user to draft the contents of the timeline template in a rich text format (e.g., different sized text, fonts, colors, italics, weights, underlining, etc.).

2.9. Users and Roles

Users-and-roles screen 340 may provide one or more inputs for adding, editing, and deleting users who have access to the business account, and assigning roles and/or permissions to each user. In an embodiment, users-and-roles screen 340 may comprise separate screens for managing users and for managing departments. It should be understood that user and roles screen 340 may only be accessible and/or editable by an administrator of the business account (e.g., a user with an administrative role). Thus, users that do not possess an administrative role may not have access to users-and-roles screen 340 and may not even have a visible link to users-and-roles screen 340 in their navigation screen 315.

FIG. 4AS illustrates a concrete example of the user-management screen, according to an embodiment. As illustrated, the user-management screen may comprise a list of users. Each entry in the list of users may comprise a color swatch representing a color associated with the user, a name or other identifier of the user, an email address of the user, a telephone number of the user, a role of the user (e.g., administrator, manager, designer, warehouse, etc.), a toggle input for activating or deactivating the user, an input for editing the user, an input for deleting the user, and/or the like. In an embodiment, each user may be associated with a color, so that assigned tasks, interactions, and/or the like may be color coded, in graphical user interface 300, according to the associated color of the user assigned to the task, interaction, and/or the like. When a user's status is active, that user may access the business's account, and, when a user's status is inactive, that user does not have access to the business account. Thus, instead of deleting a user, a user can be temporarily deactivated (e.g., to temporarily prevent the user from logging into the application), such that the user may be reactivated at a future time. In addition, the user-management screen may comprise an add input for adding a new user, a search input for searching the users based on one or more keywords, one or more filter inputs for filtering the users based on one or more criteria, and/or the like. If an input for adding or editing a user is selected, graphical user interface 300 may be redirected to a separate user-details screen with one or more inputs for specifying information about the user, including, without limitation, first name, last name, telephone number, mobile number, email address (which may double as a username), password (e.g., with password confirmation), role (e.g., via a drop-down menu), department (e.g., via a drop-down menu), status (e.g., active or inactive), associated color (e.g., via a pop-up frame that allows selection via a cursor on a color spectrum, selection of a predefined color, specification of a hexadecimal number, etc.), and/or the like.

FIG. 4AT illustrates a concrete example of the department-management screen, according to an embodiment. As illustrated, the department-management screen may comprise separate panels for departments and users. The panel for departments may comprise a list of departments. Each entry in the list of departments may comprise an image (e.g., a shape and/or color) representing the department, a name or other identifier of the department, a toggle input for activating or deactivating the department, an input for editing the department, an input for deleting the department, and/or the like. In addition, the panel for departments may also comprise an add input for adding a new department, a search input for searching the departments based on one or more keywords, one or more filter inputs for filtering the departments based on one or more criteria, and/or the like. When a department is selected from the list of departments, the panel for users may be automatically populated to comprise a list of users assigned to the selected department. Each entry in this list of users may comprise a name of the user, a toggle input for activating or deactivating the user's association with the selected department, an input for deleting the user's association with the selected department, and/or the like. In addition, the panel for users may comprise an add input for associating a user with the selected department (e.g., via a pop-up frame comprising a list of users associated with the business account), a search input for searching the users associated with the selected department based on one or more keywords, one or more filter inputs for filtering the users associated with the selected department based on one or more criteria, and/or the like. Thus, an administrator of the business account can group users into different departments to implement an organizational structure.

2.10. Vendors

Vendors screen 345 may comprise a list of vendors that may be utilized by users of the business account for procuring items, venues, services, and/or the like. Each entry in the list of vendors may comprise a name or other identifier of the vendor, an industry of the vendor, a telephone number of the vendor, a city of the vendor, a toggle input for activating or deactivating the vendor, an input for editing the vendor, an input for deleting the vendor, and/or the like. When a vendor's status is active, that vendor may be utilized by users of the business account, and, when a vendor's status is inactive, that vendor cannot be utilized by users of the business account. Thus, instead of deleting a vendor, a vendor can be temporarily deactivated, such that the vendor may be reactivated at a future time. In addition, vendors screen 345 may comprise an add input for adding a new vendor, a search input for searching the vendors based on one or more keywords, one or more filter inputs for filtering the vendors based on one or more criteria, and/or the like. If an input for adding or editing a vendor is selected, graphical user interface 300 may be redirected to a separate vendor-details screen with one or more inputs for specifying information about the vendor, including, without limitation, a name or other identifier of the vendor, an indication of whether or not the vendor is a venue, an industry of the vendor, a contact person for the vendor, the contact person's role at the vendor, a telephone number of the vendor, a mobile number of the vendor, an email address of the vendor, a website of the vendor, an address of the vendor (e.g., street address, city, state, and Zip code), a name or other identifier of a client who has worked with the vendor, a preferred method of communication for the vendor, external (i.e., client-facing) notes about the vendor, internal notes about the vendor, a status of the vendor (e.g., active or inactive), a state of the vendor to be used for taxes, the vendor's insurance information, the vendor's rates, the vendor's availability, the vendor's freight or elevator preference, and/or the like. It should be understood that the vendor information used throughout graphical user interface 300 (e.g., in project details, on reports, in invoices, etc.) may be derived from the information input through vendors screen 345 and stored in database 114.

In an embodiment, venues are treated in the same manner as vendors. However, in an alternative embodiment, venues may be managed separately from other types of vendors. In this case, graphical user interface 300 may comprise a venue screen that is separate from but similar to vendors screen 345. Similar or identical information may be provided and stored for each venue as is provided and stored for the other types of vendors. However, the information for venues may comprise additional venue-specific details, such as coordinator's name, name of the maitre d', banquet manager's name, the number of projects that the venue can handle per day, capacity, size, layout, number of rooms, number of floors, room details (e.g., type of room, name of room, room floor, max capacity, indoor or outdoor, measurements, room loading entrance, room loading details, other loading details, certificate of insurance, details of load-in ramp or stairs, external notes, internal notes, etc.), parking information, and/or the like. These details can be used (e.g., in project details, on reports, etc.) to manage the space, location, and time for a given project.

2.11. Resources

Resources screen 350 may comprise a plurality of screens for viewing and/or editing different resources that will be used across the plurality of projects managed by a particular business. In an embodiment, these resources comprise inventory, assemblies, and templates.

FIG. 4AU illustrates a concrete example of an inventory screen for managing business-wide inventories, according to an embodiment. As illustrated, the inventory screen may comprise a list of all available items in inventory. Each entry in the list of inventory items may comprise an image of the inventory item, a name or other identifier of the inventory item, a rental price of the inventory item, a wholesale price of the inventory item, a quantity of the inventory item on hand, dimensions of the inventory item (e.g., using units of measurement specified in the business-specific master data), a toggle input for activating or deactivating the inventory item (e.g., to change its status from available to unavailable), an input for editing the inventory item, an input for deleting the inventory item, and/or the like. In addition, the inventory screen may comprise an add input for adding a new inventory item, a search input for searching the inventory items based on one or more keywords, one or more filter inputs for filtering the inventory items based on one or more criteria (e.g., inventory category, manufacturer, type, unit of measure, source, one or more colors, one or more design elements, price, style, availability, tags associated with the inventory items, etc.), and/or the like. If an input for adding or editing an inventory item is selected, graphical user interface 300 may be redirected to a separate details screen with one or more inputs for specifying information about the inventory item, including, without limitation, a name of the inventory item, an inventory category, manufacturer of the inventory item, type of inventory item, unit of measure, source, color, design element, shape, material, rental price, wholesale price, location of the inventory item, markup, quantity of the inventory item on hand, size of the inventory item, availability of the inventory item (e.g., in months), care instructions for the inventory item, restocking instructions, when to restock the inventory item, loading instructions, when to prepare, preparation instructions, description, name or other identifier of the team member who prepared the inventory item and/or pulled the inventory item, and/or the like. It should be understood that the values of these parameters may be constrained by the master data. For example, the selectable values of category, manufacturer, type, unit of measure, source, color, design element, shape, material, location, and/or the like may be limited to available values in the business-specific data.

It should also be understood that the instructions on how to care for, prepare, restock, and/or load an inventory item may be retrieved and used when generating instructions for preparing inventory items (e.g., the preparation list described elsewhere herein). Advantageously, inventory items can be associated with various instructions to educate team members on how to care for and prepare each inventory item, thereby reducing training time. As discussed elsewhere herein, the inventory added through the inventory screen may be used by the application to automatically populate design boards with inventory items (e.g., based on color(s) and/or design element(s)), so that the designers do not have to search for specific inventory items to use. Again, this solves the technological problem of how to store, retrieve, view, and otherwise manage large amounts of data, which would normally be inaccessible to humans due to volume, in a manner that is accessible to humans.

In an embodiment, inventory items can be imported into a business-wide or user-specific library of inventory items. For example, the application may provide a global library of inventory items. A wholesaler may pay the operator of the application to incorporate the wholesaler's inventory (e.g., live inventory) into the global library. A user with a permissive role may import all or a subset of inventory items from the global library into the business's or user's specific library. Thus, the user can quickly and easily populate the specific library using a simple operation, instead of having to input each inventory item individually. After importing one or more inventory items, the user can edit those inventory item(s) as needed or desired in the specific library, without affecting the copy of the inventory item in the global library. Alternatively or additionally, users may import inventory items from other libraries, such as other users' libraries, other business's libraries, and/or from a marketplace of libraries for sale or exchange.

In an embodiment, graphical user interface 300 may comprise one or more inputs for duplicating an inventory item. Thus, a user may quickly add a batch of similar inventory items with minor variations. For example, the same style of inventory item (e.g., vase) in multiple colors and/or sizes can be added in all of its variations by simply duplicating the inventory item (e.g., duplicating a data structure representing the inventory item) and modifying each duplicate inventory item to represent a different variation of the inventory item (e.g., a different color or size). Advantageously, this significantly reduces the manual work that would otherwise be required to specify each variation.

FIG. 4AV illustrates a concrete example of an assemblies screen for managing a library of business-wide assemblies, according to an embodiment. As illustrated, the assemblies screen may comprise a list of all available assemblies. An assembly represents a collection of items, typically with instructions on how to combine the items to prepare the assembly. For example, an assembly could comprise a bouquet of different flowers, a centerpiece for a table at a wedding reception (e.g., quantities and types of flowers, ribbon, water, tape, vase, delivery box, etc.), a recipe for a food course, a decorative backdrop, clothing (e.g., a specific selection of pants, shirt, tie, jacket, accessories, etc.), and/or the like. Each entry in the list of assemblies may comprise an image of the assembly, a name or description of the assembly, a category of the assembly (e.g., bouquet, boutonniere, ceremony, cocktail, corsage, draping, reception, etc.), a toggle input for activating or deactivating the assembly, an input for editing the assembly, an input for deleting the assembly, and/or the like. In addition, the assemblies screen may comprise an add input for adding a new assembly, a search input for searching the assemblies based on one or more keywords, one or more filter inputs for filtering the assemblies based on one or more criteria (e.g., by category and/or subcategory), and/or the like.

If an input for adding or editing an assembly is selected, graphical user interface 300 may be redirected to a separate assembly-details screen with one or more inputs for specifying information about the assembly, including, without limitation, an image of the assembly (e.g., an actual or aspirational image), a name of the assembly, a category of the assembly, a status of the assembly, a description of the assembly, internal notes about the assembly, one or more colors associated with the assembly, one or more design elements associated with the assembly, and a list of items used to construct the assembly. FIG. 4AW illustrates a concrete example of the assembly-details screen, according to an embodiment. Each entry in the list of items for an assembly may comprise an image of the item, a name of the item, a quantity of the item required for the assembly, a wholesale price of the item, a rental price of the item, a cost of the item, a markup for the item, a retail price of the item, a unit price of the item, an action, and/or the like. The costs and quantities of the items in the list of items may be used to calculate a price for the assembly composed of the items. In addition, the list of items may comprise an input for viewing or editing a preparation list comprising instructions for preparing the assembly from the listed items. As discussed elsewhere herein, this preparation list may be automatically generated by combining instructions associated with each of the listed items.

In an embodiment, a constructed assembly may be added to the inventory as an inventory item, just as any item can be added to the inventory, and/or may be added to a library of assemblies (e.g., a business-wide or user-specific library) managed by the application. Thus, advantageously, the same assembly can be used by a business user across a plurality of clients by saving it in a library. In addition, one assembly can be used as an item or ingredient in the construction of another assembly. Each assembly may be associated with a subcategory (e.g., in the worksheet data).

FIG. 4AX illustrates a concrete example of a templates screen for managing business-wide templates, according to an embodiment. The templates screen may comprise a list of available project templates, brochure templates, package templates (e.g., for tiered wedding budgets, pre-set packages with assemblies associated with particular colors and/or a particular season, etc.), invoice templates (e.g., for different types of invoices, such as wedding invoices, etc.), and/or the like. A project template represents a set of default data for a new project. Templates may be provided for different types of projects and/or different versions of the same type of project. For example, different project templates may be created for different tiers of a wedding package, so that a wedding project at a given tier can be quickly created from the project template and then tailored to the specific client. Each entry in the list of project templates may comprise an image representing the type of project represented by the project template, a name of the project template, a category or type of the project represented by the project template (e.g., ceremony, bouquets, boutonnieres, cocktail, event planning, wedding, etc.), an input for activating or deactivating the project template, an input for editing the project template, an input for deleting the project template, and/or the like. In addition, the templates screen may comprise an add input for adding a new project template, a search input for searching the project templates based on one or more keywords, one or more filter inputs for filtering the project templates based on one or more criteria (e.g., by category and/or subcategory), and/or the like.

If an input for adding or editing a project template is selected, graphical user interface 300 may be redirected to a separate template-details screen with one or more inputs for specifying information about the project template, including, without limitation, an image representing the type of project, a name of the project template, a category and/or subcategory (e.g., type) of the project, a description of the project, internal notes for the project, a status of the project, one or more colors for the project, a list of items to be used for the project, and/or the like. FIG. 4AY illustrates a concrete example of a template-details screen, according to an embodiment. As illustrated, the template-details screen may comprise a category panel and a pricing panel.

The category panel may comprise a list of categories of items. Each entry in the list of categories may comprise a name or other identifier of the category, an input for locking the category, an input for deleting the category, a list of subcategories of items, and/or the like. Similarly, each entry in each list of subcategories may comprise a name or other identifier of the subcategory, an input for locking the subcategory, an input for deleting the subcategory, and/or the like. In addition, the category panel may comprise an input for adding a new category or subcategory.

When a category or subcategory is selected in the category panel, the application may automatically populate the pricing panel with any stored information about the selected category or subcategory. The pricing panel may comprise one or more inputs for viewing and/or specifying this information, which may include a quantity of the item, a price of the item, a total price (i.e., the specified quantity of the item multiplied by the specified price of the item), a description of the item, and/or the like. In addition, the pricing panel may comprise an input for viewing and/or editing a questionnaire associated with the selected category or subcategory, an input for viewing and/or editing an image associated with the selected category or subcategory, an input for specifying whether or not the selected category of subcategory of item is rented, and/or the like.

2.12. Additional Screens

In an embodiment, graphical user interface 300 comprises an upcoming-payments screen that comprises a list of all upcoming payments across all clients managed by the business and/or user. Each entry in the list of upcoming payments may comprise a name or other identifier of the client, a name or other identifier of the project or invoice, a project end date, a payment name, a payment amount, a payment due date, number of days that the payment is past due (if any), an input for sending or setting a reminder to the client about the payment, an input for viewing the payment details or invoice, and/or the like. If the user selects the input for viewing the payment details, graphical user interface 300 may be redirected to a separate payment-details screen comprising specific payment details.

In an embodiment, graphical user interface 300 comprises a productivity-list screen that comprises a productivity list. FIG. 4AZ illustrates a concrete example of a productivity-list screen, according to an embodiment. As illustrated, the productivity-list screen may comprise panels for project management, project tasks, project tracking, interaction tracking, and assigned tasks. Each of the panels may comprise a search input for searching the respective list based on one or more keywords, one or more filter inputs for filtering the respective list based on one or more criteria, and/or the like. The productivity-list screen may also comprise an input for exporting the productivity list (i.e., exporting all data from all of the panels).

The project-management panel may comprise a list of projects. Each entry in the list of projects may comprise a name or other identifier of the client for the project, a name or other identifier of the project, a name or other identifier of a team member to whom the project is assigned, the date of the project, an input for viewing the project-details screen for the project, and/or the like. The project-management panel may be used to see all projects and their assigned managers in one location.

The project-tasks panel may comprise a list of tasks across all managed projects that have been assigned to the user. Each entry in the list of tasks may comprise a name or other identifier of the client, a name or other identifier of the project, a name or other identifier of the team member to whom the task is assigned, a category of the task, a sub-category of the task, an input for viewing a details screen for the task, and/or the like.

The project-tracking panel may comprise a list of assignments for all team members across all managed projects. Each entry in the list of assignments may comprise a name or other identifier of the client, a name or other identifier of the project, a name of the task, a name or other identifier of a team member to whom the task is assigned, a due date for the task, a completion date of the task, an input for viewing a details screen for the task, and/or the like.

The interaction-tracking panel may comprise a list of interactions for all team members. Each entry in the list of interactions may comprise a name or other identifier of the client, a name or other identifier of the project, a name or other identifier of the team member to whom the interaction is assigned, a type of interaction, a date of the interaction, an input for viewing a details screen for the interaction, and/or the like.

The assigned-tasks panel may comprise a list of assigned tasks for all team members across all managed projects. Each entry in the list of assigned tasks may comprise a name or other identifier of the client, a name or other identifier of the project, a name of the task, a name or other identifier of the team member to whom the task is assigned, a status of the task, an input for viewing a details screen for the task, and/or the like.

In an embodiment, graphical user interface 300 comprises an interactions screen that comprises a list of interactions across all projects. The list may comprise interactions across all team members or just those interactions that are assigned to the user, for example, depending on the user's role or permissions. Each entry in the list of interactions may comprise a name or other identifier of the client with whom the interaction is performed, a name or other identifier of the project related to the interaction, a name or other identifier of the team member who performed the interaction, the date of the interaction, the type of interaction, notes about the interaction, an input for viewing the interaction-details screen comprising details about the interaction, and/or the like.

2.13. Client Portal

In an embodiment, a business user, with a permissive role, may grant access to a client to a subset of the data associated with a project for the client. For example, the client may establish a client account with the application of platform 110 using registration screen 310, or the business user may establish the client account on the client's behalf. The client may log in to the client account using login screen 305, just like any other user, or through a dedicated client portal. The business user may also set an expiration time or date for the client account. At the expiration time and date, the application may automatically terminate the client user's access, such that the client will no longer have access to the project data. After expiration, the client may still be able to log in to the client account via login screen 305 (e.g., to view data related to other projects, or if none, to view non-project data), or alternatively, may be prevented from any further access to the client account. A business user may also reset the username and/or password for its clients.

Client users may have access to only a subset of screens that are available to business users, and to only those screens that are related to the client's project(s). For example, the client may be able to view dashboard 320 with a list of interactions and/or notifications from the business users, the client-details screen (e.g., for editing client-related details, such as contact information, preferences, etc.), project screen 330 (e.g., in embodiments in which a client account may be associated with a plurality of projects), the project-details screen for the client's project(s), task-related screens (e.g., so that the client can monitor and track tasks without having to constantly consume the valuable time of team members), the table-details screen, the inspirational-photographs screen, the project worksheet, the design worksheet, the payment screen, and/or the like.

However, even when the client user can access the same screen as a business user, the client may not be able to view all of the same data and/or edit all of the same data as a business user. For example, the client will not be able to edit any data that is locked by the business users (e.g., to prevent the client from changing his or her mind about previous decisions as the date of an event approaches). Also, while the client may view and/or edit external notes, the client will not be able to view or edit any internal notes. As another example, in the payment screen for a project, the client may be able to view the invoice and payment tabs, but not the fee tab. In addition, the client may not be able to view the interactions screen, may not be able to edit or delete vendors for a project (but may be able to view vendors for the project), may not be able to view pricing until the contract has been executed, and/or may experience other restrictions to viewing and/or editing the project information based on the client's status, stage of the project, time different between the current date and an event date, actions by business users, and/or the like.

In an embodiment, the subset of screens that are available to a client user may comprise data or inputs that are not in the screens that are available to business users. For example, the client user's version of the project worksheet, design worksheet, and/or the like may comprise inputs for requesting changes (e.g., requesting a different bouquet), whereas the business users' version of these worksheets may comprise inputs for approving the requested changes. As another example, the client user's version of the contract screen may comprise a tab for executing the contract.

3. Process Overview

Embodiments of processes for automated project management will now be described in detail. It should be understood that the described processes may be embodied in one or more software modules that are executed by one or more hardware processors (e.g., processor 210), for example, as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the application are executed by platform 110 and other portions or modules of the application are executed by user system(s) 130. The described processes may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

3.1. Machine Learning

Figure 5:
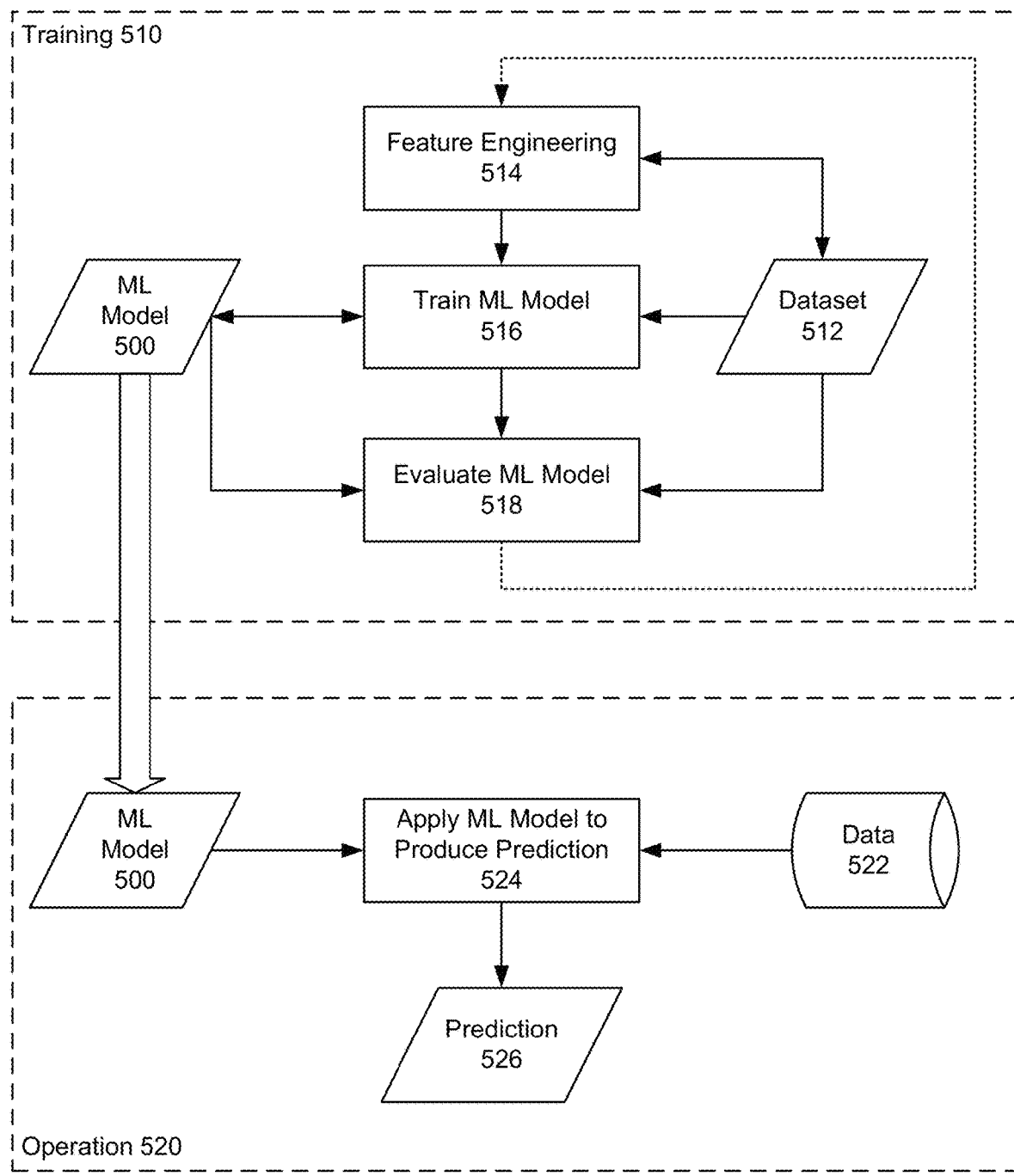
FIG. 5 illustrates machine learning for project management, according to an embodiment.

In an embodiment, the application may utilize one or more machine-learning models or other artificial intelligence (AI) to facilitate one or more aspects of project management. FIG. 5 illustrates a high-level diagram of machine learning, according to an embodiment. In general, each machine-learning model 500 is trained to make predictions in a training stage 510 and operated to make predictions in an operation stage 520. It should be understood that each machine-learning model 500 used by the application may undergo its own training stage 510 and operation stage 520, and that two or more machine-learning models 500 may operate independently from each other to perform different predictive tasks or may operate in combination with each other to perform a single predictive task.

In training stage 510, a machine-learning (ML) model 500 is trained using a dataset 512. Machine-learning model 500 may be trained using supervised or unsupervised learning. In supervised learning, dataset 512 may comprise vectors of features, with each feature vector labeled or annotated with the desired output and comprising a plurality of features that may be relevant to the determination of that output. In a case in which machine-learning model 500 is intended to perform image recognition or classification, dataset 512 may instead comprise images that have been labeled or annotated with the desired recognition or classification output. In either case, dataset 512 may be cleaned and augmented in any known manner.

In subprocess 514, feature engineering may be used to identify the features to be used in the feature vectors in dataset 512. The feature engineering may utilize any known manner of identifying relevant features that may correlate to an output. Features that are determined to be irrelevant may be removed from the feature vectors of dataset 512. In an alternative embodiment or embodiments which do not use feature vectors (e.g., image recognition or classification), subprocess 514 may be omitted.

In subprocess 516, machine-learning model 500 is trained using dataset 512. Specifically, machine-learning model 500 is applied to dataset 512 (e.g., which may be divided into training and validation datasets) and updates its internal structure to minimize the error between the desired output, represented by the labels in dataset 512, and its actual output. Machine-learning model 500 may comprise any type of machine-learning algorithm, including, without limitation, an artificial neural network (e.g., a convolutional neural network, a deep neural network, etc.), a linear regression, a logistic regression, a decision tree, a random forest algorithm, a support vector machine (SVM), a naïve Bayesian classifier, a k-Nearest Neighbors (kNN) algorithm, a K-Means algorithm, gradient boosting algorithms (e.g., XGBoost, LightGBM, CatBoost), and the like. It should be understood that the particular machine-learning algorithm that is used will depend on the problem being solved, and that different machine-learning algorithms may be used by platform 110 for different tasks.

In subprocess 518, machine-learning model 500 may be evaluated to determine its accuracy in performing the predictive task for which it was designed. If the accuracy is not sufficient, the training stage 510 may continue. For example, a different set of features may be used for training, a different dataset 512 may be used for training, a different machine-learning algorithm may be used, and/or the like, until the evaluation in subprocess 518 demonstrates that machine-learning model 500 is suitably accurate. It should be understood that the necessary accuracy may depend on the predictive task for which machine-learning model 500 was designed. For example, a machine-learning model 500 used for a predictive task that may affect a client interaction may require more accuracy than a machine-learning model 500 used for a predictive task that only affects internal interactions between team members.

Once machine-learning model 500 has been trained to a sufficient accuracy, machine-learning model 500 may be moved to operation stage 520 to perform its predictive task on data 522 in a production environment of platform 110. Data 522 may comprise feature vectors derived from any of the data discussed herein and/or image data derived from any of the media discussed herein (e.g., photographs, video, etc.). In subprocess 524, machine-learning model 500 is applied to data 522 to produce a prediction 526. Prediction 526 may comprise a classification (e.g., a single most likely classification, a probability vector comprising confidences for each of a plurality of possible classifications, etc.), a recommendation (e.g., recommended next action), and/or the like.

As an example, a machine-learning or other artificial-intelligence model may be trained or programmed to automatically recommend one or more vendors for the provision of an item, venue, or service based on features in vendor data (e.g., location, cost, history, etc.), client data (e.g., client's preferences), project data (e.g., colors, elements, etc.), and/or the like. The application may automatically contact the recommended vendor(s) (e.g., via email, an API to the vendor's platform, etc.) to compile pricing quotes, options, availability, and/or the like for each of the recommended vendor(s). Thus, all of the information required to select the most appropriate vendor can be quickly and automatically compiled for the client's review.

As another example, a machine-learning or other artificial-intelligence model may be trained or programmed to perform inventory management. For example, the model may determine, based on features in inventory data (e.g., types of inventory items, quantities of inventory items on hand, etc.) and/or project data (e.g., number of projects that utilize inventory items, dates of projects that utilize inventory items, etc.), what inventory items to purchase, when to purchase those inventory items, where to purchase those inventory items, what price should be paid for those inventory items, and/or the like. The inventory data may be tracked by (e.g., via RFID tags on the inventory items) and acquired from an inventory management system described elsewhere herein. The application may automatically contact vendors to compile pricing quotes, options, availability, and/or the like for a user of the business account. Additionally or alternatively, the application may automatically purchase the determined inventory items in the determined quantities from the determined vendors (e.g., via an API of the vendor platforms).

As another example, a machine-learning or other artificial-intelligence model may be trained or programmed to build a project worksheet and/or design worksheet. For example, the model may automatically populate such a worksheet with data (e.g., inventory items, tasks, vendors, etc.) based on features, such as a budget for the project, available items in the inventory data or marketplace, the season of the year (e.g., spring, summer, fall, winter), one or more selected colors, one or more selected design elements, and/or the like. Thus, a worksheet may be created with a single click of a button (e.g., a "populate" input). Such a worksheet may be presented to the client for approval, execution of a contract, and/or partial payment. Additionally or alternatively, the application may automatically populate a data structure, representing a project, with project information that has been predicted by the model, to thereby create a default definition of the project or a starting point for the project.

3.2. Design Worksheet

Figure 6:
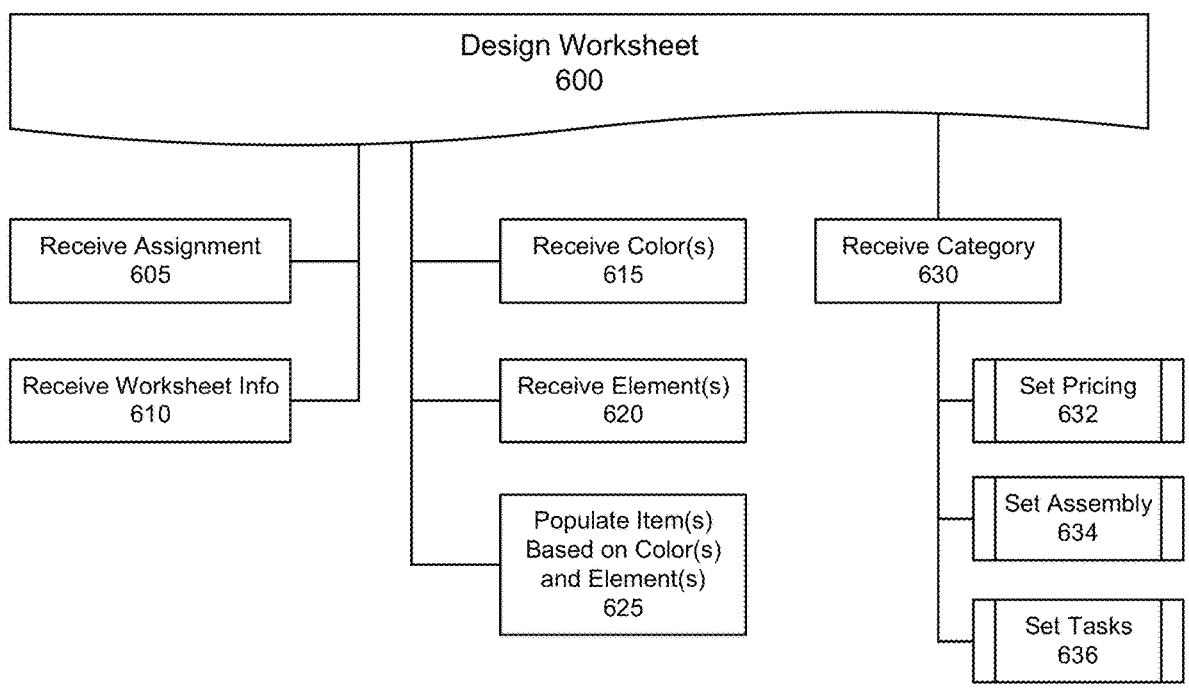
FIG. 6 illustrates a design worksheet that may be used for project management, according to an embodiment.

FIG. 6 illustrates a process for using the design worksheet of graphical user interface 300, according to an embodiment. As discussed elsewhere herein, design worksheet 600 may comprise one or more inputs for aggregating a set of assemblies and/or individual inventory items to be associated with a project. Design worksheet 600 may be assigned to a team member via an input for specifying the team member in subprocess 605. In addition, other worksheet information may be specified by a user through design worksheet 600 in subprocess 610. For example, this worksheet information may comprise one or more samples that were provided, the date on which the sample(s) were provided, notes about the provided sample(s), a name or other identifier of the designer completing the worksheet, assignment notes, design notes, and/or the like.

In addition, a set of one or more colors may be specified in subprocess 615 and a set of one or more design elements may be specified in subprocess 620 (e.g., via a color and elements panel described elsewhere herein). In subprocess 625, the pairing of color(s) and element(s) is then used to populate representations (e.g., thumbnail images) of items that match the color(s) and/or element(s) into design worksheet 600 (e.g., within the design board described elsewhere herein). These representations of items may be selectable or comprise other inputs for associating each of the items with the project associated with design worksheet 600. It should be understood that, if no color(s) and no element(s) have been selected, design worksheet 600 may be populated with no representations of items, representations of all items, or representations of a set of items predicted by machine-learning model 500, depending on the implementation. In addition, the design board may be automatically populated with representations of items in response to each selection of a color or element or in response to a user selection of a "populate" input. In an embodiment, design worksheet 600 may be populated with representations of any items that match the selected color(s) and/or element(s), or populated with representations of only those items that match the select color(s) and/or element(s) and are currently available and/or in the inventory on hand (e.g., per an inventory management system). When any inventory item is added to a project, the application may automatically make that inventory item unavailable to any other project (e.g., by marking the inventory item as booked, marking a quantity of the inventory item as booked if there are more than one of the inventory items, etc.), to prevent double booking of the same inventory item for overlapping projects. However, the application may take the date of events and/or preparation time of the inventory item into account, to allow two projects for events on different days to book the same inventory item, for example, if the time between dates is greater than the preparation time required to prepare the inventory item (e.g., plus some predetermined buffer amount). Advantageously, this solves the technological problem of double bookings that arises in the context of computer-based inventory management, as a result of the ability in such systems to quickly and virtually book physical items without having to actually possess the physical items, while minimizing the time period during which inventory is reserved.

In a particular implementation, each inventory item may be stored in database 114 on platform 110 as a data structure that associates a plurality of parameters about the item together into a representation of a physical item. These parameters may comprise an image, a name, a color, and an element associated with the item, an availability of the item and/or quantity of the item on hand, the location of the item if the item is on hand, one or more vendors from which the item may be purchased or rented, one or more directions for preparing the item, and/or the like. Each color, element, and vendor may themselves be stored in database 114 on platform 110 as a data structure that associates a plurality of parameters together. When populating design worksheet 600 with representations of items, the application may search database 114 for all item data structures that are associated with at least one of the select color(s) and at least one of the selected element(s). In addition, in an embodiment, the application may limit its search to item data structures that indicate the item is available and/or in inventory on hand. Then, the application may display representations, such as the associated images and/or names, of all items found in the search in design worksheet 600.

In subprocess 630, a user may select one or more categories, potentially including subcategories, of assemblies, for example, to be assembled from the items represented in design worksheet 600. For each category, the user may specify and/or view pricing information for the assembly represented by the category in subprocess 632, specify and/or view the items from which the assembly is assembled in subprocess 634, and/or specify and/or view tasks related to the assembly (e.g., care, purchase, preparation, etc.) in subprocess 636, as well as associated information. For example, in subprocess 632, the user may specific a quantity of the assembly represented by the category, a price of the assembly, a description of the assembly, a status of the assembly (e.g., started, in progress, completed, etc.), notes regarding the assembly, a questionnaire related to the assembly (e.g., designed to elicit preferences or customizations from the client), and/or additional category-specific details. In subprocess 634, the user may add items to the assembly (e.g., from items in inventory, from a template of items stored for the assembly, etc.), retrieve the assembly from a user or business library, add the assembly to a user or business library, generate or view a preparation list with directions for preparing the assembly, add or view a location of the assembly in inventory, and/or the like. In subprocess 636, the user may add or view tasks and assign those tasks to team members.

In an embodiment, each assembly may be stored in database 114 on platform 110 as a data structure that associated a plurality of parameters about the assembly together into a representation of the assembly. These parameters may comprise an image, a name, a description, data structures for all the items used in the assembly, a preparation list, a status of the assembly, and/or the like. The preparation list may be generated by combining the instructions for preparing each item, in that item's data structure, into a list of instructions according to one or more rules or templates. Thus, advantageously, a default preparation list can be automatically generated for each assembly, even if that assembly has not previously existed. In other words, the creations of virtually infinite numbers of custom preparation lists can be automated, thereby improving conventional methods of creating preparation lists which were not previously capable of being automated. A user may modify the default preparation list that is automatically created by the application, as needed or desired, and save it in association with the assembly's data structure.

3.3. Adding Items to Inventory

As discussed elsewhere herein, the application may perform inventory management, and graphical user interface 300 may provide one or more screens for viewing, adding, and/or editing inventory items. When adding an item to inventory, the application may collect information about the item, via graphical user interface 300, prior to adding the item to inventory, in order to facilitate searching and management of the item in the future. For example, the application may collect a color and element (e.g., design element) to be associated with the item. In addition, the application may collect a source of the item, and, if the source is a rental vendor, also collect a rental price for the item. Furthermore, the application may collect a category (e.g., possibly including one or more subcategories) to be associated with the item. The application may also collect one or more of the following: a name of the item, a shape of the item, a material with which the item is made, a manufacturer of the item, a wholesale price for the item, a markup amount (e.g., percentage, fixed amount, etc.) for the item, a size of the item, a unit of measure to be used for the size of the item (metric system units, American system units, per stem if the item is a flower, etc.), a location of the item, an availability of the item (e.g., in months), a quantity of the item, care instructions for caring for the item, restocking instructions for restocking the item, loading instructions for loading the item, a lead time required to prepare the item, one or more preparation instructions for preparing the item, a description of the item, a status of the item, one or more tags, and/or the like. In an embodiment, the application may provide a comprehensive inventory report comprising statistics about the items in inventory, lists of the items in inventory, and/or any of the information stored for the items in inventory. With respect to inventory items that are rentals (e.g., from a rental vendor), the application may track the length of rental, when the inventory item needs to be returned to the rental vendor, the invoice from the rental vendor for the rental item, and/or the like.

4. Virtually or Socially Distanced Event

In an embodiment, platform 110 may support a virtual or socially distanced event as a project. For ease of illustration, the example of a wedding will be used. However, it should be understood that the disclosed embodiment could be used for any type of event that would normally involve a plurality of attendees. This embodiment may be especially useful in the case that the event cannot be personally attended by one or more attendees, for example, due to a pandemic, a natural disaster, an attendee having a particular condition that prevents them from traveling to the event, an attendee being so distant as to make it impractical for that attendee to travel to the event, and/or the like.

The event may take place at a central location, while a subset of the participants participate at remote venues (e.g., their homes) via communications relayed through platform 110. For example, a real-time video of the event may be captured by a camera or other image-capture device, as a user system 130, at the central venue and live streamed, through platform 110 over network(s) 120 (e.g., the Internet), to the remote venues, as other user systems 130, via standard communication protocols. Simultaneously, real-time video of the participations at the remote venues may be captured by a camera or other image-capture device at each remote venue and live streamed, through platform 110 over network(s) 120, to the central venue and to the other remote venues. Thus, participants at each of the central venue and the remote venues may display video feeds from all of the other venues, to form a single virtual event. Notably, this is similar to a video conference.

Regardless of the specific type of event, one or more packages, representing a portion of the event, may be delivered to participants at their individual homes or other separate and distinct remote venues. The deliveries may be made during or in advance of the event at the central location. These packages may be delivered via standard delivery services, via autonomous vehicles (e.g., drones), by staff of the business managing the project, and/or the like. Generally, there is no limit to how geographically dispersed the venues are from each other. Thus, a virtual event may be spread over an entire nation or even the world.

Each package may be designed to match the theme of the event and/or otherwise help the participants at the remote venues feel as if they are physical present at the event at the central venue. For example, in the context of a wedding, the package may comprise food and/or beverages (e.g., a ready-made meal) prepared by the same meal service as all of the other venues, floral elements (e.g., centerpieces, bouquets, etc.) that are the same color and style for all venues, photographs to be displayed at the venue, video to be played back at the venue, lighting elements, seating, decorations, and/or the like.

In one implementation, the package may be a mobile unit or "pod" that is decorated and arranged in the theme and style of the event. For example, staff and/or vendors of a business may decorate the interior and/or exterior of the mobile unit according to the theme of the event, including with assemblies and/or other inventory items that the designer and/or client has selected for the project. The staff and/or vendors could supply the mobile unit with services, such as a pre-prepared meal and/or beverage service, a slice of wedding cake for each participant, and/or the like. The mobile unit may be configured with audiovisual equipment, for example, to display real-time video from the central venue, as well as capture and transmit real-time video from the interior of the mobile unit to the central venue and/or other mobile units. It should be understood that a plurality of mobile units may be prepared in this manner, and that each mobile unit may be identical, similar, or different. In addition, a mobile unit may be prepared for the central venue as well, for example, to serve as the event space at the central venue. In this case, the audiovisual equipment, installed in each mobile unit, may be configured to display real-time video from all of the other mobile units, as well as capture and transmit real-time video from the interior of the mobile unit to all of the other mobile units. Then, each of the plurality of mobile units may be delivered (e.g., by one or more vendors) to the central and/or remote venues for use by the participants at those venues. Participant(s) at each venue may enter the mobile unit to participate in a socially distanced, but cohesively themed (e.g., same colors, floral arrangements, and other decorations) and serviced (e.g., same meal and beverage services), event with other participants at the other venues.

As discussed above, each mobile unit may comprise an interior space, sized to fit one or more human participants, decorated according to a theme of the event, and configured with audiovisual equipment (e.g., television(s), speaker(s), microphone(s), and camera(s) in one easy-to-use or no-hassle package). In addition, a mobile unit may have additional features, depending on the type of event. For example, the mobile unit may comprise meal(s) and/or beverage(s) (e.g., ready-made meal(s)), streaming music, a dance floor, and/or the like.

In an embodiment, a business user and/or the client user may invite guests to the event by sending invitations to the event to each invited guest through the application using one or more screens and inputs of graphical user interface 300. The invitation may comprise an email with a link (e.g., URL) to a guest landing page of the application, which the guest can use to accept the invitation. Specifically, the application may provide screens and inputs in graphical user interface 300 that enable guests to log in to the application (e.g., via the link) to accept the invitation. Each guest may log in and specify an address via graphical user interface 300, and the application may facilitate preparation and delivery of a mobile unit to the specified address (e.g., automatically schedule project tasks for the preparation and delivery of the mobile unit to the address). In addition, each invitation or the guest landing page may comprise additional information, such as a link for a gift registry, a link to make a donation to a charity (e.g., on behalf of a bride and groom), and/or the like.

In an embodiment, some assembly of the mobile unit or other package may be required from participants. For example, a box of flowers may be delivered to each remote venue, and the participant at that remote venue may need to arrange the flowers (e.g., into bouquets or centerpieces) themselves. As another example, a box of ingredients may be delivered to each remote venue, and the participant at that remote venue may need to prepare the meal themselves (e.g., cook the ingredients according to a recipe, heat up a ready-made meal, etc.). To facilitate the assembly at the remote venue, the application may provide training instructions (e.g., how-to videos), for example, on the guest landing page. Thus, guests may view the training instructions to complete the assemblies at the remote venues.

5. Additional Features

In an embodiment, the application may provide a function, via a screen of graphical user interface 300, that enables the user of a business account to send a notification to all clients (e.g., via an email blast, the dashboards 320 of their client accounts, etc.). The recipients of the notification may be filtered by whether or not they are current clients (e.g., having active projects currently being managed by the business account) or past clients (e.g., having completed projects). Thus, the user could send the notification to only current clients, only past clients, or all clients.

In an embodiment, the application may provide a function, via a screen of graphical user interface 300, that enables a user to purchase or exchange data, such as assemblies for bouquets, food (e.g., recipes), and/or the like, any of the templates discussed herein (e.g., contract templates, notepad templates, timeline templates, invoice templates, etc.), various instructions (e.g., for set-up, preparation, etc.) and/or the like. For example, the application may provide a marketplace or access to an external marketplace where users can buy, sell, and/or trade data. Users may export data from their accounts for sale or other exchange in the marketplace, and users may import data into their accounts from the marketplace after a purchase or exchange in the marketplace. It should be understood that any data may be sold or exchanged in such a marketplace, including, for example, assemblies (e.g., florals, mandaps, recipes, etc.), inventory items, colors, design elements, templates, vendor data, client data, business processes (e.g., a timeline of tasks and/or client interactions for a particular type of project), and/or the like.

In an embodiment, vendor data, comprising vendors (e.g., name and contact information), may be automatically added to a business account based on a platform-wide set of vendor data. Additionally or alternatively, the vendor data may be scraped, once or periodically, from the Internet. Thus, companies can build lists of vendors very quickly or easily from previously acquired data. In addition, any vendor contracts required for a project may be automatically populated with project information and/or client information and made available to the client, for example, in one centralized screen or set of screens in graphical user interface 300 (e.g., in the contract screen described elsewhere herein).

In an embodiment, the application may automatically make recommendations of assemblies to users. For instance, if a user selects a particular design element, the application may automatically recommend assemblies for that particular design element. As an example, the user may select a flower, and the application may recommend a bouquet or centerpiece in which the flower is used or may identify whether the flower is better for use in a bouquet or centerpiece. As another example, if a user selects a particular cuisine for a meal service, the application may automatically recommend a wine pairing for the meal service. In an embodiment, these recommendations may be generated by a machine-learning algorithm 500.

In an embodiment, the application may interface with one or more autonomous vehicles (e.g., a drone) to control the autonomous vehicle(s) to perform a task. In other words, tasks may be assigned to an autonomous vehicle in a similar or identical manner as tasks are assigned to team members. The application may communicate with the autonomous vehicle via an API of the autonomous vehicle. For example, since an embodiment of the application may store data comprising the locations of items, the application may control the autonomous vehicle to retrieve items from their locations and/or return items to their locations. Similarly, the application could control an autonomous vehicle to transport items to and from a venue. The autonomous vehicle could comprise one or more sensors and/or robotic devices (e.g., robotic gripper, crane, etc.), in addition to means for travel (e.g., wheels, robotic legs, helicopter propellers, tracks, etc.), so as to be configured to locate, retrieve, and/or transport physical items from one location to another location. Thus, the application could control an autonomous vehicle to navigate to a location of an inventory item, pick-up (e.g., automatically via a robotic device) or receive (e.g., from a person at the location who has been notified of the autonomous vehicle's arrival) the inventory item, and then transport the inventory item to a destination location. In an embodiment, the autonomous vehicle could comprise a cooler and/or heater to maintain inventory items at a consistent temperature during travel (e.g., to keep flowers or food in the proper condition).

In an embodiment, the application may comprise or interface with an inventory management system. For example, radio frequency identification (RFID) tags may be affixed to inventory items, such that the inventory items can be tracked by RFID interrogators that receive unique identifiers transmitted by the RFID tags. The identifiers may be tracked by the inventory management system, so that business users know which items are inventory, how many items are inventory, where inventory items are located, and/or the like. In an embodiment which uses autonomous vehicles, this information may be used in conjunction with the autonomous vehicles to identify the locations of inventory items to be transported and transport those inventory items between locations.

In an embodiment, the application may interface with one or more third-party payment platforms (e.g., via an API of each platform). The application may communicate with each of these third-party payment platforms to process a payment through that platform. For example, the third-party payment platforms may comprise credit/debit card companies, PayPal™, Venmo™ Zelle™, and/or the like. Thus, a business can process payments by its clients via the application. In addition, installment payments may be scheduled for automatic payment through the application. To this end, graphical user interface 300 may comprise one or more screens for business users and/or client users to provide payment information for a one-time payment and/or automatic installment payments.

In an embodiment, the application may be programmed with rules for automatically sending reminders for tasks and/or payments. For example, once a task is assigned to a team member, the application may periodically (e.g., once a day, every two or three days, once a week, etc.) acquire the status of the task, and, if the status has not changed over two or more periods, automatically send a reminder to the assigned team member (e.g., via the team member's dashboard 320, via email message, etc.). In addition, if the status of the task has not changed for a predetermined period of time or has not been completed within a predetermined window of time preceding its due date, the application may automatically send a notification to the assigned team member's manager (e.g., via the manager's dashboard 320, via email message, etc.). For example, if a team member is assigned the task of setting up an event, the application may automatically send notifications to the team member at various intervals or times to ensure that the team member is on task. The application could automatically send a notifications to the team member one month before the event to remind the team member to ensure that all inventory items required for the event have been acquired or reserved, two weeks before the event to check the condition of the inventory items and gather the inventory items together, and automatically send notifications to the catering vendor to provide updated head counts and menu requests (e.g., as RSVPs are received) for the meal service at various times approaching the event date.

In an embodiment, the application may automatically track team member's work hours for the business. For example, a client application 132 may be installed on each team member's mobile device to track the team member's time spent on each project and/or the location of the team member (e.g., to confirm that the team member was at work or other job location during work hours).

As discussed herein, the application may monitor the location of each inventory item. The application may also keep track of each team member that "touches" each inventory item. For example, touching an inventory item may include pulling the inventory item from a location in inventory, loading the inventory item onto a transport, unloading the inventory item at a venue, setting up the inventory item, returning the inventory item to a location in inventory, and/or the like. Thus, a user can easily determine, not only the current location of an inventory item, but also the team member who last handled the inventory item, thereby saving time in locating an inventory item as well as resolving any issues that may arise with respect to an inventory item. Specifically, if an issue arises with a particular inventory item, the user can easily identify and directly contact the team member who last handled that inventory item.

In an embodiment, the client user may access graphical user interface 300 to submit requests for particular services or items for the client's project. The requests may be submitted through the project-details screen, the project or design worksheet, and/or another screen of graphical user interface 300. For example, the client could request a particular spice level for the meal service, photographic finishes (e.g., photograph borders) from the photographic vendor, bouquets (e.g., specific colors, flowers, fabrics, styles, etc. for the bridal bouquet), and/or the like. Whenever a client submits a request, the application may automatically notify the team member(s) assigned to the project (e.g., via the team members' dashboards 320, via email message, via text message, etc.). In addition, the application may automatically notify the client (e.g., via dashboard 320, email message, text message, etc.) when the request is approved or denied by the responsible team member(s).

In an embodiment, the application may generate customized business reports for each business account. For example, graphical user interface 300 may comprise a business-reports screen with a list of business reports. This screen may be similar to the screens described with respect to FIGS. 4AG and 4AH. Each entry in the list of business reports may comprise a name of the report, an input (e.g., an icon which the user may select or perform a mouse hover over) for viewing a description of the report, an input for selecting a custom date range to be covered by the report, and/or the like. Once a user selects the input for selecting a custom date range for a particular report, the user may be provided with one or more inputs for selecting a custom date range (e.g., a pop-up calendar which can be operated to select a start and end date), printing the report, downloading the report (e.g., as a PDF, CSV, and/or spreadsheet file), and/or the like.

The business reports may include, without limitation, a project summary report, a business cost report, a business payment report, and/or the like. In addition, the business-reports screen may comprise one or more inputs for creating a new type of report. In other words, users may create custom reports that are specific to their business needs. The project summary report may aggregate the quantities of all inventory items that are associated with all projects within the selected date range into a single summary (e.g., a list of aggregated quantities, prices, vendors, etc. for each distinct inventory item), which can then be used to buy the aggregated inventory items in bulk (e.g., to obtain volume discounts, shipping discounts, etc.). For example, the project summary report may comprise an aggregation of all flower orders for all weddings occurring on the same day (e.g., across a plurality of projects), so that the business can purchase all of the flowers it will need all at once (e.g., a week in advance of the weddings). The project summary could also aggregate the quantities of rental items that are needed, and highlight any rental items which have not yet been acquired or reserved in sufficient quantities. The business cost report may aggregate the wholesale prices for all inventory items that are associated with all projects within the selected date range into a single summary (e.g., a list of aggregated quantities, wholesale prices, etc. for each distinct inventory item), which can be used to understand the costs that will be incurred by the business during the date range. The business payment report may summarize all projects that are active within the selected data range, including, for each project, the name or other identifier of the project, the name or other identifier of the client associated with the project, the referral source of the client, the date of the project, the contract date, one or more subtotals for the project, the total contract price for the project, a breakdown of all fees for the project, a breakdown of payments (e.g., by number of payments), the amount of payments, the amount of pending payments, and/or the like. The business payment report can be used to analyze financial information for the business.

In an embodiment, the application may provide other reports. For example, a report may comprise a list of relevant mailing addresses and/or email addresses to which cards, email messages, or other communications may be sent. For example, a business user could use the application to generate a report comprising all communications (e.g., thank-you notes, anniversary wishes, etc.) that are to be sent during a specified time period (e.g., day, week, month, all dates, etc.), for a specified type of event (e.g., wedding), for a specified type of recipient (e.g., client, vendor, referral sources, etc.), and/or the like. The report may comprise or be used to generate mailing labels. For example, the report could be exported (e.g., as a CSV or spreadsheet file) as an address book of all vendors for the business, all vendors for a specific client, all clients, all clients during a particular time period (e.g., year), all clients with an anniversary in a particular time period (e.g., all clients who got married in January), and/or the like.

Another potential report that the application may provide is a sales and/or tax report. For example, the report may comprise total sales over a specified time period (e.g., month, year, custom date range, etc.), month-over-month and/or year-over-year sales numbers, and/or the like. Additionally or alternatively, the report may comprise total taxes paid or due over a specified time period (e.g., month, year, custom date range, etc.). As another example, a report could comprise the total amount of payment received via each available payment method (e.g., as determined from the business-specific master data), using a table, graph, and/or chart, the source of each client, a list of all venues by client by year, number of leads and/or conversion rate year-over-year, and/or the like. The application may also provide a spreadsheet which enables a user to insert numbers and create budgets and/or expense sheets.

In an embodiment, the application may allow vendors to register with the application (e.g., via registration screen 310) and subsequently log in (e.g., via login screen 305) to the application. Vendor users may specify a vendor profile, comprising information about the vendor's business. Business users may search the vendor profiles based on keywords and/or one or more other criteria (e.g., industry, location, price range, experience, etc.), for example, to find vendors who satisfy their respective needs.

In an embodiment, graphical user interface 300 may comprise a build-your-own-bouquet tool for wedding projects. The tool enables users to drag and drop virtual flowers a virtual bouquet. For example, the tool may comprise a frame for the bouquet and a frame with images of available flowers. The bouquet and the flowers may be represented by three-dimensional images of a bouquet and flowers, respectively. However, two-dimensional images may also be used. In either case, the user may drag an image of a flower from the flower frame onto the bouquet frame to add the flower to the virtual bouquet, and drag an image of a flower off of the bouquet frame to subtract a flower from the virtual bouquet. The user may also drag flowers within the bouquet frame to arrange them. As flowers are added to the virtual bouquet, the tool may automatically update a price of the bouquet in graphical user interface 300, based on the prices associated with each of the flowers that is added to the virtual bouquet.

The build-your-own-bouquet tool may automatically generate a proposed virtual bouquet based on one or more specified colors (e.g., from the project or design worksheet, as discussed elsewhere herein), one or more specified design element (e.g., from the project or design worksheet, as discussed elsewhere herein), a specified style, and/or the like. For example, the tool may automatically construct a virtual bouquet that has the specified color(s), design element(s), and/or style, and/or provide a set of available flower that have the specified color(s), satisfy the specified design element(s), and/or satisfy the specified style.

Alternatively or additionally, the build-your-own-bouquet tool may provide inputs for specifying a budget for the bouquet, or selecting between a low-end budget, a medium budget, and a high-end budget. Based on the selected budget, the application may automatically generate a proposed bouquet, set of available flowers, and/or quantities of flowers to satisfy the selected budget. Alternatively, the application may automatically generate these recommendations for all three budgets, so that the client can see what is available at each budget level. Thus, a user can experiment with the virtual bouquet (e.g., by adding and subtracting flowers and viewing the updated price) to select the optimal bouquet for the client's budget. This can be especially useful for a user who does not have experience with pricing and flower types.

In an embodiment, once the desired bouquet is created using the build-your-own-bouquet tool, it may be purchased according to a desired quantity. For example, the application may interface (e.g., via an API) with a florist or wholesaler to generate an order for the specified quantity of bouquets. It should be understood that the florist or wholesaler may be one of the vendors, and that the order may be placed through an external system 140 of the vendor. Alternatively, the application may provide information for contacting the vendor and/or ordering the bouquet(s), so that the purchase may be made manually.

In an embodiment, platform 110 may provide a service marketplace to connect business owners and/or vendors. For example, freelance designers may collaborate with each other and advertise to business owners, business owners may collaborate with each other, and/or the like. Each participant can specify a profile with information about themselves and their business (e.g., contact information, location, industry, etc.), their dates of availability, their rates, representative projects, and/or the like. Business owners can post jobs in the marketplace, and vendors can bid on the jobs and/or otherwise accept jobs. Alternatively or additionally, business owners can specifically solicit one or more vendors to perform a job. The marketplace may provide a directory of business and vendors that can searched, for example, based on industry, location, qualifications, and/or the like.

Clients may also participate in this service marketplace, for example, to select the business to use for their project. Thus, business users may advertise to potential clients through the marketplace, and the application may recommend businesses to a client (e.g., based on location, distance, Zip code, type of event, etc.). Clients may also select specific vendors for a project through the service marketplace. For example, a client could select a tailor (e.g., boutique, freelancer, etc,) to construct custom clothing (e.g., type of fabric, color, style, etc.) for an event (e.g., being managed as a project by another business user). In such an embodiment, the marketplace may be available through the client account, and may automatically associate purchased services, on platform 110, with the project being managed by the respective business account.

As discussed elsewhere herein, users may store various files in user-specific and/or business-specific libraries in database 114 of platform 110. While these files have been primarily described herein as media files (e.g., images), it should be understood that users could store any files in these libraries. For example, a business owner could store any business-related documents in a library. Thus, the library can serve as a centralized repository for some or all documents related to the business. In an embodiment, all vendor contracts may be stored in database 114 of platform 110. Business users, and optionally client users, may be permitted to view the vendor contracts, related to a project, via graphical user interface 300.

In an embodiment, platform 110 may provide a rental marketplace between business owners. For example, the application may generate graphical user interface 300 to comprise one or more inputs (e.g., in inventory screen 355) for a business user to specify inventory items that can be rented. Inventory items that are specified as available to rent may be published in the marketplace. Users of other business accounts may browse the marketplace and rent the published inventory items through the marketplace. These users may filter the rentable inventory items based on location, distance (e.g., mileage between the location of the inventory item and the user's place of business), date of availability, type of inventory, and/or the like. Thus, business owners may create additional revenue and reduce waste (e.g., through upcycling) by renting out unused inventory items to other business owners.

In an embodiment, whenever one inventory item is selected (e.g., viewed in an inventory-details screen or added to a project), the application may automatically suggest similar inventory items, for example, based on shared tags between the selected inventory item and the suggested inventory item, the fact that the inventory items are both part of the same assembly, the fact that the inventory items share one or more parameter values (e.g., type, size, etc.), historical data that the inventory items are frequently used together, and/or the like.

In an embodiment, platform 110 may serve as a resource for shared knowledge. For example, the application may allow users to upload resources (e.g., media, such as photographs, videos, training materials, how-to guides, virtual lessons, etc.), which are then stored in database 114 for other users to access. Additionally or alternatively, the application may provide virtual workspaces or live workshops (e.g., via video conferencing) so that users may interact with each other in real time. Thus, professionals may use the resources to teach themselves, collaborate with other professionals, and/or the like.

In an embodiment, the application may provide predictive suggestions for one or more text inputs. For example, as a user types a text string into a textbox (e.g., search input, input for receiving a parameter value for a data object or customizable data, etc.), the application may predict one or more intended words or strings (e.g., using a machine-learning model 500, using a postal database for addresses, etc.), based on the partial text string that has already been entered, and provide the predicted word(s) in a drop-down menu for selection by the user. Thus, text can be automatically completed by the application. In the case of an input that accepts an address, the application may interface with a postal database (e.g., an external system 140 representing a platform of the U.S. postal service) via an API to automatically suggest or complete the address as a user types the address into the input.

In an embodiment, the application may interface with one or more vendors (e.g., via an API to external system(s) 140) to allow users to place orders with the vendor(s) through the application and/or to enable the application to automatically place orders. For example, the application may directly interface with a flower-growing farm or florist to place orders for flowers. The application may also interface with the vendors and/or third-party delivery services (e.g., via an API to external system(s) 140) to track the progress of orders (e.g., preparation, shipping, and delivery). Through the interface, the application may pull information from the platform of a vendor and/or third-party delivery to track each order, placed through the application, in real time.

In an embodiment, the application may interface with one or more calendaring or scheduling applications (e.g., via an API to external system(s) 140) to push information into the scheduling application and/or pull information from the scheduling application. For example, the application could push an appointment, task, and/or event date into the scheduling application, so that users are reminded about the appointment, task, and/or event date via the scheduling application. As another example, availability for an appointment may be pulled from the scheduling application. The application may maintain synchronization with the scheduling application of business users and/or client users.

In an embodiment, the application may enable business users to share information with recipients without providing access to any internal screens of graphical user interface 300 and/or requiring an account with the application. For example, a business user may share a timeline or document with a client, vendor, or other recipient, who does not have an account with the application, by sending an email message to the recipient. The email message may comprise the timeline or document (e.g., in the body of the email or as an attachment), or may comprise a link to an external screen comprising the timeline or document. In the case of an external screen, the external screen may require no authentication or minimal authentication (e.g., a simple alphanumeric string provided in the same or separate email message or embedded in the link to the external screen).

In an embodiment, a business user may be associated with a plurality of business accounts. Thus, a business user who is involved with two or more businesses can seamlessly toggle between different business accounts within the application. It should be understood that each business account may be associated with its own business-specific data (e.g., different business information, contract templates with a different corporate logo, etc.). In an embodiment, each a business owner may have the ability to do one or more, and potentially all, of the following for each business account through the application: create notepads; track project tasks; upload and store documents; store passwords (e.g., in a password storage sheet) that can be shared with team members; track projected and/or actual budgets (e.g., including the cost of inventory items, supplies, staff wages and/or salaries, etc.); set and/or view the schedules of team members (e.g., via tasks); assign team members to projects, tasks, interactions, and/or the like; view the user profiles for all team members, and optionally additional information, such as each team member's birthday, interests and hobbies, and/or the like.

In an embodiment, all of the reports may be viewable in an interactive form through graphical user interface 300. Thus, users may view and interact with the reports on a display of their respective user systems 130, instead of having to print the reports. Advantageously, this reduces or eliminates paper waste.

In an embodiment, the application may automatically create or recommend a budget based on information that the client has provided. For example, a prospective client may provide information about a desired project (e.g., style, items, quantities, etc.) through a contact form or other request form of a business's website. The application may receive and use this information to automatically suggest a budget to the business user for the client's project, thereby reducing or eliminating the time that the business user would otherwise have to devote to creating the budget. The application may generate this suggested budget using a formula or a machine-learning model 500.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
    generate a plurality of color data structures, wherein each of the plurality of color data structures comprises a hexadecimal number that represents a different color than any of the other plurality of color data structures;
    generate a plurality of element data structures, wherein each of the plurality of element data structures represents a different element than any of the other plurality of element data structures;
    generate a plurality of item data structures, wherein each of the plurality of item data structures represents a physical item and is associated with an image representing the physical item;
    generate a graphical user interface comprising:
        a colors section comprising a visual representation of colors associated with one project of a plurality of projects, at least one first colors input for receiving a selection of one or more new colors to associate with the one project, and at least one second colors input for receiving a selection to delete one or more colors from the one project,
        an elements section comprising a visual representation of elements associated with the one project, at least one first elements input for receiving a selection of one or more new elements to associate to with the one project, and at least one second elements input for receiving a selection to delete one or more elements from the one project, and
        a virtual design board associated with the one project;
    via the graphical user interface,
        receive a first selection of one or more colors via the at least one first colors input to associate one or more new colors with the one project or a second selection of one or more colors via the at least one second colors input to delete one or more colors from the project and associate a subset of the plurality of color data structures, representing the one or more colors associated with the one project, with a search, and
        receive a first selection of one or more elements via the at least one first elements input to associate one or more new elements with the one project or a second selection of one or more elements via the at least one second elements input to delete one or more elements from the project and associate a subset of the plurality of element data structures, representing the one or more elements associated with the one project, with the search;

identify a subset of the plurality of item data structures based on the subset of color data structures and the subset of element data structures associated with the search; and populate the virtual design board with thumbnails of the images associated with the identified subset of item data structures.

2. The method of claim 1, wherein the virtual design board comprises, for each of the identified subset of item data structures, an input that, when selected, associates the item data structure with the one project.

3. The method of claim 2, further comprising using the at least one hardware processor to:

receive a configuration for at least one payment gateway;

automatically generate an invoice based on a cost associated with each of the item data structures associated with the one project; and interface with the at least one payment gateway, based on the configuration, to complete one or more payments of the invoice through the graphical user interface.

4. The method of claim 2, further comprising using the at least one hardware processor to, while the item data structure is associated with the one project:

determine a time period associated with the one project based on a time of an event associated with the one project and a preparation time of the event, and reserve a quantity of the item, represented by the item data structure, in an inventory management system, for the determined time period.

5. The method of claim 1, wherein the graphical user interface comprises a first set of screens for a user of a business account and a second set of screens for a user of a client account, wherein the second set of screens is different from the first set of screens.

6. The method of claim 5, wherein the first set of screens comprises a clients screen and a projects screen, wherein the clients screen comprises a list of data objects, representing clients, for all clients that are managed by the user of the business account, wherein the projects screen comprises a list of data objects, representing projects, for all projects that are managed by the user of the business account, and wherein each list of data objects comprises, for each data object, an input for editing the data object and an input for deleting the data object.

7. The method of claim 6, wherein both the first set of screens and the second set of screens comprise a project-details screen, wherein the project-details screen comprises one or more inputs for specifying project information that defines the one project that is managed by the business account for the client account.

8. The method of claim 7, wherein the project information comprises table details, and wherein both the first set of screens and the second set of screens comprise a table-list screen, wherein the table-list screen comprises one or more inputs for defining a plurality of tables for an event represented by the one project.

9. The method of claim 7, wherein the project-details screen in the first set of screens comprises one or more inputs for toggling one or more data in the project information between locked and unlocked, wherein, when the one or more data are unlocked, the client user can alter the one or more data in the project-details screen in the second set of screens, and wherein, when the one or more data are locked, the client user cannot alter the one or more data in the project-details screen in the second set of screens.

10. The method of claim 7, wherein the project-details screen comprises one or more inputs for uploading media to be associated with the one project, and wherein the method further comprises using the at least one hardware processor to, whenever a medium is uploaded, associate a first copy of the medium with the one project in a project database and automatically store a second copy of the medium in a library associated with a user that uploaded the medium.

11. The method of claim 1, wherein at least one of the plurality of item data structures represents a physical composite item that is an assembly of a plurality of physical constituent items, and wherein the at least one item data structure is associated with two or more other item data structures representing the plurality of physical constituent items.

12. The method of claim 11, wherein each of the two or more item data structures is associated with a preparation instruction, and wherein the method further comprises using the at least one hardware processor to:

automatically generate a preparation list that comprises the preparation instruction associated with each of the two or more item data structures; and associate the preparation list with the at least one item data structure representing the physical composite item.

13. The method of claim 12, further comprising using the at least one hardware processor to generate a logistics report comprising the preparation list associated with the at least one item data structure representing the physical composite item.

14. The method of claim 1, wherein the graphical user interface comprises a contract screen, wherein the contract screen comprises an input for selecting one of a plurality of contract templates, wherein each contract template comprises a starting portion, an ending portion, and one or more contract terms, and wherein the method further comprises using the at least one hardware processor to:

automatically populate the contract template with data associated with the one project to produce a complete contract; and store an executed version of the complete contract in association with the one project.

15. The method of claim 1, wherein the graphical user interface comprises a notepads screen, wherein the notepads screen comprises an input for adding a virtual notepad to the one project based on a notepad template, and wherein the method further comprises using the at least one hardware processor to:

receive a selection of a virtual notepad that has been added to the one project;

in response to receiving the selection of the virtual notepad, update the notepads screen to comprise one or more inputs for editing a content of the virtual notepad; and, after receiving edited content of the virtual notepad, save the virtual notepad, with the edited content, in association with the one project.

16. The method of claim 1, further comprising using the at least one hardware processor to record communications between users of a business account, which manages the one project for a client account, and a user of the client account, wherein the graphical user interface comprises an interactions screen that comprises a representation of each communication associated with the one project.

17. The method of claim 1, further comprising using the at least one hardware processor to:

provide access to the graphical user interface to a plurality of users based on roles associated with the plurality of users, wherein each of the plurality of users is associated with one of the plurality of color data structures;

generate a plurality of task data structures, wherein each of the plurality of task data structures is associated with the one project and one of the plurality of users, and wherein each of the plurality of task data structures represents an assigned task for the one project; and color code each representation of a task in the graphical user interface according to the color represented by the one color data structure associated with the one user associated with the task data structure representing the task.

18. The method of claim 1, further comprising using the at least one hardware processor to:

provide access to the graphical user interface to a plurality of users based on roles associated with the plurality of users, wherein each of the plurality of users is associated with one of the plurality of color data structures;

generate a plurality of interaction data structures, wherein each of the plurality of interaction data structures is associated with the one project and one of the plurality of users, and wherein each of the plurality of interaction data structures represents an assigned interaction for the one project; and color code each representation of an interaction in the graphical user interface according to the color represented by the one color data structure associated with the one user associated with the interaction data structure representing the interaction.

19. The method of claim 1, further comprising using the at least one hardware processor to:

receive client data for the one project;

extract a feature vector from the client data; and apply a machine-learning algorithm, which has been trained on labeled feature vectors to predict project information, to the extracted feature vector to automatically populate a project data structure, representing the one project, with predicted project information.

20. A system comprising:

at least one hardware processor; and one or more software modules that are configured to, when executed by the at least one hardware processor, generate a plurality of color data structures, wherein each of the plurality of color data structures comprises a hexadecimal number that represents a different color than any other plurality of color data structures, generate a plurality of element data structures, wherein each of the plurality of element data structures represents a different element than any of the other plurality of element data structures, generate a plurality of item data structures, wherein each of the plurality of item data structures represents a physical item and is associated with an image representing the physical item, generate a graphical user interface, comprising:

a colors section comprising a visual representation of colors associated with one project of a plurality of projects, at least one first colors input for receiving a selection of one or more new colors to associate with the one project, and at least one second colors input for receiving a selection to delete one or more colors from the one project, an elements section comprising a visual representation of elements associated with the one project, at least one first elements input for receiving a selection of one or more new elements to associate to with the one project, and at least one second elements input for receiving a selection to delete one or more elements from the one project, and a virtual design board associated with the one project, via the graphical user interface, receive a first selection of one or more colors via the at least one first colors input to associate one or more new colors with the one project or a second selection of one or more colors via the at least one second colors input to delete one or more colors from the project and associate a subset of the plurality of color data structures, representing the one or more colors associated with the one project, with a search, and receive a first selection of one or more elements via the at least one first elements input to associate one or more new elements with the one project or a second selection of one or more elements via the at least one second elements input to delete one or more elements from the project and associate a subset of the plurality of element data structures, representing the one or more elements associated with the one project, with the search, identify a subset of the plurality of item data structures based on the subset of color data structures and the subset of element data structures associated with the search, and populate the virtual design board with thumbnails of the images associated with the identified subset of item data structures.

21. A non-transitory computer-readable medium having instructions stored therein, wherein the instructions, when executed by a processor, cause the processor to:

generate a plurality of color data structures, wherein each of the plurality of color data structures comprises a hexadecimal number that represents a different color than any of the other plurality of color data structures;

generate a plurality of element data structures, wherein each of the plurality of element data structures represents a different element than any of the other plurality of element data structures;

generate a plurality of item data structures, wherein each of the plurality of item data structures represents a physical item and is associated with an image representing the physical item;

generate a graphical user interface comprising:

a colors section comprising a visual representation of colors associated with one project of a plurality of projects, at least one first colors input for receiving a selection of one or more new colors to associate with the one project, and at least one second colors input for receiving a selection to delete one or more colors from the one project, an elements section comprising a visual representation of elements associated with the one project, at least one first elements input for receiving a selection of one or more new elements to associate to with the one project, and at least one second elements input for receiving a selection to delete one or more elements from the one project, and a virtual design board associated with the one project;

via the graphical user interface, receive a first selection of one or more colors via the at least one first colors input to associate one or more new colors with the one project or a second selection of one or more colors via the at least one second colors input to delete one or more colors from the project and associate a subset of the plurality of color data structures, representing the one or more colors associated with the one project, with a search, and receive a first selection of one or more elements via the at least one first elements input to associate one or more new elements with the one project or a second selection of one or more elements via the at least one second elements input to delete one or more elements from the project and associate a subset of the plurality of element data structures, representing the one or more elements associated with the one project, with the search;

identify a subset of the plurality of item data structures based on the subset of color data structures and the subset of element data structures associated with the search; and populate the virtual design board with thumbnails of the images associated with the identified subset of item data structures.

22. The method of claim 1, wherein each of the plurality of item data structures is further associated with at least one of the plurality of color data structures and at least one of the plurality of element data structures, and wherein identifying the subset of the plurality of item data structures comprises identifying one or more of the plurality of item data structures that are associated with at least one color data structure in the subset of color data structures and at least one element data structure in the subset of element data structures.

23. The method of claim 1, wherein identifying the subset of the plurality of item data structures comprises:

extracting a plurality of features from the subset of color data structures and the subset of element data structures; and applying a machine-learning model to the extracted plurality of features to predict the subset of item data structures.

24. The method of claim 1, wherein, to populate the virtual design board with thumbnails of the images associated with the identified subset of item data structures, the method further uses the at least one hardware processor to:

automatically update the virtual design board in response to (1) receiving the first selection to associate the one or more new colors with the one project, (2) receiving the second selection to delete the one or more colors from the project, (3) receiving the first selection to associate the one or more new elements with the one project, or (4) receiving the second selection to delete the one or more elements from the project.

\* \* \* \* \*